US012722247B2

(12) United States Patent
Tateno et al.

(10) Patent No.: US 12,722,247 B2
(45) Date of Patent: Sep. 1, 2026

(54) POLISHING PAD AND METHOD FOR MANUFACTURING POLISHING PAD

(71) Applicant: Fujibo Holdings, Inc., Tokyo (JP)

(72) Inventors: Teppei Tateno, Saijo (JP); Keisuke Tanaka, Saijo (JP); Yoshie Kiraku, Saijo (JP); Kenichi Koike, Saijo (JP); Hiroshi Kurihara, Saijo (JP); Yoshiki Miyauchi, Saijo (JP)

(73) Assignee: FUJIBO HOLDINGS, INC., Tokyo (JP)

( * ) Notice: Subject to any disclaimer, the term of this patent is extended or adjusted under 35 U.S.C. 154(b) by 753 days.

(21) Appl. No.: 18/247,158

(22) PCT Filed: Sep. 16, 2021

(86) PCT No.: PCT/JP2021/034032

§ 371 (c)(1),
(2) Date: Mar. 29, 2023

(87) PCT Pub. No.: WO2022/070936

PCT Pub. Date: Apr. 7, 2022

(65) Prior Publication Data

US 2023/0415300 A1 Dec. 28, 2023

(30) Foreign Application Priority Data

Sep. 30, 2020 (JP) ................................ 2020-164765
Sep. 30, 2020 (JP) ................................ 2020-164766

(Continued)

(51) Int. Cl.
*B24B 37/24* (2012.01)
*B24B 37/26* (2012.01)

(Continued)

(52) U.S. Cl.
CPC .............. *B24B 37/24* (2013.01); *B24B 37/26* (2013.01); *B24D 3/22* (2013.01); *C08J 7/056* (2020.01)

(58) Field of Classification Search
CPC ....... B24B 37/205; B24B 37/24; B24B 37/22; B24B 49/12; B24D 11/003; B24D 11/001; B24D 3/32
See application file for complete search history.

(56) References Cited

U.S. PATENT DOCUMENTS 6,537,133 B1 * 3/2003 Birang .................... B24B 49/04 451/6
9,017,140 B2 * 4/2015 Allison ................ B24B 37/205 451/526

(Continued)

FOREIGN PATENT DOCUMENTS

CN 111230731 A 6/2020
JP 2000-178832 A 6/2000

(Continued)

OTHER PUBLICATIONS

Office Action issued on Feb. 5, 2025, by the Taiwan Intellectual Property Office in corresponding Taiwanese Patent Application No. 110134177, and an English Translation of the Office Action. (15 pages).

(Continued)

*Primary Examiner* — Joel D Crandall
(74) *Attorney, Agent, or Firm* — BUCHANAN INGERSOLL & ROONEY PC

(57) ABSTRACT

The present invention provides a polishing pad that can suppress variations in light transmittance or a polishing pad that can reduce adhesion and sticking of polishing swarf to the surface on the polishing surface side of the light-transmitting resin member (window member).

20 Claims, 7 Drawing Sheets

(30) Foreign Application Priority Data

| | | |
|---|---|---|
| Sep. 30, 2020 | (JP) | 2020-164767 |
| Mar. 29, 2021 | (JP) | 2021-055069 |

(51) Int. Cl.

| | |
|---|---|
| ***B24D 3/22*** | (2006.01) |
| ***C08J 7/056*** | (2020.01) |

(56) References Cited

U.S. PATENT DOCUMENTS

| | | | | |
|---|---|---|---|---|
| 12,138,735 | B2 | 11/2024 | Chen et al. | |
| 2003/0129931 | A1* | 7/2003 | Konno | B24B 37/205 451/285 |
| 2004/0033758 | A1 | 2/2004 | Wiswesser | |
| 2004/0203320 | A1 | 10/2004 | Hosaka et al. | |
| 2004/0224611 | A1 | 11/2004 | Aoi et al. | |
| 2005/0009448 | A1 | 1/2005 | Misra et al. | |
| 2005/0010388 | A1 | 1/2005 | Bagchi et al. | |
| 2005/0060943 | A1 | 3/2005 | Turner et al. | |
| 2005/0113008 | A1 | 5/2005 | Roberts | |
| 2005/0266771 | A1 | 12/2005 | Wiswesser | |
| 2006/0019587 | A1 | 1/2006 | Deopura et al. | |
| 2006/0189269 | A1 | 8/2006 | Roy et al. | |
| 2006/0276109 | A1 | 12/2006 | Roy et al. | |
| 2007/0208878 | A1 | 9/2007 | Barnes-Leon et al. | |
| 2008/0090498 | A1 | 4/2008 | Misra et al. | |
| 2008/0160881 | A1* | 7/2008 | Fujii | C09K 3/1409 451/36 |
| 2008/0207100 | A1 | 8/2008 | Roy et al. | |
| 2008/0211141 | A1 | 9/2008 | Deopura et al. | |
| 2008/0221858 | A1 | 9/2008 | Bagchi et al. | |
| 2009/0053976 | A1 | 2/2009 | Roy et al. | |
| 2010/0273398 | A1 | 10/2010 | Misra et al. | |
| 2011/0053377 | A1 | 3/2011 | Ogawa et al. | |
| 2011/0274914 | A1* | 11/2011 | Nakao | A01G 13/20 977/773 |
| 2013/0059509 | A1 | 3/2013 | Deopura et al. | |
| 2015/0065020 | A1 | 3/2015 | Roy et al. | |
| 2015/0093977 | A1 | 4/2015 | Deopura et al. | |
| 2016/0229025 | A1 | 8/2016 | Roy et al. | |
| 2017/0120416 | A1 | 5/2017 | Chockalingam et al. | |
| 2020/0055161 | A1 | 2/2020 | Chockalingham et al. | |
| 2020/0164482 | A1* | 5/2020 | Chen | C09G 1/02 |
| 2024/0383095 | A1 | 11/2024 | Chen et al. | |

FOREIGN PATENT DOCUMENTS

| | | | | | |
|---|---|---|---|---|---|
| JP | 2002001652 | A | | 1/2002 | |
| JP | 2003285257 | A | | 10/2003 | |
| JP | 2004327974 | A | | 11/2004 | |
| JP | 2004343090 | A | | 12/2004 | |
| JP | 2005-175464 | A | | 6/2005 | |
| JP | 2007-506280 | A | | 3/2007 | |
| JP | 2007-231486 | A | | 9/2007 | |
| JP | 2008221367 | A | | 9/2008 | |
| JP | 2008-546167 | A | | 12/2008 | |
| JP | 4931133 | B2 | | 5/2012 | |
| JP | 2014104521 | A | | 6/2014 | |
| JP | 2016-068255 | A | | 5/2016 | |
| JP | 2018-162431 | A | | 10/2018 | |
| JP | 2018-538152 | A | | 12/2018 | |
| JP | 2019-048912 | A | | 3/2019 | |
| TW | 201429622 | A | | 8/2014 | |
| WO | WO-2007058374 | A1 | * | 5/2007 | C08J 7/0427 |
| WO | WO-2015029294 | A1 | * | 3/2015 | B24B 49/06 |

OTHER PUBLICATIONS

Office Action (Notice of Reasons for Refusal) issued on Apr. 15, 2024, by the Japanese Patent Office in corresponding Japanese Patent Application No. 2020-164765, and an English Translation of the Office Action. (9 pages).

Office Action (Notice of Reasons for Refusal) issued on Apr. 15, 2024, by the Japanese Patent Office in corresponding Japanese Patent Application No. 2020-164766, and an English Translation of the Office Action. (9 pages).

Office Action (Notice of Reasons for Refusal) issued on Apr. 15, 2024, by the Japanese Patent Office in corresponding Japanese Patent Application No. 2020-164767, and an English Translation of the Office Action. (9 pages).

International Search Report (PCT/ISA/210) with an English translation, and Written Opinion (PCT/ISA/237) mailed on Dec. 7, 2021, by the Japanese Patent Office as the International Searching Authority for International Application No. PCT/JP2021/034032. (9 pages).

Office Action (Notification of the First Office Action) issued on May 28, 2025, by the State Intellectual Property Office of the People's Republic of China in corresponding Chinese Patent Application No. 202180067394.0 and an English Translation of the Office Action. (15 pages).

* cited by examiner

POLISHING PAD AND METHOD FOR MANUFACTURING POLISHING PAD

TECHNICAL FIELD

The present invention relates to a polishing pad and a method for manufacturing the same, and more particularly to a polishing pad for chemical mechanical polishing (CMP) having a light transmitting area and a method for manufacturing the same. More specifically, the present invention relates to a polishing pad including an endpoint detection window through which the polishing endpoint can be optically detected.

BACKGROUND ART

The chemical mechanical polishing (hereinafter referred to as "CMP") method is used in semiconductor manufacturing steps (particularly, planarization of an interlayer insulating film, metal plug formation, or embedded wiring formation, in a multilayer wiring formation steps). CMP is a technique of polishing with slurry having abrasive grains dispersed therein while the surface to be polished of the wafer is pressed against the polishing surface of the polishing pad. Polishing pads used for CMP are roughly classified into hard polishing pads and soft polishing pads. For hard polishing pads, the dry molding method in which a curable composition containing a urethane prepolymer is cast into a mold and cured. For soft polishing pads, the wet film-forming method is predominant in which a urethane resin solution is formed into a film in a coagulation bath and dried. In recent years, there has been a high demand for low-defect and level-difference eliminating properties of objects to be polished, and there has been an increase in the number of cases where soft polishing pads are used in finishing polish steps and the like.

In recent years, semiconductor elements have been dramatically increasing in number of layers and integrity, so that semiconductor elements are required to have further improvements in first-pass yields and throughputs (yields) while polishing pads are required to be defect-free and highly planarizing without dishing. In order to meet these requirements and perform highly accurate CMP, the polishing endpoint needs to be determined, that is, it is necessary to detect the point at which the desired surface characteristics and planarity have been reached, so that optical measurement has been used to detect the endpoint.

SUMMARY OF INVENTION

Optical measurement is a method for observing the surface of a wafer through a measurement window provided in the polishing pad. When a polishing pad is provided with a measurement window for optical measurement, since the polishing pad is generally not transparent, it is necessary to arrange a transparent material different in material from the polishing pad in the window portion. This transparent material decreases in light transmittance due to various factors, such as the surface being damaged during polishing and slurry leaking through the gap between the polishing area and the transparent material causing dew condensation on the back surface of the transparent material. For this reason, it becomes difficult to maintain highly accurate determination of the polishing endpoint from the initial stage of polishing to the final stage of polishing. Further, when a soft polishing pad is used in the finishing polish step or the like, pressing the polishing pad against the wafer causes the window to protrude from the polishing surface, and this protruding window with no polishing capability may hit the wafer to cause polishing scratches.

As a polishing pad for solving the problem of decreased light transmittance, Japanese Patent Application Publication No. 2008-221367 (Patent Literature 1) proposes a polishing pad with hydrophilic treatment on the back surface of the light transmitting area, which thus prevents moisture from the slurry from condensing on the back surface of the light transmitting area even if the slurry leaks out of the joint between the polishing area and the light transmitting area to the back side of the light transmitting area, preventing a decrease in light transmittance.

Similarly, Japanese Patent Application Publication No. 2004-343090 (Patent Literature 2) proposes a polishing pad which can prevent the slurry from leaking through the gaps during polishing by adhering and fixing the light transmitting area to the inner wall of a through hole provided in the polishing substrate using a photocurable adhesive.

Japanese Patent No. 4931133 (Patent Literature 3) proposes a polishing pad which prevents endpoint detection errors due to the decrease in light transmittance from the initial stage of polishing to the final stage of polishing by preliminarily roughening the surface on the polishing surface side of the light transmitting area by roughening treatment such as sandblasting.

In addition, as a polishing pad for improving the problem of scratches, Japanese Patent Application Publication No. 2014-104521 (Patent Literature 4) proposes a polishing pad which can prevent the window surface from contacting the wafer, prevent the window surface from being damaged, and reduce polishing scratches on the wafer by lowering the window surface below the polishing surface of the polishing layer to form a concave portion.

However, the polishing pads of Patent Literatures 1 and 2 both focus on solving the problem of dew condensation that results from leakage to the side surface and back surface of the light-transmitting member, but neither pays attention to variations in light transmittance caused by the presence or absence of slurry on the surface of the light-transmitting member.

Similarly, with regard to the polishing pad of Patent Literature 3, no attention is paid to the variation in light transmittance caused by the presence or absence of slurry on the surface of the light-transmitting member. Moreover, since the polishing pad of Patent Literature 3 roughens the window surface, it is difficult to obtain a high light transmittance in the first place. In addition, since the window surface is roughened differently by slurry, abrasive grains, dressing, and the like during polishing, there is also a problem that it is difficult to always maintain the light transmittance constant.

Since the polishing pad of Patent Literature 4 has a concave portion, most of the slurry that has entered the concave portion moves to the side surfaces of the concave portion due to centrifugal force, and is then discharged from the grooves provided in the polishing surface. In the case of application to a soft polishing pad in particular, the soft polishing layer tends to cause the slurry to flow, so that when the light-transmitting member is irradiated with light, the odds are even that the slurry is on the surface of the light-transmitting member. However, Cited Reference 4 does not recognize this problem, nor does it mention how to solve it.

A first aspect of the present invention has been made in view of the above, and an object thereof is to provide a polishing pad that can suppress variations in light transmittance caused by the presence of slurry on the surface of the light-transmitting member.

The present inventors have found that the light transmittance differs between the presence and absence of slurry on the surface of the light-transmitting member, which causes variations in the light transmittance and makes it difficult to determine the polishing endpoint with high accuracy, and have solved this problem by reducing the water contact angle of the surface on the polishing surface side of the light-transmitting member. Thus, the first aspect of the present invention has been completed.

In addition, optical measurement is a method for observing the surface of a wafer through a measurement window provided in the polishing pad. When a polishing pad is provided with a measurement window for optical measurement, since the polishing pad is generally not transparent, it is necessary to arrange a transparent material different in material from the polishing pad in the window portion. This transparent material decreases in light transmittance due to various factors, such as the surface being damaged during polishing and slurry leaking through the gap between the polishing area and the transparent material causing dew condensation on the back surface of the transparent material. For this reason, it becomes difficult to maintain highly accurate determination of the polishing endpoint from the initial stage of polishing to the final stage of polishing. Further, when a soft polishing pad is used in the finishing polish step or the like, pressing the polishing pad against the wafer causes the window to protrude from the polishing surface, and this protruding window with no polishing capability may hit the wafer to cause polishing scratches.

As a polishing pad for solving the problem of decreased light transmittance, Japanese Patent Application Publication No. 2008-221367 (Patent Literature 1) proposes a polishing pad with hydrophilic treatment on the back surface of the light transmitting area, which thus prevents moisture from the slurry from condensing on the back surface of the light transmitting area even if the slurry leaks out of the joint between the polishing area and the light transmitting area to the back side of the light transmitting area, preventing a decrease in light transmittance.

Further, Japanese Patent Application Publication No. 2003-285257 (Patent Literature 5) proposes a polishing pad in which the surface of the window member, made of an inorganic transparent material such as glass, is rendered water-repellent, as a polishing pad for solving the problem that the surface of the window member, roughened by the slurry, scatters light, resulting in decreased light transmittance.

Moreover, Japanese Patent Application Publication No. 2004-327974 (Patent Document 6) proposes a polishing pad in which a water-soluble substance is dispersed or contained in the matrix material constituting the window, as a polishing pad that solves the problem of deterioration in polishing performance due to the window member having no ability to retain or discharge slurry.

However, the polishing pad of Patent Literature 1 focuses on solving the problem of dew condensation that results from leakage to the back surface of the light-transmitting member, but pays no attention to variations in light transmittance caused by the presence or absence of slurry on the surface of the light-transmitting member.

The polishing pad of Patent Literature 5 employs glass as the window member in order to solve the decrease in light transmittance caused by the surface of the window member being scraped and roughened by the slurry. Since the window member is harder than the polishing layer, the window member is arranged so as to locate the window member surface below the polishing layer surface, so that slurry tends to intervene between the surface of the window member and the surface of the object to be polished. The problem is solved by rendering the surface of the window member water-repellent in order to discharge the slurry. However, during polishing when the polishing liquid is continuously supplied, it is difficult to eliminate all the slurry intervening on the surface of the light-transmitting member, and a small amount of slurry forms into droplets due to water repellency, which may cause variations in light transmittance.

The polishing pad of Patent Document 6 is such that since the water-soluble substance is dispersed in the matrix constituting the window, the water-soluble substance is liberated upon contact with water during use and forms pores for retaining the slurry, thereby providing slurry retention and discharge capabilities. Thus, it is assumed that the water-soluble substance is dispersed throughout the matrix material. Similar to Patent Literature 1, Patent Literature 6 does not pay attention to variations in light transmittance caused by the presence or absence of slurry on the surface of the light-transmitting member. In addition, when a hydrophilic substance is kneaded into the matrix material by the method of Patent Literature 6, the matrix material mixes with the hydrophilic substance and the entire window has hydrophilicity, so that the slurry may swell and deform the window, causing the window to peel off from the polishing area or cause slurry leakage.

A second aspect of the present invention has been made in view of the above, and an object thereof is to provide a polishing pad that can suppress variations in light transmittance caused by the presence of slurry on the surface of the light-transmitting member.

The present inventors have found that the light transmittance differs between the presence and absence of slurry on the surface of the light-transmitting member, which causes variations in the light transmittance and makes it difficult to determine the polishing endpoint with high accuracy, and have solved this problem by coating a hydrophilic resin on the surface on the polishing surface side of the light-transmitting member. Thus, the second aspect of the present invention has been completed.

In addition, optical measurement is a method for observing the surface of a wafer through a measurement window provided in the polishing pad. When a polishing pad is provided with a measurement window for optical measurement, since the polishing pad is generally not transparent, it is necessary to arrange a transparent material different in material from the polishing pad in the window portion. This transparent material decreases in light transmittance due to various factors, such as the surface being damaged during polishing and slurry leaking through the gap between the polishing area and the transparent material causing dew condensation on the back surface of the transparent material. For this reason, it becomes difficult to maintain highly accurate determination of the polishing endpoint from the initial stage of polishing to the final stage of polishing. Further, when a soft polishing pad is used in the finishing polish step or the like, pressing the polishing pad against the wafer causes the window to protrude from the polishing surface, and this protruding window with no polishing capability may hit the wafer to cause polishing scratches. Further, during the polishing process, polish products are produced (polishing swarf such as agglomerated pad pieces, polish-target objects, and polishing slurry, produced after polishing). These gradually adhere and stick to the surface on the polishing surface side of the window member, thereby posing a problem that stable optical measurement becomes difficult.

As a pad having a window for endpoint detection, Japanese Patent Application Publication No. 2014-104521 (Patent Literature 4) proposes a polishing pad in which the window member is arranged at a position recessed from the polishing surface in order to suppress the occurrence of polishing scratches due to contact of the window member with the object to be polished.

In addition, Japanese Patent Application Publication No. 2008-221367 (Patent Literature 1) proposes a polishing pad with hydrophilic treatment on the back surface of the window member, which thus prevents moisture from the slurry from condensing on the back surface of the window member even if the slurry leaks out of the joint between the polishing area and the window member to the back side of the window member, preventing a decrease in light transmittance.

However, the polishing pad of Patent Literature 4 has a problem that the light transmittance decreases over time because polishing swarf contained in the slurry sinks into the recessed window region and sticks to the window surface. The polishing pad of Patent Literature 1 focuses on solving the problem of condensation that results from leakage to the side surface and back surface of the window member, but does not solve the problem of adhesion and sticking of polishing swarf to the surface on the polishing surface side of the window member.

A third aspect of the present invention has been made in view of the above, and an object thereof is to provide a polishing pad that can reduce adhesion and sticking of polishing swarf to the surface on the polishing surface side of the light-transmitting resin member (window member).

The present inventors have found that when a hydrophilic monomer is graft-polymerized on the surface on the polishing surface side of the light-transmitting resin member, it is possible to reduce adhesion and sticking of polishing swarf to the surface on the polishing surface side of the light-transmitting resin member (window member). Thus, the third aspect of the present invention has been completed.

In addition, optical measurement is a method for observing the surface of a wafer through a measurement window provided in the polishing pad. When a polishing pad is provided with a measurement window for optical measurement, since the polishing pad is generally not transparent, it is necessary to arrange a transparent material different in material from the polishing pad in the window portion. This transparent material decreases in light transmittance when damaged during polishing. For this reason, it becomes difficult to maintain highly accurate determination of the polishing endpoint from the initial stage of polishing to the final stage of polishing. Further, when a soft polishing pad is used in the finishing polish step or the like, pressing the polishing pad against the wafer causes the window to protrude from the polishing surface, and this protruding hard window with no polishing capability may hit the wafer to cause polishing scratches.

As a pad having a window for endpoint detection for solving these problems, a polishing pad is proposed in which the window member is arranged at a position recessed from the polishing surface (Japanese Patent Application Publication No. 2014-104521 (Patent Literature 4) and Japanese Patent Application Publication No. 2002-1652 (Patent Literature 7)).

However, the polishing pad of Patent Literature 4 has a problem that the polishing slurry sinks into the recessed window region, resulting in a decrease in light transmittance. The polishing pad of Patent Literature 7 has a problem that a window groove portion is provided near the light-transmitting window and thus it is possible to promote the discharge of polishing slurry from the upper surface of the light-transmitting window, but the value of light transmittance varies, making accurate optical measurement difficult.

A fourth aspect of the present invention has been made in view of the above, and an object thereof is to provide a polishing pad that can suppress variations in light transmittance.

The fourth aspect of the present invention applies a specific resin to the surface on the polishing surface side of the light-transmitting resin member to suppress large variations in light transmittance between the presence and absence of slurry on the surface of the light-transmitting resin member, making it possible to determine the polishing endpoint more accurately.

The first to fourth aspects of the present inventions provide the following.

[1] A polishing pad including:
- a light-transmitting member; and
- a polishing layer, wherein
- the polishing layer includes a polishing surface for polishing an object to be polished, and the polishing pad includes a through hole penetrating from the polishing surface to an opposite surface thereof,
- the light-transmitting member is arranged so that the light-transmitting member is in the through hole when viewed from the polishing surface side of the polishing pad in a thickness direction of the polishing pad, and
- a water contact angle of a surface on the polishing surface side of the light-transmitting member is 80 degrees or less.

[2] The polishing pad according to [1], wherein a surface of the light-transmitting member opposite to the polishing surface has a water contact angle greater than 80 degrees.

[3] A polishing pad including: a light-transmitting member; and a polishing layer, wherein
- the polishing layer includes a polishing surface for polishing an object to be polished, and the polishing pad includes a through hole penetrating from the polishing surface to an opposite surface thereof,
- the light-transmitting member is arranged so that the light-transmitting member is in the through hole when viewed from the polishing surface side of the polishing pad in a thickness direction of the polishing pad, and
- a surface on the polishing surface side of the light-transmitting member is coated with a hydrophilic resin.

[4] The polishing pad according to [3], wherein the hydrophilic resin is a resin having an ion-bonding hydrophilic group.

[5] The polishing pad according to [4], wherein the resin having an ion-bonding hydrophilic group is a resin having an ion-bonding hydrophilic group in a side chain thereof.

[6] The polishing pad according to [4] or [5], wherein in the resin having an ion-bonding hydrophilic group, a cationic moiety of the ion-bonding hydrophilic group is covalently bonded to a monomer constituting the resin and is ion-bonded to an anionic moiety of the ion-bonding hydrophilic group.

[7] The polishing pad according to any one of [4] to [6], wherein the ion-bonding hydrophilic group contains an ammonium cation.

[8] The polishing pad according to any one of [3] to [7], wherein the resin-coated surface on the polishing surface side of the light-transmitting member has a water contact angle of 50 degrees or less.

[9] A polishing pad including: a light-transmitting resin member; and a polishing layer, wherein
 the polishing layer includes a polishing surface for polishing an object to be polished, and the polishing pad includes a through hole penetrating from the polishing surface to an opposite surface thereof,
 the light-transmitting resin member is arranged so that the light-transmitting resin member is in the through hole when viewed from the polishing surface side of the polishing pad in a thickness direction of the polishing pad, and
 the light-transmitting resin member includes a hydrophilic monomer graft-polymerized on a surface on the polishing surface side thereof

[10] The polishing pad according to [9], wherein the surface on the polishing surface side of the light-transmitting resin member has a water contact angle of 80 degrees or less.

[11] The polishing pad according to [9] or [10], wherein the hydrophilic monomer is an acrylic monomer.

[12] The polishing pad according to [11], wherein the resin with a grafted surface includes an ion complex formed using a complex-forming polymer selected from polyethylene glycol, polyvinylpyrrolidone, polyxylylviologen, polyethyleneimine, polyvinyl pyridinium chloride, and polyvinyl benzyltrimethylammonium chloride.

[13] A polishing pad including: a light-transmitting resin member; and a polishing layer, wherein
 the polishing layer includes a polishing surface for polishing an object to be polished, and the polishing pad includes a through hole penetrating from the polishing surface to an opposite surface thereof,
 the light-transmitting resin member is arranged so that the light-transmitting resin member is in the through hole when viewed from the polishing surface side of the polishing pad in a thickness direction of the polishing pad, and
 the light-transmitting resin member includes, at least on a surface on the polishing surface side thereof, a resin containing a structural unit derived from a polyfunctional (meth)acrylate monomer having two or more polymerizable functional groups and having a —$C_{2-4}$ alkylene-O— unit.

[14] The polishing pad according to [13], wherein the polyfunctional (meth)acrylate monomer is at least one selected from the group consisting of the following:
 a monomer in which a compound having a —$C_{2-4}$ alkylene-O— unit and (meth)acrylic acid are ester-bonded; and
 a monomer in which a trihydric or higher alcohol having a $C_{2-4}$ alkylene oxide added thereto and (meth)acrylic acid are ester-bonded.

[15] The polishing pad according to [14], wherein the trihydric or higher alcohol is selected from the group consisting of glycerin, diglycerin, triglycerin, trimethylolpropane, ditrimethylolpropane, erythritol, pentaerythritol, and dipentaerythritol.

[16] The polishing pad according to any one of to [15], wherein the —$C_{2-4}$ alkylene-unit is derived from ethylene oxide and/or propylene oxide.

[17] The polishing pad according to any one of to [16], wherein the polyfunctional (meth)acrylate monomer is at least one selected from the group consisting of polyethylene glycol diacrylate, polypropylene glycol diacrylate, ethoxylated pentaerythritol tetraacrylate, propoxylated pentaerythritol tetraacrylate, ethoxylated glycerin triacrylate, propoxylated glycerin triacrylate, ethoxylated trimethylolpropane triacrylate, and propoxylated trimethylolpropane triacrylate.

[18] The polishing pad according to any one of [1] to [17], wherein when the polishing surface is an upper surface and the opposite surface thereof is a lower surface, the surface on the polishing surface side of the light-transmitting resin member is lower than the polishing surface.

[19] The polishing pad according to [1] to [18], wherein the polishing surface includes a groove, and when the polishing surface is an upper surface and the opposite surface thereof is a lower surface, a top portion of the light-transmitting member is at the same level as or lower than a bottom portion of the groove.

[20] The polishing pad according to any one of [1] to [19], wherein
 when the through hole of the polishing layer is a first through hole, the polishing pad further includes an additional layer having a second through hole having a smaller equivalent circle diameter than the first through hole,
 the additional layer is located opposite the polishing surface of the polishing layer,
 when the polishing pad is viewed in the thickness direction from the polishing surface side, the first through hole and the second through hole at least partially overlap each other, and
 the light-transmitting member is arranged so that the light-transmitting member is in the first through hole, when viewed from the polishing surface side of the polishing pad in the thickness direction of the polishing pad.

In addition, the first aspect of the present invention provides the following.

[1-1] A polishing pad including:
 a light-transmitting member; and
 a polishing layer, wherein
 the polishing layer includes a polishing surface for polishing an object to be polished, and the polishing pad includes a through hole penetrating from the polishing surface to an opposite surface thereof,
 the light-transmitting member is arranged so that the light-transmitting member is in the through hole when viewed from the polishing surface side of the polishing pad in a thickness direction of the polishing pad, and
 a water contact angle of a surface on the polishing surface side of the light-transmitting member is 80 degrees or less.

[1-2] The polishing pad according to [1-1], wherein when the polishing surface is an upper surface and the opposite surface thereof is a lower surface, the top portion of the light-transmitting member is lower than the polishing surface.

[1-3] The polishing pad according to [1] or [1-2], wherein a surface of the light-transmitting member opposite to the polishing surface has a water contact angle greater than 80 degrees.

[1-4] The polishing pad according to any one of [1-1] to [1-3], wherein the visible light transmittance when the light-transmitting member is irradiated with light having a wavelength of 380 nm to 780 nm is 60% or more.

[1-5] The polishing pad according to any one of [1-1] to [1-4], wherein the polishing surface has a groove.

[1-6] The polishing pad according to [1-5], wherein the groove is an embossed groove.

[1-7] The polishing pad according to [1-5] or [1-6], wherein when the polishing surface is an upper surface and the opposite surface thereof is a lower surface, the top portion of the light-transmitting member is at the same level as or lower than a bottom portion of the groove.

[1-8] The polishing pad according to any one of [1-1] to [1-7], wherein the through hole has a circular shape when viewed from the polishing surface side of the polishing pad in a thickness direction of the polishing pad.

[1-9] The polishing pad according to any one of [1-1] to [1-8], wherein when the through hole of the polishing layer is a first through hole, the polishing pad further includes an additional layer having a second through hole having a smaller equivalent circle diameter than the first through hole, the additional layer is located opposite the polishing surface of the polishing layer, when the polishing pad is viewed in the thickness direction from the polishing surface side, the first through hole and the second through hole at least partially overlap each other, and the light-transmitting member is arranged so that the light-transmitting member is in the first through hole, when viewed from the polishing surface side of the polishing pad in the thickness direction of the polishing pad.

[1-10] A method for manufacturing the polishing pad according to any one of [1-1] to [1-9], including the steps of:

preparing a polishing layer and a light-transmitting member having a water contact angle of 80 degrees or less on at least one surface thereof;

providing a through hole in the polishing layer; and arranging the light-transmitting member so that the light-transmitting member is in the through hole when viewed from the polishing surface side of the polishing pad in a thickness direction of the polishing pad, where it is arranged so that the one surface of the light-transmitting member faces the polishing surface.

In addition, the second aspect of the present invention provides the following.

[2-1] A polishing pad including:

a light-transmitting member; and a polishing layer, wherein the polishing layer includes a polishing surface for polishing an object to be polished, and the polishing pad includes a through hole penetrating from the polishing surface to an opposite surface thereof, the light-transmitting member is arranged so that the light-transmitting member is in the through hole when viewed from the polishing surface side of the polishing pad in a thickness direction of the polishing pad, and the surface on the polishing surface side of the light-transmitting member is coated with a hydrophilic resin.

[2-2] The polishing pad according to [2-1], wherein the hydrophilic resin is a resin having an ion-bonding hydrophilic group.

[2-3] The polishing pad according to [2-2], wherein the resin having an ion-bonding hydrophilic group is a resin having an ion-bonding hydrophilic group in a side chain thereof.

[2-4] The polishing pad according to [2-2] or [2-3], wherein in the resin having an ion-bonding hydrophilic group, a cationic moiety of the ion-bonding hydrophilic group is covalently bonded to a monomer constituting the resin and is ion-bonded to an anionic moiety of the ion-bonding hydrophilic group.

[2-5] The polishing pad according to any one of [2-2] to [2-4], wherein the ion-bonding hydrophilic group contains an ammonium cation.

[2-6] The polishing pad according to any one of [2-1] to [2-5], wherein the resin-coated surface on the polishing surface side of the light-transmitting member has a water contact angle of 50 degrees or less.

[2-7] The polishing pad according to any one of [2-1] to [2-6], wherein the polishing surface has a groove.

[2-8] The polishing pad according to [2-7], wherein the groove is an embossed groove.

[2-9] The polishing pad according to [2-7] or [2-8], wherein when the polishing surface is an upper surface and the opposite surface thereof is a lower surface, the top portion of the light-transmitting member coated with the resin is at the same level as or lower than a bottom portion of the groove.

[2-10] The polishing pad according to any one of [2-1] to [2-9], wherein the through hole has a circular shape when viewed from the polishing surface side of the polishing pad in a thickness direction of the polishing pad.

[2-11] The polishing pad according to any one of [2-1] to [2-10], wherein when the through hole of the polishing layer is a first through hole, the polishing pad further includes an additional layer having a second through hole having a smaller equivalent circle diameter than the first through hole, the additional layer is located opposite the polishing surface of the polishing layer, when the polishing pad is viewed in the thickness direction from the polishing surface side, the first through hole and the second through hole at least partially overlap each other, and the light-transmitting member is arranged so that the light-transmitting member is in the first through hole, when viewed from the polishing surface side of the polishing pad in the thickness direction of the polishing pad.

[2-12] A method for manufacturing the polishing pad according to any one of [2-1] to [2-11], including the steps of:

preparing a light-transmitting member having at least one surface coated with a hydrophilic resin and a polishing layer;

providing a through hole in the polishing layer; and arranging the light-transmitting member so that the light-transmitting member is in the through hole when viewed from the polishing surface side of the polishing pad in a thickness direction of the polishing pad, where it is arranged so that the coating surface of the light-transmitting member faces the polishing surface.

In addition, the third aspect of the present invention provides the following.

[3-1] A polishing pad including:

a light-transmitting resin member; and a polishing layer, wherein the polishing layer includes a polishing surface for polishing an object to be polished, and the polishing pad includes a through hole penetrating from the polishing surface to an opposite surface thereof, the light-transmitting resin member is arranged so that the light-transmitting resin member is in the through hole when viewed from the polishing surface side of the polishing pad in a thickness direction of the polishing pad, and the light-transmitting resin member includes a hydrophilic monomer graft-polymerized on the surface on the polishing surface side thereof

[3-2] The polishing pad according to [3-1], wherein the surface on the polishing surface side of the light-transmitting resin member has a water contact angle of 80 degrees or less.

[3-3] The polishing pad according to [1] or [2], wherein the hydrophilic monomer is an acrylic monomer.

[3-4] The polishing pad according to [3-3], wherein the resin with a grafted surface includes an ion complex formed using a complex-forming polymer selected from polyethylene glycol, polyvinylpyrrolidone, polyxylylviologen, polyethyleneimine, and polyvinyl pyridinium chloride.

[3-5] The polishing pad according to any one of [3-1] to [3-4], wherein when the polishing surface is an upper surface and the opposite surface thereof is a lower surface, the grafted surface of the light-transmitting resin member is lower than the polishing surface.

[3-6] The polishing pad according to any one of [3-1] to [3-5], wherein the polishing surface has a groove.

[3-7] The polishing pad according to [3-6], wherein the groove is an embossed groove.

[3-8] The polishing pad according to [3-6] or [3-7], wherein when the polishing surface is an upper surface and the opposite surface thereof is a lower surface, the grafted surface of the light-transmitting resin member is at the same level as or lower than a bottom portion of the groove.

[3-9] The polishing pad according to any one of [3-1] to [3-8], wherein the through hole has a circular shape when viewed from the polishing surface side of the polishing pad in a thickness direction of the polishing pad.

[3-10] The polishing pad according to any one of [3-1] to [3-9], wherein when the through hole of the polishing layer is a first through hole, the polishing pad further includes an additional layer having a second through hole having a smaller equivalent circle diameter than the first through hole, the additional layer is located opposite the polishing surface of the polishing layer, when the polishing pad is viewed in the thickness direction from the polishing surface side, the first through hole and the second through hole at least partially overlap each other, and the light-transmitting resin member is arranged so that the light-transmitting resin member is in the first through hole, when viewed from the polishing surface side of the polishing pad in the thickness direction of the polishing pad.

[3-11] A method for manufacturing the polishing pad according to any one of [3-1] to [3-10] including the steps of:

preparing a polishing layer and a light-transmitting resin member having at least one surface graft-polymerized with a hydrophilic monomer;

providing a through hole in the polishing layer; and arranging the light-transmitting resin member so that the light-transmitting resin member is in the through hole when viewed from the polishing surface side of the polishing pad in a thickness direction of the polishing pad, where it is arranged so that the grafted surface of the light-transmitting resin member faces the polishing surface.

[3-12] The manufacturing method according to [3-11], further including the step of plasma-grafting the at least one surface of the light-transmitting resin member.

In addition, the fourth aspect of the present invention provides the following.

[4-1] A polishing pad including: a light-transmitting resin member; and a polishing layer, wherein the polishing layer includes a polishing surface for polishing an object to be polished, and the polishing pad includes a through hole penetrating from the polishing surface to an opposite surface thereof, the light-transmitting resin member is arranged so that the light-transmitting resin member is in the through hole when viewed from the polishing surface side of the polishing pad in a thickness direction of the polishing pad, and the light-transmitting resin member includes, at least on the surface on the polishing surface side thereof, a resin containing a structural unit derived from a polyfunctional (meth)acrylate monomer having two or more polymerizable functional groups and having a —$C_{2-4}$ alkylene-O— unit.

[4-2] The polishing pad according to [4-1], wherein the polyfunctional (meth)acrylate monomer is at least one selected from the group consisting of the following:

a monomer in which a compound having a —$C_{2-4}$ alkylene-O— unit and (meth)acrylic acid are ester-bonded; and a monomer in which a trihydric or higher alcohol having a $C_{2-4}$ alkylene oxide added thereto and (meth)acrylic acid are ester-bonded.

[4-3] The polishing pad according to [4-2], wherein the trihydric or higher alcohol is selected from the group consisting of glycerin, diglycerin, triglycerin, trimethylolpropane, ditrimethylolpropane, erythritol, pentaerythritol, and dipentaerythritol.

[4-4] The polishing pad according to any one of [4-1] to [4-3], wherein the —$C_{2-4}$ alkylene-unit is derived from ethylene oxide and/or propylene oxide.

[4-5] The polishing pad according to any one of [4-1] to [4-4], wherein the polyfunctional (meth)acrylate monomer is at least one selected from the group consisting of polyethylene glycol diacrylate, polypropylene glycol diacrylate, ethoxylated pentaerythritol tetraacrylate, propoxylated pentaerythritol tetraacrylate, ethoxylated glycerin triacrylate, propoxylated glycerin triacrylate, ethoxylated trimethylolpropane triacrylate, and propoxylated trimethylolpropane triacrylate.

[4-6] The polishing pad according to any one of [4-1] to [4-5], wherein when the polishing surface is an upper surface and the opposite surface thereof is a lower surface, the surface on the polishing surface side of the light-transmitting resin member is lower than the polishing surface.

[4-7] The polishing pad according to any one of [4-1] to [4-6], wherein the polishing surface has a groove.

[4-8] The polishing pad according to [4-7], wherein the groove is an embossed groove.

[4-9] The polishing pad according to [4-7] or [4-8], wherein when the polishing surface is an upper surface and the opposite surface thereof is a lower surface, the surface on the polishing surface side of the light-transmitting resin member is at the same level as or higher than a bottom portion of the groove.

[4-10] The polishing pad according to any one of [4-1] to [4-9], wherein the through hole has a circular shape when viewed from the polishing surface side of the polishing pad in a thickness direction of the polishing pad.

[4-11] The polishing pad according to any one of [4-1] to [4-10], wherein when the through hole of the polishing layer is a first through hole, the polishing pad further includes an additional layer having a second through hole having a smaller equivalent circle diameter than the first through hole, the additional layer is located opposite the polishing surface of the polishing layer, when the polishing pad is viewed in the thickness direction from the polishing surface side, the first through hole and the second through hole at least partially overlap each other, and the light-transmitting resin member is arranged so that the light-transmitting resin member is in the first through hole, when viewed from the polishing surface side of the polishing pad in the thickness direction of the polishing pad.

[4-12] A method for manufacturing the polishing pad according to any one of [4-1] to [4-11], including the steps of:

preparing a polishing layer and a light-transmitting resin member including, on at least one surface, a resin containing a structural unit derived from a polyfunctional (meth)acrylate monomer having two or more polymerizable functional groups and having a —$C_{2-4}$ alkylene-O— unit;

providing a through hole in the polishing layer; and arranging the light-transmitting resin member so that the light-transmitting resin member is in the through hole when viewed from the polishing surface side of the polishing pad in a thickness direction of the polishing pad, where it is arranged so that the surface of the light-transmitting resin member having the resin containing a structural unit derived from a polyfunctional (meth)acrylate monomer faces the polishing surface.

Advantageous Effects of Invention

According to the first aspect of the present invention, it is possible to provide a polishing pad that can suppress variations in light transmittance. This makes it possible to determine the polishing endpoint with high accuracy.

According to the second aspect of the present invention, it is possible to provide a polishing pad that can suppress variations in light transmittance. This makes it possible to determine the polishing endpoint with high accuracy.

According to the third aspect of the present invention, it is possible to provide a polishing pad that can reduce adhesion and sticking of polishing swarf to the surface on the polishing surface side of the light-transmitting resin member (window member). This enables stable optical detection.

According to the fourth aspect of the present invention, it is possible to provide a polishing pad that can suppress variations in light transmittance. This makes it possible to determine the polishing endpoint with high accuracy.

DESCRIPTION OF EMBODIMENTS

Hereinafter, embodiments for carrying out the present invention are described.

<<Polishing Pad of First Aspect>>

A polishing pad of a first aspect of the present invention is a polishing pad including: a light-transmitting member; and a polishing layer, wherein the polishing layer includes a polishing surface for polishing an object to be polished, and the polishing pad includes a through hole penetrating from the polishing surface to an opposite surface thereof, the light-transmitting member is arranged so that the light-transmitting member is in the through hole when viewed from the polishing surface side of the polishing pad in a thickness direction of the polishing pad, and a water contact angle of a surface on the polishing surface side of the light-transmitting member is 80 degrees or less.

In the present specification and the claims, the polishing layer is a layer that has a surface (polishing surface) to be brought into contact with an object to be polished, including semiconductor devices and other objects to be polished. The object to be polished is not particularly limited, and examples thereof include product substrates including multiple memory dies or processor dies, test substrates, bare substrates, and gate substrates. The substrate can be one at various stages of integrated circuit manufacturing, and for example, the substrate can be a bare wafer or can be one or more deposited and/or patterned layers.

<Light-Transmitting Member>

The polishing pad of the first aspect of the present invention includes a light-transmitting member, that is, a window member. By irradiating the object to be polished with light through the light-transmitting member, it is possible to detect when the object to be polished reaches the desired surface characteristics and planarity. A visible light (white light) laser, lamp, or the like is used for optical endpoint detection.

Figure 1:
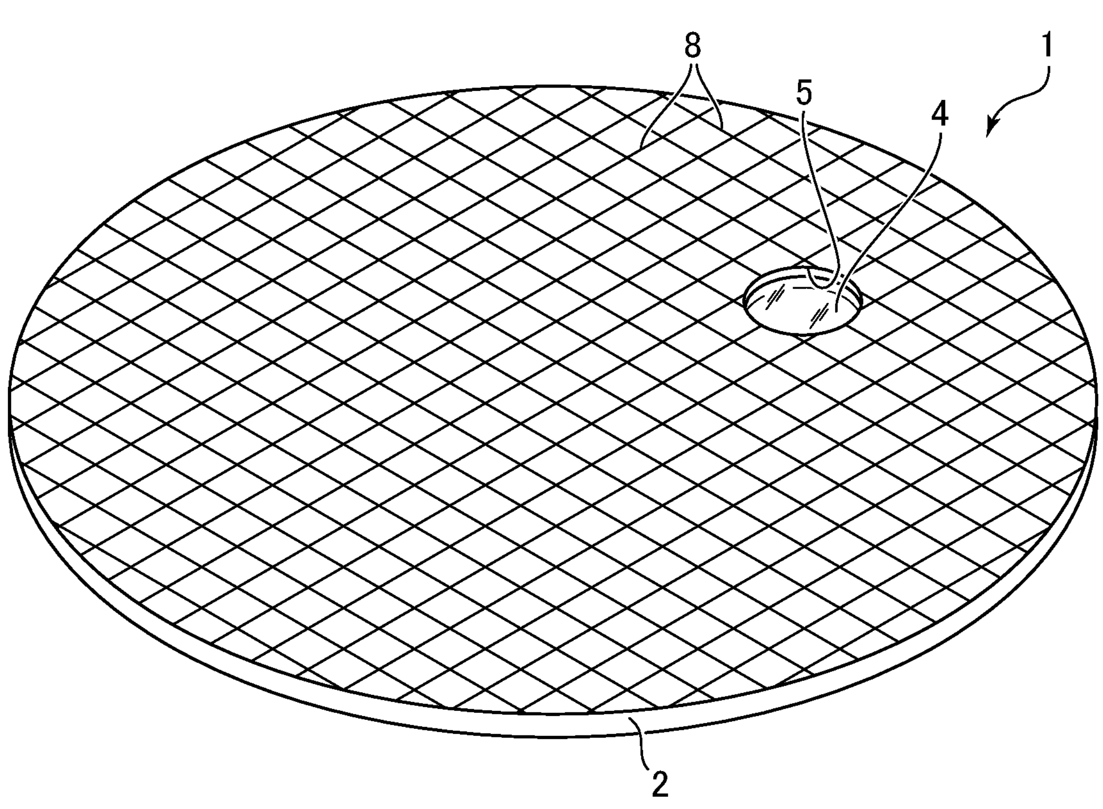
FIG. 1 is a perspective view of a polishing pad according to an embodiment of the present invention, viewed from the polishing surface in the thickness direction.
Figure 2A:
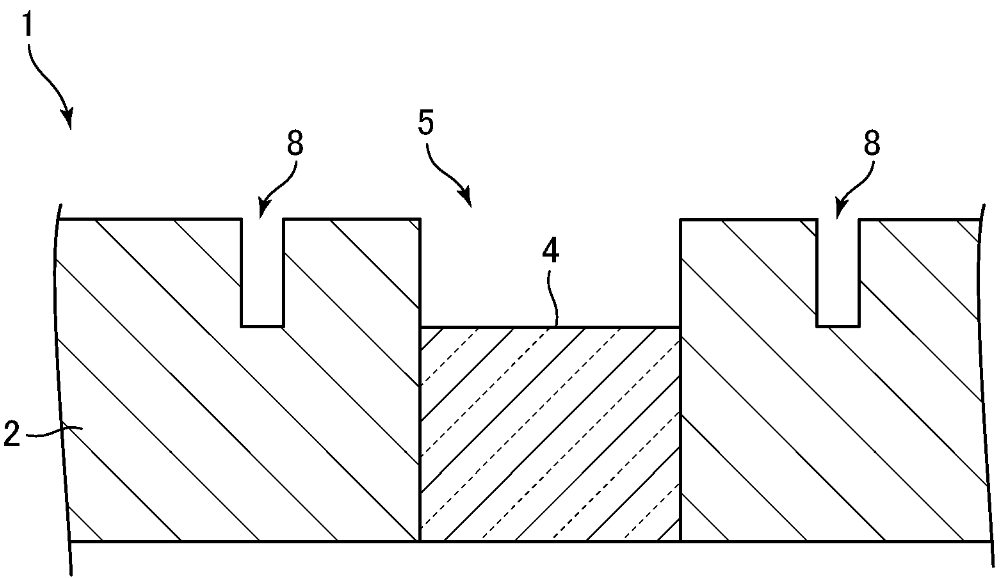
FIG. 2A is a schematic cross-sectional view (cut end surface) in the thickness direction of a polishing pad according to an embodiment of the present invention.
Figure 3A:
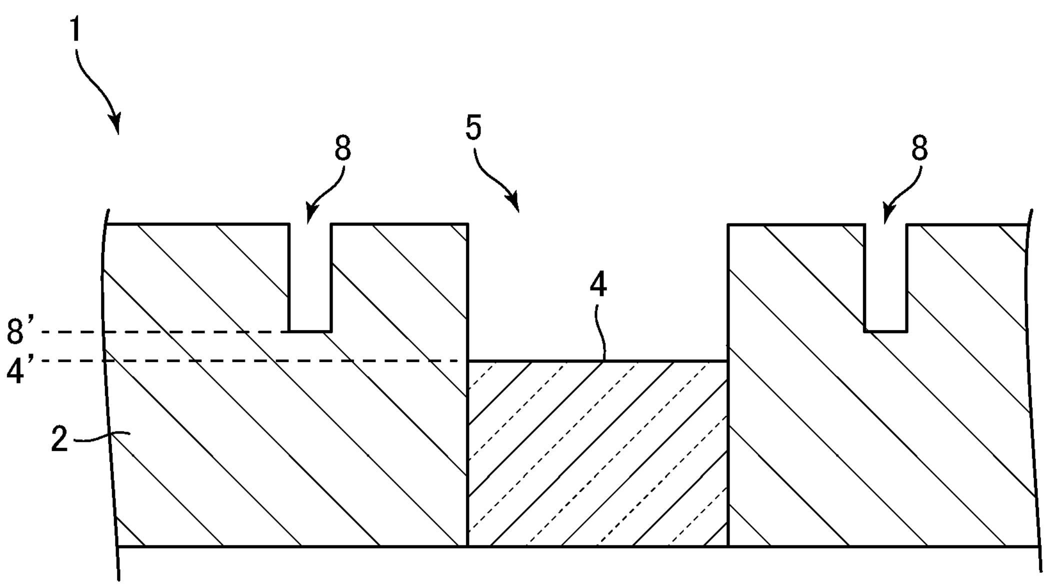
FIG. 3A is a schematic cross-sectional view (cut end surface) in the thickness direction of a polishing pad according to an embodiment of the present invention.
Figure 4A:
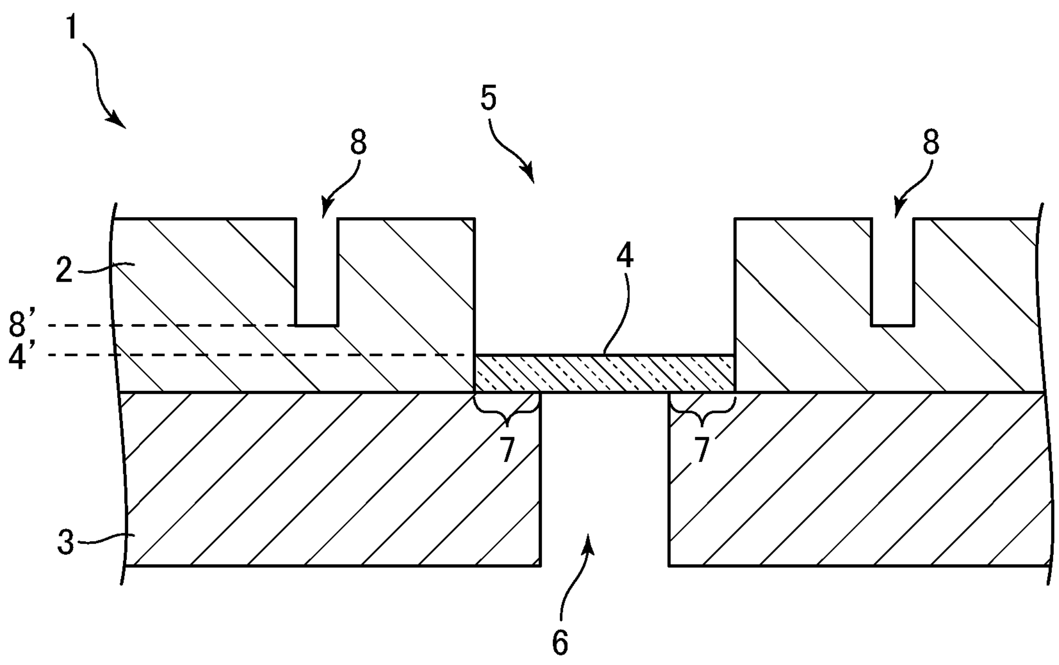
FIG. 4A is a schematic cross-sectional view (cut end surface) in the thickness direction of a polishing pad according to an embodiment of the present invention.
Figure 5A:
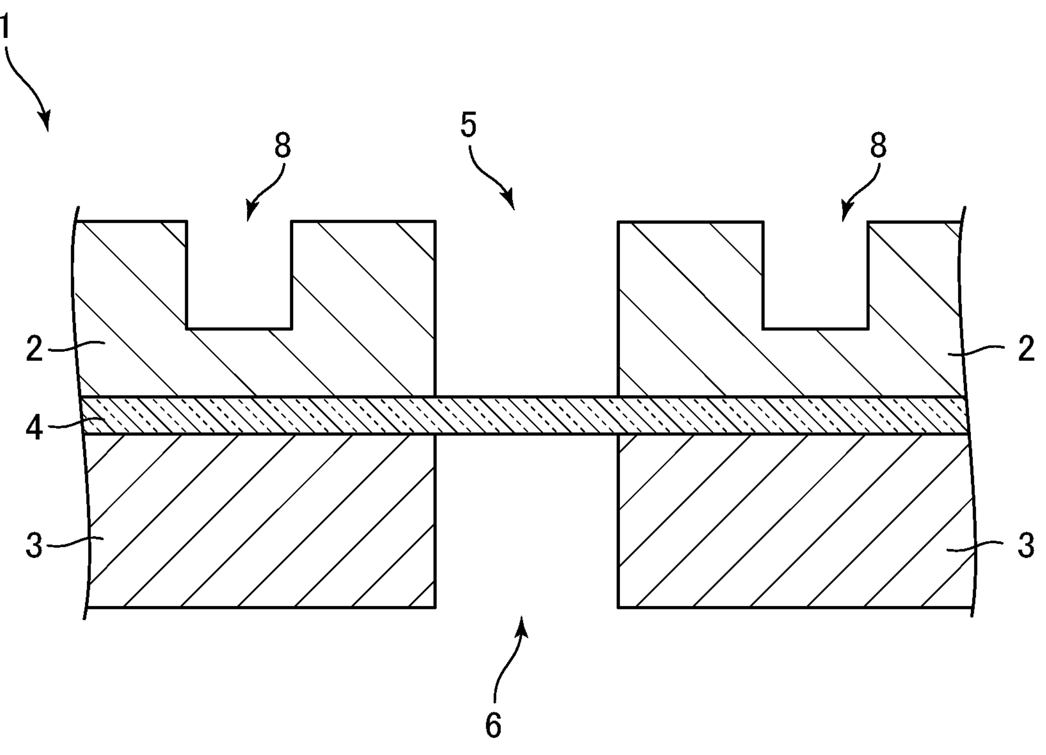
FIG. 5A is a schematic cross-sectional view (cut end surface) in the thickness direction of a polishing pad according to an embodiment of the present invention.
Figure 6A:
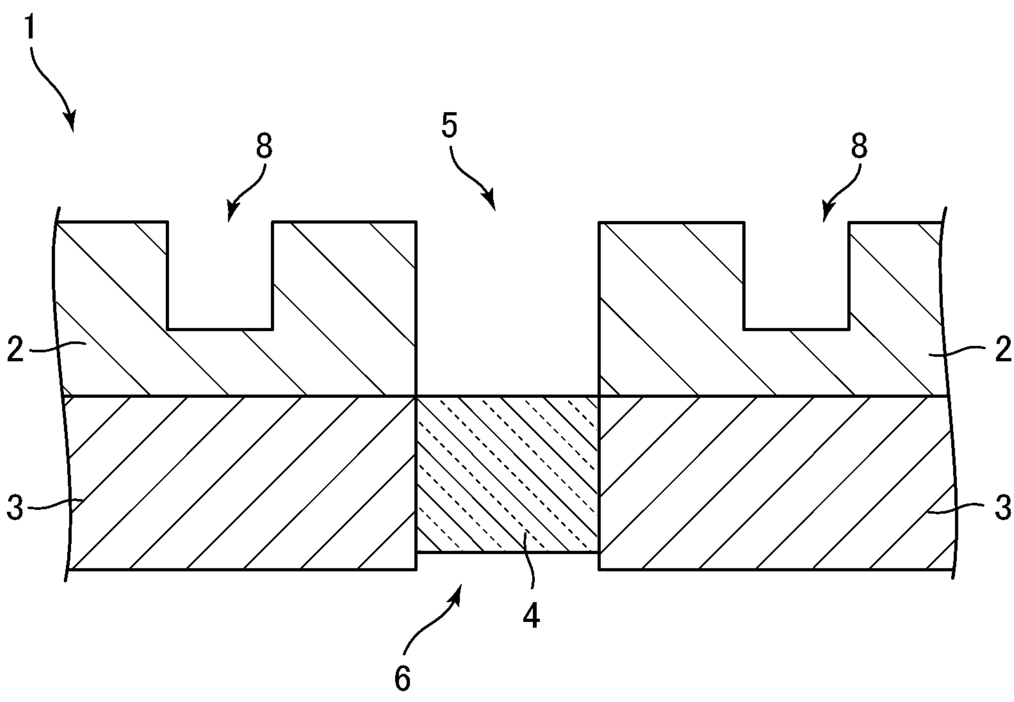
FIG. 6A is a schematic cross-sectional view (cut end surface) in the thickness direction of a polishing pad according to an embodiment of the present invention.

The light-transmitting member is arranged so that the light-transmitting member is in the through hole when viewed from the polishing surface side of the polishing pad in a thickness direction of the polishing pad. Here, the phrase "arranged so that the light-transmitting member is in the through hole when viewed from the polishing surface side of the polishing pad in a thickness direction of the polishing pad" is intended to mean that the light-transmitting member is arranged so that it can be seen when the inside of the through hole is viewed in the thickness direction from the polishing surface of the polishing pad, and is a concept that includes (1) the case where, as shown in FIGS. 2A and 3A, the light-transmitting member is arranged in contact with (or adhering to) the side surface (side wall) of the through hole provided in the polishing layer, (2) the case where, as shown in FIG. 4A, an additional layer having a through hole having a smaller equivalent circle diameter than the equivalent circle diameter of the through hole of the polishing layer is provided under the polishing layer, and the light-transmitting member is arranged on an exposed portion 7 resulting from the difference in size between the through hole of the polishing layer and the through hole of the additional layer, (3) the case where, as shown in FIG. 5A, the light-transmitting member is sandwiched between the polishing layer and the additional layer, and is arranged such that a portion of the light-transmitting member is exposed in the through hole, and (4) the case where, as shown in FIG. 6A, a through hole is provided in each of the polishing layer and the additional layer, and the light-transmitting member is arranged in contact with (or adhering to) the side surface of one or both of the through holes. Among these, (1), (2), or (4) is preferred, (1) or (2) is more preferred, and (2) is even more preferred.

The light-transmitting member is preferably a transparent resin member. The transparent resin member is not particularly limited as long as it is transparent enough to transmit light, and examples thereof that can be used include thermosetting resins such as polyurethane resins, polyester resins, phenolic resins, urea resins, melamine resins, epoxy resins, and acrylic resins, thermoplastic resins such as polyurethane resins, polyester resins, polyamide resins, cellulose-based resins, acrylic resins, polycarbonate resins, halogen-based resins (such as polyvinyl chloride, polytetrafluoroethylene, and polyvinylidene fluoride), polystyrene resins, and olefin resins (such as polyethylene and polypropylene), rubbers such as butadiene rubber and isoprene rubber, photocurable resins that cure with light such as ultraviolet rays and electron beams, and photosensitive resins. Among these, acrylic resins, polyurethane resins, polyester resins, and polystyrene resins are preferred, and acrylic resins are more preferred.

In the light-transmitting member, the surface on the polishing surface side is preferably subjected to hydrophilic treatment. In the light-transmitting member, not only the surface on the polishing surface side but also the surface opposite the polishing surface (back surface) and the side surface may be subjected to hydrophilic treatment, but hydrophilizing the back surface and side surface as well leads to an increase in cost, and hydrophilizing the back surface and side surface has nothing to do with the effects of the present invention, so that only the surface on the polishing surface is preferably subjected to hydrophilic treatment. By subjecting the surface on the polishing surface side to hydrophilic treatment, it becomes easy to obtain a light-transmitting member having a water contact angle of 80 degrees or less on the polishing surface side.

Examples of the means for hydrophilic treatment include physicochemical treatments such as plasma treatment and ultraviolet irradiation treatment, mechanical treatments such as roll blasting treatment and embossing treatment, and chemical treatments such as chemical agent treatment and surface grafting treatment. Among these, plasma treatment or roll blasting treatment is preferred, and plasma treatment is more preferred.

Plasma treatment is the process of striking a material surface with a plasma beam emitted from a rod called an electrode using a high voltage power supply. On the surface of the material, ions and electrons emitted by the beam break the chemical bonds of the molecules on the resin surface, generating hydrophilic functional groups (such as OH (hydroxyl group), CO (carbonyl group), and COOH (carboxyl group)) according to the type of resin.

Roll blasting treatment is a process in which a roll with abrasive grains is rotated at high speed to modify the surface.

In the polishing pad of the first aspect of the present invention, when the polishing surface is an upper surface and the opposite surface thereof is a lower surface, the top portion of the light-transmitting member may be at the same height as the polishing surface or lower than the polishing surface, but preferably lower than the polishing surface (FIG. 2A). Since the top portion of the light-transmitting member is lower than the polishing surface, it is possible to prevent the occurrence of polishing scratches due to the light-transmitting member being harder than the polishing layer. Also, if the top portion of the light-transmitting member is lower than the polishing surface, slurry enters the concave portion surrounded by the light-transmitting member and the side surface of the through hole, and most of it moves to the side surface of the through hole due to centrifugal force and is discharged through the groove, so that the odds are even that a small amount of slurry may remain on the surface of the light-transmitting member. However, in the case of using a conventional polishing pad, the light transmittance differs depending on whether or not a small amount of slurry remains on the light-transmitting member, so that it is difficult to determine the polishing endpoint with high accuracy. Meanwhile, the polishing pad of the first aspect of the present invention has good compatibility with slurry because the surface of the light-transmitting member is rendered hydrophilic. For this reason, even if a small amount of slurry is present, it spreads uniformly on the window surface, thereby reducing fluctuations in light transmittance from the initial stage of polishing to the end. Therefore, even when the top portion of the light-transmitting member is at a level lower than the polishing surface, in particular, even the top portion 4' of the light-transmitting member is at the same level as or lower than the bottom portion 8' of the groove, it is possible to determine the polishing endpoint with high accuracy.

(Water Contact Angle)

In the polishing pad of the first aspect of the present invention, the water contact angle of a surface on the polishing surface side of the light-transmitting member is 80 degrees or less. The water contact angle is preferably 5 to 80 degrees, more preferably to 50 degrees, even more preferably 5 to 30 degrees, and even more preferably 5 to 20 degrees. When the water contact angle is within the above range, it is possible to suppress variations in light transmittance caused by the presence or absence of slurry on the surface of the light-transmitting member. This makes it possible to determine the polishing endpoint with higher accuracy.

Window members used in conventional polishing pads generally have a water contact angle greater than 80 degrees. If a window with a hydrophilicity of 80 degrees or less is used, the slurry may swell and deform the window, causing the window to peel off the polishing area or cause slurry leakage. Therefore, the window member is preferably hydrophobic with a water contact angle of greater than 80 degrees, and in the present invention, it is preferable to subject only the surface on the polishing surface side thereof to hydrophilic treatment so that the water contact angle is 80 degrees or less. In the present invention, there is no particular limitation on the method in which the water contact angle of the surface on the polishing surface side of the light-transmitting member is set to 80 degrees or less, but it is preferable to use a material whose surface on the polishing surface side is subjected to hydrophilic treatment so that the surface on the polishing surface side has a water contact angle of 80 degrees or less. Examples of hydrophilic treatment means include those described above.

As for the light-transmitting member, it suffices that the water contact angle of the surface on the polishing surface side is 80 degrees or less, and the water contact angle of the back surface and the side surface is not particularly limited. Therefore, the water contact angles of the back surface and the side surface may be greater than 80 degrees. That is, the back surface and the side surface of the light-transmitting member do not have to be subjected to hydrophilic treatment.

(Transmittance)

In the polishing pad of the first aspect of the present invention, the visible light transmittance (sometimes simply referred to as light transmittance in the present specification) when the light-transmitting member is irradiated with light having a wavelength of 380 nm to 780 nm is preferably 60% or more, more preferably 62% or more, even more preferably 65% or more, even more preferably 70% or more, even more preferably 75% or more, even more preferably 80% or more, and even more preferably 85% or more.

In the polishing pad of the first aspect of the present invention, the light transmittance when water is adhered to the surface of the light-transmitting member is preferably 60% or more, more preferably 62% or more, even more preferably 65% or more, even more preferably 70% or more, even more preferably 75% or more, and even more preferably 80% or more.

In the polishing pad of the first aspect of the present invention, the light transmittance when water is not adhered to the surface of the light-transmitting member is preferably 60% or more, more preferably 62% or more, even more preferably 65% or more, even more preferably 70% or more, even more preferably 75% or more, even more preferably 80% or more, and even more preferably 85% or more.

In the polishing pad of the first aspect of the present invention, the difference between the light transmittance when water is not adhered to the surface of the light-transmitting member and the light transmittance when water is adhered to the surface of the light-transmitting member is preferably 30% or less, more preferably 20% or less, even more preferably 15% or less, even more preferably 10% or less, even more preferably 8% or less, even more preferably 6% or less, and even more preferably 5% or less. When the difference in light transmittance is within the above range, differences in light transmittance between the presence and absence of slurry on the surface of the light-transmitting member are less likely to occur, making it possible to determine the polishing endpoint with high accuracy.

The light transmittance can be obtained by measuring the transmission spectrum at a wavelength of 300 to 1000 nm with a spectrophotometer and obtaining it as visible light transmittance (%) according to Japanese Industrial Standards (JIS A5759: 2008). That is, the transmittance is obtained by measuring the transmittance of each wavelength in the wavelength range of 380 to 780 nm, and multiplying the transmittance at each wavelength by the weighted coefficient obtained from the spectral distribution of CIE (Commission Internationale de l'Eclairage) illuminant D65, the wavelength distribution of the CIE photopic normalized luminous efficiency, and the wavelength interval to perform weighted averaging.

Also, the light transmittance when water is adhered to the surface of the light-transmitting member can be measured as follows. A sufficient amount of water (for example, about 0.01 to 0.03 mL for a light-transmitting member cut into a size of 9 mmx 50 mm) is adhered by spraying to the entire surface on the polishing surface side of the light-transmitting member, and then the light-transmitting member is allowed to stand perpendicularly to the ground for 60 seconds to drain moisture from the light-transmitting member.

(Through Hole)

A through hole is a hole penetrating from the polishing surface to the opposite surface thereof when viewed from the polishing surface side of the polishing pad in a thickness direction of the polishing pad. The through hole preferably penetrates the polishing layer parallel to the thickness direction or perpendicular to the polishing surface.

One through hole may be provided in the polishing layer, or two or more separate, individual through holes may be provided therein.

The shape of the through hole when viewed from the polishing surface side of the polishing pad in a thickness direction of the polishing pad or the shape of the through hole in the polishing surface includes circular, elliptical, triangular, quadrangular, hexagonal, octagonal, and the like. Alternatively, it may be a shape formed by multiple identical or different shapes partially overlapping each other. Among these, a circular shape is preferable because it has no corners where polishing swarf tends to accumulate.

(Equivalent Circle Diameter)

In the present specification and the claims, an equivalent circle diameter is the diameter of a perfect circle corresponding to the area of the figure to be measured. The equivalent circle diameter of a through hole is the equivalent circle diameter of the through hole when viewed from the polishing surface side of the polishing pad in a thickness direction of the polishing pad, and corresponds to the diameter when the through hole has a circular shape when viewed from the polishing surface side of the polishing pad in a thickness direction of the polishing pad.

The equivalent circle diameter of the through hole is not particularly limited, but is preferably 5 to 40 mm, more preferably 5 to 30 mm, and even more preferably 10 to 28 mm.

Also, the area of the through hole in the polishing surface is preferably 0.003 to more preferably 0.004 to 0.4%, and even more preferably 0.003 to 0.3%, based on the total area of the polishing surface.

(Structure of Polishing Layer)

Examples of resins constituting the polishing layer include polyurethane-based resins such as polyurethane and polyurethane polyurea; acrylic resins such as polyacrylate and polyacrylonitrile; vinyl-based resins such as polyvinyl chloride, polyvinyl acetate, and polyvinylidene fluoride; polysulfone-based resins such as polysulfone and polyethersulfone; acylated cellulose-based resins such as acetylated cellulose and butyrylated cellulose; polyamide-based resins; and polystyrene-based resins. Among these, polyurethane resins are more preferable in consideration of compression characteristics and flexibility.

The polishing layer may be composed of one type of resin, or may be composed of two or more types of resins.

Further, the polishing layer preferably has open cells. The term "open cells" as used herein refers to foams having spaces formed when adjacent cells are connected to each other by communicating holes. Specifically, it may be a resin obtained by the wet film-forming method, or a foam obtained by dry molding or injection molding. The wet film-forming method is preferable, and good bending and stretching motion can be expected.

In the present specification, a resin formed by the wet film-forming method means a resin (preferably polyurethane resin) formed by the wet film-forming method. The wet film-forming method is a method in which a film-forming resin is dissolved in an organic solvent, and the resin solution is applied to a sheet-shaped substrate, and then passed through a coagulation liquid to solidify the resin. Wet film-formed resins generally have multiple teardrop-shaped cells (anisotropic shapes that have a structure with a larger diameter from the polishing surface to the bottom of the polishing pad). Therefore, wet film-formed resins can be rephrased as resins having multiple teardrop-shaped cells. The multiple teardrop-shaped cells are preferably in the form of open cells.

(Groove)

The polishing pad of the first aspect of the present invention preferably has a groove in the polishing surface of the polishing layer. The groove does not penetrate the polishing layer, and can be distinguished from the through hole.

Examples of grooves include embossed grooves obtained by embossing a polishing surface and cut grooves obtained by cutting with a cutting tool. Among these, embossed grooves are preferred. By providing grooves such as embossed grooves, it is possible to obtain a polishing pad that is less likely to have burrs on the polishing surface and is suitable for final polishing.

The depth of the groove is not particularly limited as long as it is smaller than the thickness of the polishing layer, but it is preferably 50 to 90%, more preferably 60 to 80%, of the thickness of the polishing layer. If the groove disappears due to the polishing of the object to be polished, the flow dischargeability on the polishing slurry is lost and the polishing performance deteriorates, reaching the life of the polishing pad. It is therefore preferable that the groove depth is deep. On the other hand, in order to increase the groove depth of the embossed groove, it is necessary to raise the working pressure or raise the working temperature, which may cause deformation of the base material (PET) on the back surface of the polishing layer or deterioration of the surface of the polishing layer. These problems are less likely to occur when the depth of the groove is within the above range.

The cross-sectional shape of the groove is not particularly limited, and may be arc-shaped, U-shaped, V-shaped, rectangular, trapezoidal, and other polygonal shapes, or combinations of two or more of these shapes. Also, the number and shape of the grooves are not particularly limited, and the number and shape of the grooves may be appropriately adjusted according to the use purpose and the like of the polishing pad. The shape may be lattice, radial, concentric, honeycomb, and the like, and may be a combination thereof.

Further, in the polishing pad of the first aspect of the present invention, the surface of the polishing layer may be opened by grinding (buffing) or sliced.

In the polishing pad of the first aspect of the present invention, when the polishing surface is an upper surface and the opposite surface thereof is a lower surface, the top portion 4' of the light-transmitting member may be at a position higher than the bottom portion 8' of the groove, at the same position as the bottom portion 8', or at a level lower than the bottom portion 8', but is preferably at the same level as or lower than the bottom portion 8', and it is more preferable that the top portion 4' of the light-transmitting member is at a level lower than the bottom portion 8' of the groove. A polishing pad generally ends its life when the groove provided in the polishing surface is completely polished away, and when the top portion of the light-transmitting member is at the same level as or lower than the bottom portion of the groove, the polishing pad can be used until the groove is polished away.

In addition, in conventional polishing pads, if the top portion 4' of the light-transmitting member is positioned at the same level as or lower than the bottom portion 8' of the groove, it becomes difficult to discharge slurry and polishing swarf from the groove, so that a problem may arise that the light transmittance decreases over time. On the other hand, in the polishing pad of an embodiment of the present invention (the polishing pad in FIG. 4A), slurry and polishing swarf that have entered the concave portion in the first through hole move to the side surface of the first through hole due to the centrifugal force during the polishing process, and are difficult to see from the second through hole having a small equivalent circle diameter, making it possible to prevent the decrease in light transmittance. Furthermore, even if most of the slurry has moved to the side surface of the concave portion but only a small amount of slurry remains on the surface of the light-transmitting member, a decrease in light transmittance due to slurry is less likely to occur, enabling stable optical detection.

(Advantage)

In the polishing pad of the first aspect of the present invention, the water contact angle of a surface on the polishing surface side of the light-transmitting member is 80 degrees or less, so that the presence or absence of slurry on the surface on the polishing surface side of the light-transmitting member has little effect on the light transmittance. This makes it possible to determine the polishing endpoint with high accuracy.

In addition, when the polishing surface is an upper surface and the opposite surface thereof is a lower surface, the polishing pad of the first aspect of the present invention takes its effect even whether the light-transmitting member is at the same height as the polishing surface or the light-transmitting member is at a level lower than the polishing surface, and takes more of its effect particularly when the light-transmitting member is at a level lower than the polishing surface. Specifically, when the light-transmitting member is at a level lower than the polishing surface, there is a concave portion (such as a cylindrical concave portion) surrounded by the surface of the light-transmitting member and the side surface of the through hole, and the slurry flows therein. Most of the slurry that has entered the concave portion moves to the side surface under the influence of centrifugal force and is discharged through the embossed groove, so that with time, there can occur timings when the slurry is present in the area of the surface of the light-transmitting member to be transmitted with laser beams (such as a timing when a large amount of slurry has flowed into the concave portion and a timing when the slurry cannot be fully discharged) and timings when the slurry is not present therein. If the surface of the light-transmitting member is highly water-repellent, the slurry adheres to the window surface in the form of water droplets or streaks, so that compared to the parallel beam transmittance when there is no slurry in the area to be transmitted with laser beams, the parallel beam transmittance when the slurry is present is greatly reduced due to the scattering of light by the droplet-shaped slurry, likely resulting in variations in light transmittance during the polishing process. In the polishing pad of the first aspect of the present invention, the water contact angle of the surface on the polishing surface side of the light-transmitting member can be lowered (hydrophilized) to smear the slurry over the window surface without forming into droplet shapes, so that it is possible to suppress the scattering of light and reduce the fluctuations in light transmittance between the case where the slurry is adhered and the case where the slurry is not adhered. This makes it possible to suppress variations in light transmittance during the polishing process.

The polishing pad of the first aspect of the present invention can be manufactured, for example, by the method described in the section "Method for Manufacturing Polishing Pad of First Aspect".

<<Polishing Pad of Second Aspect>>

A polishing pad of a second aspect of the present invention is a polishing pad in which the polishing layer includes a polishing surface for polishing an object to be polished, and the polishing pad includes a through hole penetrating from the polishing surface to an opposite surface thereof, the light-transmitting member is arranged so that the light-transmitting member is in the through hole when viewed from the polishing surface side of the polishing pad in a thickness direction of the polishing pad, and the surface on the polishing surface side of the light-transmitting member is coated with a hydrophilic resin.

In the present specification and the claims, the polishing layer is a layer that has a surface (polishing surface) to be brought into contact with an object to be polished, including semiconductor devices and other objects to be polished. The object to be polished is not particularly limited, and examples thereof include product substrates including multiple memory dies or processor dies, test substrates, bare substrates, and gate substrates. The substrate can be one at various stages of integrated circuit manufacturing, and for example, the substrate can be a bare wafer or can be one or more deposited and/or patterned layers.

In the present specification, the surface on the polishing surface side of the light-transmitting member coated with a hydrophilic resin refers to a coating surface present on the surface on the polishing surface side of the light-transmitting member.

In addition, in the present specification, the surface on the polishing surface side of the light-transmitting member coated with a hydrophilic resin may be abbreviated as "the surface of the light-transmitting member" or "the surface on the polishing surface side of the light-transmitting member".

Further, in the present specification, the top portion of the light-transmitting member coated with a hydrophilic resin refers to the upper surface of the coating portion 9 on the surface on the polishing surface side of the light-transmitting member 4 when the polishing surface is an upper surface and the opposite surface thereof is a lower surface.

<Light-Transmitting Member>

The polishing pad of the second aspect of the present invention includes a light-transmitting member, that is, a window member. By irradiating the object to be polished with light through the light-transmitting member, it is possible to detect when the object to be polished reaches the desired surface characteristics and planarity. A visible light (white light) laser, lamp, or the like is used for optical endpoint detection.

Figure 2B:
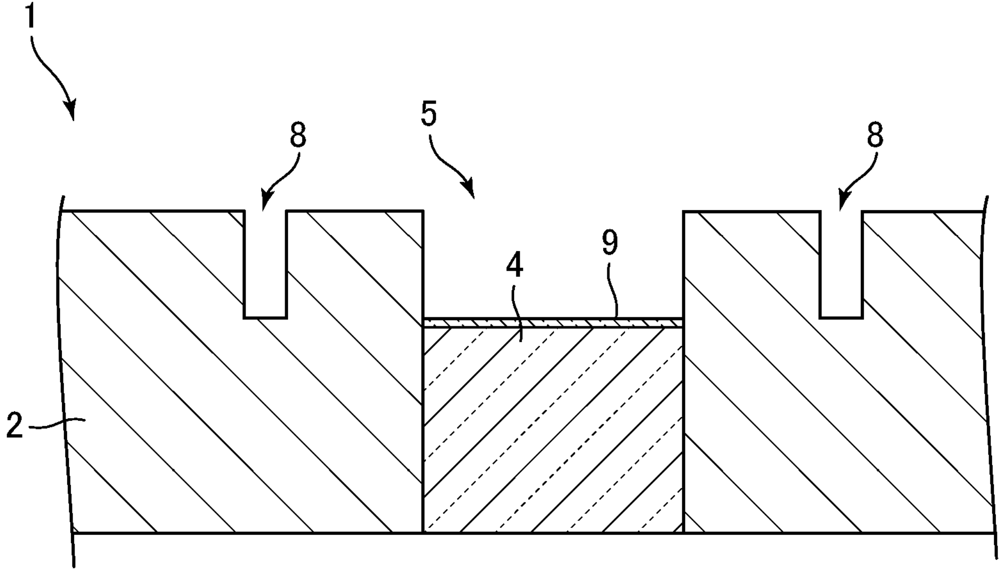
FIG. 2B is a schematic cross-sectional view (cut end surface) in the thickness direction of a polishing pad according to an embodiment of the present invention.
Figure 3B:
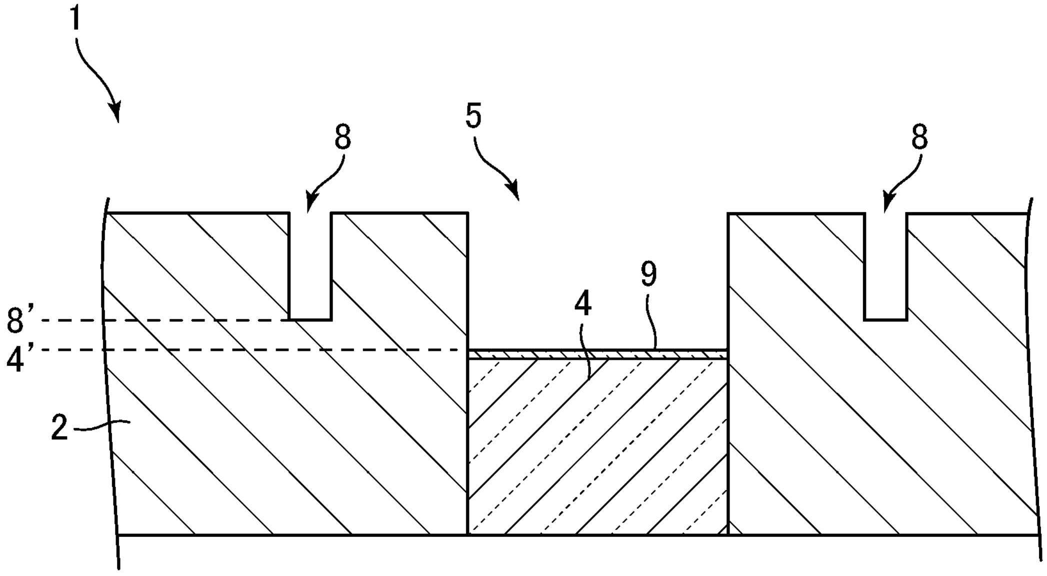
FIG. 3B is a schematic cross-sectional view (cut end surface) in the thickness direction of a polishing pad according to an embodiment of the present invention.
Figure 4B:
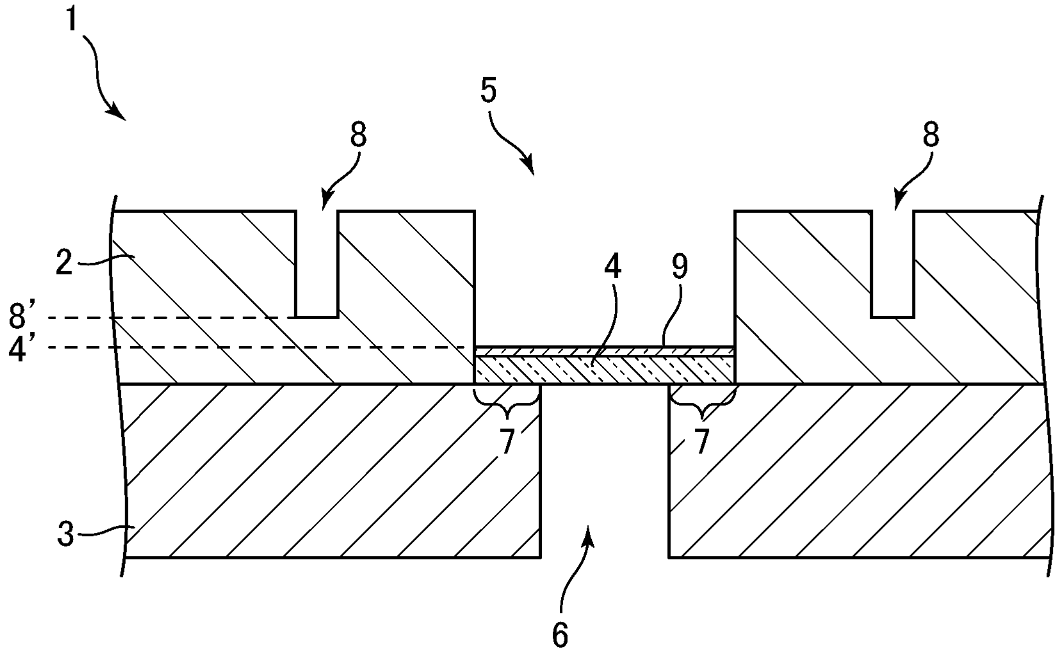
FIG. 4B is a schematic cross-sectional view (cut end surface) in the thickness direction of a polishing pad according to an embodiment of the present invention.
Figure 4C:
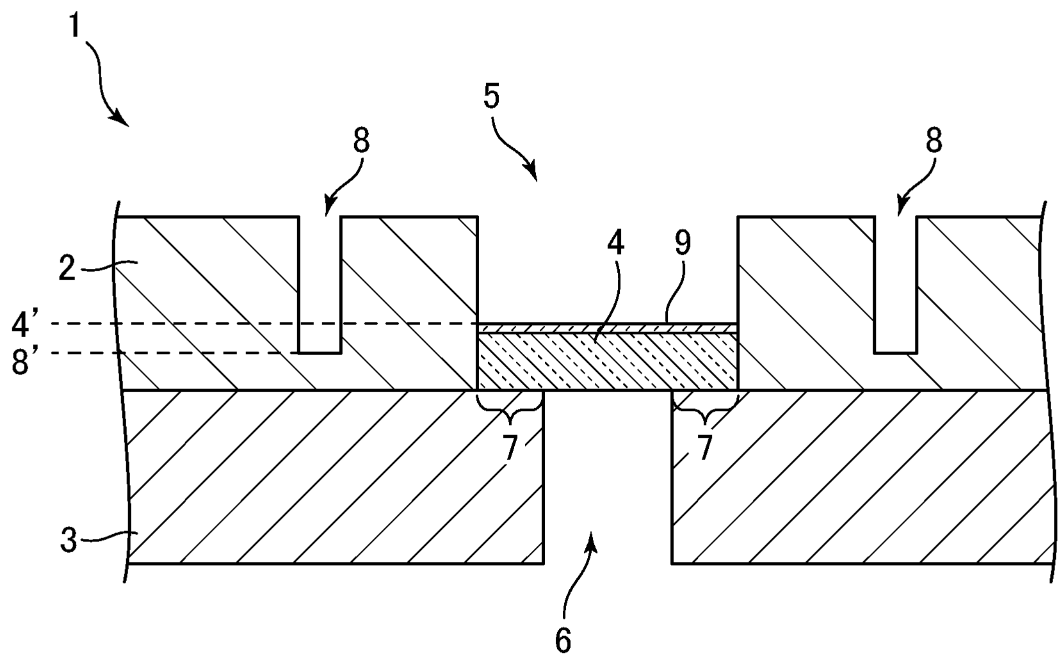
FIG. 4C is a schematic cross-sectional view (cut end surface) in the thickness direction of a polishing pad according to an embodiment of the present invention.
Figure 5B:
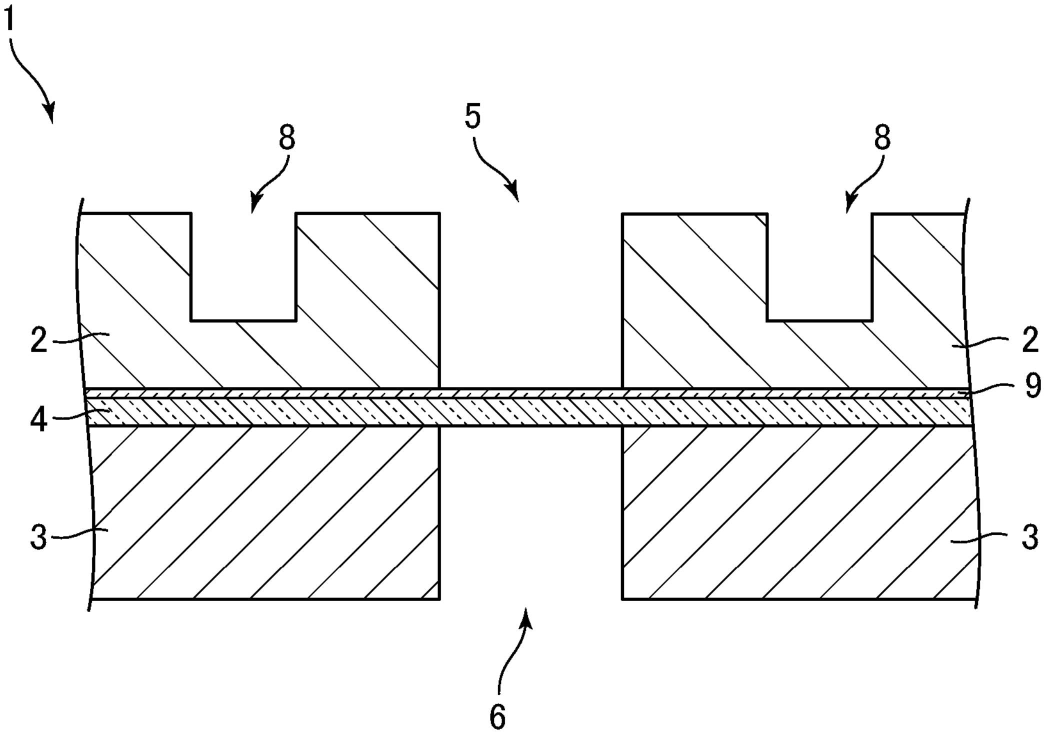
FIG. 5B is a schematic cross-sectional view (cut end surface) in the thickness direction of a polishing pad according to an embodiment of the present invention.
Figure 6B:
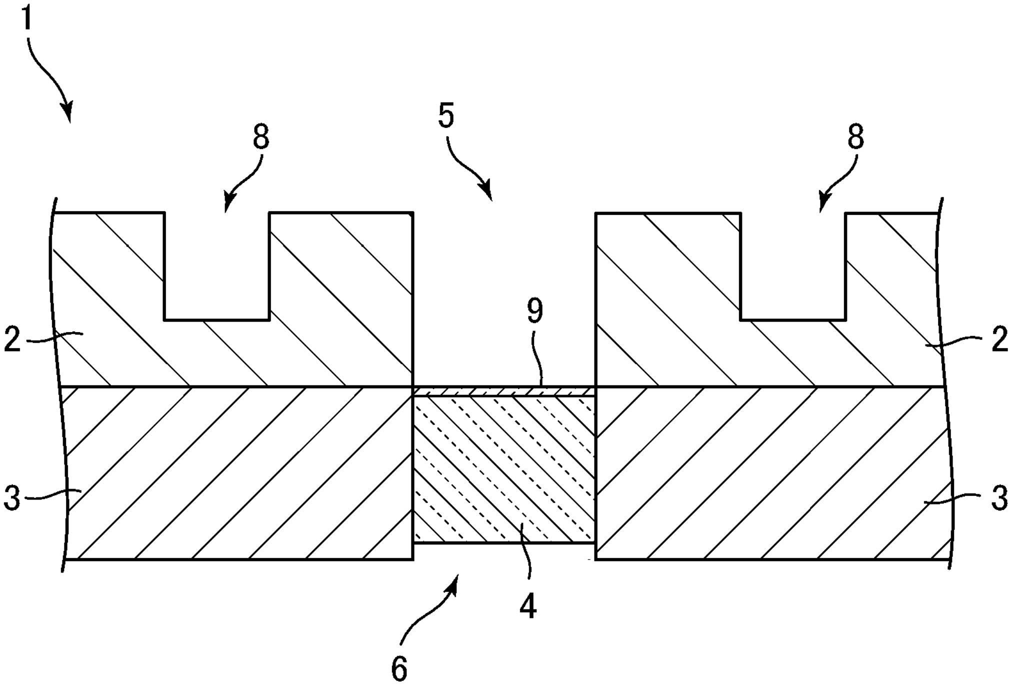
FIG. 6B is a schematic cross-sectional view (cut end surface) in the thickness direction of a polishing pad according to an embodiment of the present invention.

The light-transmitting member is arranged so that the light-transmitting member is in the through hole when viewed from the polishing surface side of the polishing pad in a thickness direction of the polishing pad. Here, the phrase "arranged so that the light-transmitting member is in the through hole when viewed from the polishing surface side of the polishing pad in a thickness direction of the polishing pad" is intended to mean that the light-transmitting member is arranged so that it can be seen when the inside of the through hole is viewed in the thickness direction from the polishing surface of the polishing pad, and is a concept that includes (1) the case where, as shown in FIGS. 2B and 3B, the light-transmitting member is arranged in contact with (or adhering to) the side surface (side wall) of the through hole provided in the polishing layer, (2) the case where, as shown in FIG. 4B or 4C, an additional layer having a through hole having a smaller equivalent circle diameter than the equivalent circle diameter of the through hole of the polishing layer is provided under the polishing layer, and the light-transmitting member is arranged on an exposed portion 7 resulting from the difference in size between the through hole of the polishing layer and the through hole of the additional layer, (3) the case where, as shown in FIG. 5B, the light-transmitting member is sandwiched between the polishing layer and the additional layer, and is arranged such that a portion of the light-transmitting member is exposed in the through hole, and (4) the case where, as shown in FIG. 6B, a through hole is provided in each of the polishing layer and the additional layer, and the light-transmitting member is arranged in contact with (or adhering to) the side surface of one or both of the through holes. Among these, (1), (2), or (4) is preferred, (1) or (2) is more preferred, and (2) is even more preferred.

The light-transmitting member is preferably a transparent resin member. The transparent resin member is not particularly limited as long as it is transparent enough to transmit light, and examples thereof that can be used include thermosetting resins such as polyurethane resins, polyester resins, phenolic resins, urea resins, melamine resins, epoxy resins, and acrylic resins, thermoplastic resins such as polyurethane resins, polyester resins, polyamide resins, cellulose-based resins, acrylic resins, polycarbonate resins, halogen-based resins (such as polyvinyl chloride, polytetrafluoroethylene, and polyvinylidene fluoride), polystyrene resins, and olefin resins (such as polyethylene and polypropylene), rubbers such as butadiene rubber and isoprene rubber, photocurable resins that cure with light such as ultraviolet rays and electron beams, and photosensitive resins. Among these, acrylic resins, polyurethane resins, polyester resins, and polystyrene resins are preferred, and acrylic resins are more preferred.

<Coating with Hydrophilic Resin>

The light-transmitting member is preferably coated with a hydrophilic resin on the surface on the polishing surface side. In the light-transmitting member, not only the surface on the polishing surface side but also the surface opposite the polishing surface (back surface) and the side surface may be subjected to coating with hydrophilic resin, but coating the back surface and side surface as well leads to an increase in cost, and hydrophilizing the back surface and side surface has nothing to do with the effects of the present invention, so that only the surface on the polishing surface is preferably subjected to coating with hydrophilic resin. By coating the surface on the polishing surface side with a hydrophilic resin, it is possible to suppress variations in light transmittance caused by the presence or absence of slurry on the surface of the light-transmitting member. This makes it possible to determine the polishing endpoint with higher accuracy.

The hydrophilic resin is preferably a resin that exhibits a water contact angle of degrees or less, and more preferably a resin that exhibits a water contact angle of 50 degrees or less, when coated on a flat surface.

The hydrophilic resin is preferably a resin having an ion-bonding hydrophilic group. A resin having an ion-bonding hydrophilic group is a resin containing an ion-bonding hydrophilic group composed of cations and anions. The cations and anions are preferably organic cations or organic anions, more preferably composed of organic cations and organic anions. Furthermore, it is preferable that either the cation or the anion is covalently bonded to the atoms constituting the resin. By being covalently bonded to the atoms constituting the resin, it is possible to suppress the elution of the ion-bonding hydrophilic group from the resin containing the ion-bonding hydrophilic group and prevent contamination of the polishing liquid.

The resin having an ion-bonding hydrophilic group is preferably a resin containing an ion-bonding hydrophilic group represented by the formula: $A^+B^-$ ($A^+$ is a cation and $B^-$ is an anion), and more preferably a resin containing an ion-bonding hydrophilic group represented by $-A^+B^-$ or $-B^-A^+$. An ion-bonding hydrophilic group may be imparted to the resin by, for example, polymerizing a monomer or oligomer containing an ion-bonding hydrophilic group together with other monomers or oligomers, if necessary, or may be provided in the resin by covalently bonding the side chains of the coating polymer to the ion-bonding hydrophilic group.

Among these, resins containing ion-bonding hydrophilic groups preferably have ion-bonding hydrophilic groups in part or all of the structural units (monomers) constituting the resin.

When the monomer constituting the resin has an ion-bonding hydrophilic group, the monomer (before UV irradiation) preferably has a functional group having an unsaturated double bond in the side chain, and preferably has a functional group having an ethylenically unsaturated bond (such as vinyl group, allyl group, acrylic group, methacrylic group, acryloyl group, or methacryloyl group). Since the monomers constituting the resin have unsaturated double bonds in the side chains thereof, the resin can be cured by UV irradiation.

A monomer containing an ion-bonding hydrophilic group may be synthesized or a commercially available one may be used. Examples of commercially available monomers containing ion-bonding hydrophilic groups include Aminoion (manufactured by Nippon Nyukazai Co., Ltd.).

In a resin containing an ion-bonding hydrophilic group, the cationic moiety of the ion-bonding hydrophilic group may be covalently bonded to the monomer constituting the resin (preferably the side chain of the monomer) and may be ion-bonded with the anionic moiety of the ion-bonding hydrophilic group (preferably have a structure of $-A^+B^-$ at the end of the side chain), or alternatively, the anionic moiety of the ion-bonding hydrophilic group may be covalently bonded to the monomer constituting the resin (preferably the side chain of the monomer) and may be ion-bonded with the cationic moiety of the ion-bonding hydrophilic group (preferably have a structure of $-B^-A^+$ at the end of the side chain). Preferably, in the resin containing an ion-bonding hydrophilic group, the cationic moiety of the ion-bonding hydrophilic group is covalently bonded to the monomer constituting the resin and is ion-bonded with the anionic moiety of the ion-bonding hydrophilic group.

The resin containing an ion-bonding hydrophilic group is preferably a resin having an ion-bonding hydrophilic group in a side chain thereof. There are no particular restrictions on the type of ion-bonding hydrophilic group, and examples thereof include hydrophilic groups containing ammonium cations, phosphonium cations, sulfonium cations, imidazolium cations, and pyridinium cations. Among these, a hydrophilic group containing an ammonium cation is preferred, $-A^+B^-$ ($A^+$ is an ammonium cation and $B^-$ is an anion) is more preferred, and $—NR_3B^-$ (R represents a hydrogen atom or a substituent such as an alkyl group) is even more preferred.

As the ion-bonding hydrophilic group of $-A^+B^-$, a hydrophilic group represented by $—NR_3X^-$ is preferable (in the formula, R each independently represents a hydrogen atom or a substituted or unsubstituted alkyl group, and $X^-$ represents an anion).

In addition, although $X^-$ is not particularly limited, it preferably contains alkyl-containing sulfate anions or sulfonate anions (such as alkyl sulfate ions, polyoxyalkylene alkyl ether sulfate ions, polyoxyalkylene alkylphenyl ether sulfate ions, alkyl sulfonate ions, and alkylbenzene sulfonate ions). It is presumed that these ionic structures are less likely to be eluted from the resin because, although they are hydrophilic, the terminal groups thereof are hydrophobic.

Examples of monomers having an ion-bonding hydrophilic group include the following monomers (structural units) disclosed in Japanese Patent No. 6209639.

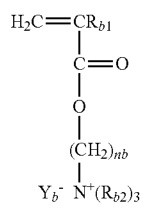

(In the formula, $R_{b1}$ is a hydrogen atom or a methyl group, $R_{b2}$ is a hydrogen atom or a substituted or unsubstituted $C_{1-6}$ alkyl group, nb is an integer of 1 to 6, and $Y_b^-$ is an anion represented by the following formula (2').)

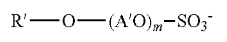

(In the formula, R' is a substituted or unsubstituted $C_{12-14}$ linear alkyl group, A' is a $C_{2-4}$ linear or branched alkylene group, and m is the average number of added moles of A'O, which is 2 to 50.)

Specific examples thereof include salts of (meth)acrylic monomers such as dimethylaminoethyl (meth)acrylate and diethylaminoethyl (meth)acrylate with polyoxyalkylene alkyl ether sulfate esters.

The hydrophilic resin is preferably a resin containing an ion-bonding hydrophilic group, more preferably a resin having a hydrophilic group containing an ammonium cation, even more preferably a resin containing a hydrophilic group composed of an ammonium cation and an anion ($—NR_3^+ X^-$), and even more preferably an acrylic resin containing a hydrophilic group composed of an ammonium cation and an anion. In addition, photocurable resins containing hydrophilic groups composed of ammonium cations and anions are also preferred, and photocurable acrylic resins containing hydrophilic groups composed of ammonium cations and anions are also preferred.

Examples of resins containing ion-bonding hydrophilic groups include Acryt 8WX (modified acrylate polymer, manufactured by Taisei Fine Chemicals Co., Ltd.), which is a photocurable polymer containing ammonium cations.

There is no particular limitation on the method for coating with a hydrophilic resin. For example, hydrophilic resin coating can be performed as follows. A hydrophilic photocurable resin, preferably a photocurable resin containing an ion-bonding hydrophilic group, is mixed with a photopolymerization initiator, applied to the surface of the light-transmitting member, and cured by irradiation with ultraviolet rays or the like. At this time, in addition to the hydrophilic photocurable resin, a photocurable resin that serves as a binder may be mixed.

It can also be performed by polymerizing (solution polymerization or photopolymerization) a monomer containing an ion-bonding hydrophilic group, optionally together with another monomer (preferably an acrylic monomer), by a usual method. When solution polymerization is used, the solution after polymerization can be applied to the surface of the endpoint detection window and dried to obtain a coating. When photopolymerization is used, a monomer solution can be applied to the surface of the endpoint detection window and irradiated with ultraviolet rays to obtain a coating.

The photocurable resin that serves as a binder is not particularly limited, and conventionally known photocurable resins can be used. Examples thereof include polyfunctional (meth)acrylate compounds having two or more (meth) acryloyl groups in one molecule. Commercially available products include NK Ester (manufactured by Shin-Nakamura Chemical Co., Ltd.), Aronix (manufactured by Toagosei Co., Ltd.), Kayarad (manufactured by Nippon Kayaku Co., Ltd.), and Fancryl (manufactured by Hitachi Chemical Company, Ltd.). It is preferable that the photocurable resin has transparency to the extent that light can be transmitted after being cured.

The photopolymerization initiator is not particularly limited as long as it can cure the photocurable resin by irradiation with ultraviolet rays, electron beams, or the like, and conventionally known photopolymerization initiators can be used. Examples thereof include radical polymerization initiators, cationic polymerization initiators, and anionic polymerization initiators, and commercially available products include Irgacure (manufactured by IGM Resin B.V.).

<Arrangement of Light-Transmitting Member>

In the polishing pad of the second aspect of the present invention, when the polishing surface is an upper surface and the opposite surface thereof is a lower surface, the top portion of the light-transmitting member coated with a hydrophilic resin may be at the same height as the polishing surface or lower than the polishing surface, and is preferably lower than the polishing surface (FIG. 2B). Since the top portion of the light-transmitting member coated with a hydrophilic resin is lower than the polishing surface, it is possible to prevent the occurrence of polishing scratches due to the light-transmitting member being harder than the polishing layer. Also, if the top portion of the light-transmitting member is lower than the polishing surface, slurry enters the concave portion surrounded by the light-transmitting member and the side surface of the through hole, and most of it moves to the side surface of the through hole due to centrifugal force and is discharged through the groove, so that the odds are even that a small amount of slurry may remain on the surface of the light-transmitting member. However, in the case of using a conventional polishing pad, the light transmittance differs depending on whether or not a small amount of slurry remains on the surface of the light-transmitting member, so that it is difficult to determine the polishing endpoint with high accuracy. Meanwhile, the polishing pad of the second aspect of the present invention has good compatibility with slurry because the surface on the polishing surface side of the light-transmitting member is coated with the above resin. For this reason, even if a small amount of slurry is present, it spreads uniformly on the window surface, thereby reducing fluctuations in light transmittance from the initial stage of polishing to the end. Therefore, even when the top portion of the light-transmitting member is at a level lower than the polishing surface, in particular, even the top portion 4' of the light-transmitting member is at the same level as or lower than the bottom portion 8' of the groove, it is possible to determine the polishing endpoint with high accuracy.

(Water Contact Angle)

In the polishing pad of the second aspect of the present invention, the surface on the polishing surface side of the light-transmitting member coated with a hydrophilic resin has a water contact angle of preferably 50 degrees or less, even more preferably 30 degrees or less, even more preferably 20 degrees or less, and even more preferably 5 to degrees or less. When the water contact angle is within the above range, it becomes easy to suppress variations in light transmittance caused by the presence or absence of slurry on the surface of the light-transmitting member.

The water contact angle of the back surface and side surface of the light-transmitting member is not particularly limited, and the water contact angle of the back surface and side surface may be greater than 50 degrees or greater than 80 degrees. That is, the back surface and side surface of the light-transmitting member may not be coated. Window members used in conventional polishing pads generally have a water contact angle greater than 80 degrees. If a window with a hydrophilicity of 80 degrees or less is used, the slurry may swell and deform the window, causing the window to peel off the polishing area, or cause slurry leakage. Therefore, the window member is preferably hydrophobic with a water contact angle of greater than 80 degrees, and in the present invention, it is preferable to subject only the surface on the polishing surface side thereof to coating with a hydrophilic resin so that the water contact angle is 50 degrees or less.

(Transmittance)

In the polishing pad of the second aspect of the present invention, the difference between the visible light transmittance (sometimes simply referred to as light transmittance in the present specification) when water is not adhered to the surface of the light-transmitting member coated with a hydrophilic resin and the visible light transmittance when water is adhered to the surface of the light-transmitting member is preferably 10% or less, more preferably 8% or less, even more preferably 6% or less, and even more preferably 5% or less. When the difference in light transmittance is within the above range, differences in light transmittance between the presence and absence of slurry on the surface of the light-transmitting member coated with the resin are less likely to occur, making it possible to determine the polishing endpoint with high accuracy.

In the polishing pad of the second aspect of the present invention, the light transmittance when water is adhered to the surface of the light-transmitting member coated with a hydrophilic resin is preferably 60% or more, more preferably 62% or more, even more preferably 65% or more, even more preferably 70% or more, even more preferably 75% or more, and even more preferably 80% or more.

In the polishing pad of the second aspect of the present invention, the light transmittance when water is not adhered to the surface of the light-transmitting member coated with a hydrophilic resin is preferably 60% or more, more preferably 62% or more, even more preferably 65% or more, even more preferably 70% or more, even more preferably 75% or more, even more preferably 80% or more, and even more preferably 85% or more.

The light transmittance can be obtained by measuring the transmission spectrum at a wavelength of 300 to 1000 nm with a spectrophotometer and obtaining it as visible light transmittance (%) according to Japanese Industrial Standards (JIS A5759: 2008). That is, the transmittance is obtained by measuring the transmittance of each wavelength in the wavelength range of 380 to 780 nm, and multiplying the transmittance at each wavelength by the weighted coefficient obtained from the spectral distribution of CIE (Commission Internationale de l'Eclairage) illuminant D65, the wavelength distribution of the CIE photopic normalized luminous efficiency, and the wavelength interval to perform weighted averaging.

Also, the light transmittance when water is adhered to the surface of the light-transmitting member coated with hydrophilic resin can be measured as follows. A sufficient amount of water (for example, about 0.01 to 0.03 mL for a light-transmitting member cut into a size of 9 mm×50 mm) is adhered by spraying to the entire surface on the polishing surface side of the light-transmitting member, and then the light-transmitting member is allowed to stand perpendicularly to the ground for 60 seconds to drain moisture from the light-transmitting member.

(Through Hole)

A through hole is a hole penetrating from the polishing surface to the opposite surface thereof when viewed from the polishing surface side of the polishing pad in a thickness direction of the polishing pad. The through hole preferably penetrates the polishing layer parallel to the thickness direction or perpendicular to the polishing surface.

One through hole may be provided in the polishing layer, or two or more separate, individual through holes may be provided therein.

The shape of the through hole when viewed from the polishing surface side of the polishing pad in a thickness direction of the polishing pad or the shape of the through hole in the polishing surface includes circular, elliptical, triangular, quadrangular, hexagonal, octagonal, and the like. Alternatively, it may be a shape formed by multiple identical or different shapes partially overlapping each other. Among these, a circular shape is preferable because it has no corners where polishing swarf tends to accumulate.

(Equivalent Circle Diameter)

In the present specification and the claims, an equivalent circle diameter is the diameter of a perfect circle corresponding to the area of the figure to be measured.

The equivalent circle diameter of a through hole is the equivalent circle diameter of the through hole when viewed from the polishing surface side of the polishing pad in a thickness direction of the polishing pad, and corresponds to the diameter when the through hole has a circular shape when viewed from the polishing surface side of the polishing pad in a thickness direction of the polishing pad.

The equivalent circle diameter of the through hole is not particularly limited, but is preferably 5 to 40 mm, more preferably 5 to 30 mm, and even more preferably 10 to 28 mm.

Also, the area of the through hole in the polishing surface is preferably 0.003 to 0.5%, more preferably 0.004 to 0.4%, and even more preferably 0.005 to 0.3%, based on the total area of the polishing surface.

(Structure of Polishing Layer)

Examples of resins constituting the polishing layer include polyurethane-based resins such as polyurethane and polyurethane polyurea; acrylic resins such as polyacrylate and polyacrylonitrile; vinyl-based resins such as polyvinyl chloride, polyvinyl acetate, and polyvinylidene fluoride; polysulfone-based resins such as polysulfone and polyethersulfone; acylated cellulose-based resins such as acetylated cellulose and butyrylated cellulose; polyamide-based resins; and polystyrene-based resins. Among these, polyurethane resins are more preferable in consideration of compression characteristics and flexibility.

The polishing layer may be composed of one type of resin, or may be composed of two or more types of resins.

Further, the polishing layer preferably has open cells. The term "open cells" as used herein refers to foams having spaces formed when adjacent cells are connected to each other by communicating holes. Specifically, it may be a resin obtained by the wet film-forming method, or a foam obtained by dry molding or injection molding. The wet film-forming method is preferable, and good bending and stretching motion can be expected.

In the present specification, a resin formed by the wet film-forming method means a resin (preferably polyurethane resin) formed by the wet film-forming method. The wet film-forming method is a method in which a film-forming resin is dissolved in an organic solvent, and the resin solution is applied to a sheet-shaped substrate, and then passed through a coagulation liquid to solidify the resin. Wet film-formed resins generally have multiple teardrop-shaped cells (anisotropic shapes that have a structure with a larger diameter from the polishing surface to the bottom of the polishing pad). Therefore, wet film-formed resins can be rephrased as resins having multiple teardrop-shaped cells. The multiple teardrop-shaped cells are preferably in the form of open cells.

The polishing layer constituting the polishing pad of the second aspect of the present invention is preferably a resin sheet (preferably a polyurethane sheet) formed by the wet film-forming method, more preferably a polyurethane sheet containing multiple teardrop-shaped cells, and even more preferably a polyurethane sheet having open cells containing multiple teardrop-shaped cells, with some or all of the cells being connected by communicating holes.

(Groove)

The polishing pad of the second aspect of the present invention preferably has a groove in the polishing surface of the polishing layer. The groove does not penetrate the polishing layer, and can be distinguished from the through hole.

Examples of grooves include embossed grooves obtained by embossing a polishing surface and cut grooves obtained by cutting with a cutting tool. Among these, embossed grooves are preferred. By providing grooves such as embossed grooves, it is possible to obtain a polishing pad that is less likely to have burrs on the polishing surface and is suitable for final polishing.

The depth of the groove is not particularly limited as long as it is smaller than the thickness of the polishing layer, but it is preferably 50 to 90%, more preferably 60 to 80%, of the thickness of the polishing layer. If the groove disappears due to the polishing of the object to be polished, the flow dischargeability on the polishing slurry is lost and the polishing performance deteriorates, reaching the life of the polishing pad. It is therefore preferable that the groove depth is deep. On the other hand, in order to increase the groove depth of the embossed groove, it is necessary to raise the working pressure or raise the working temperature, which may cause deformation of the base material (PET) on the back surface of the polishing layer or deterioration of the surface of the polishing layer, or the like. These problems are less likely to occur when the depth of the groove is within the above range.

The cross-sectional shape of the groove is not particularly limited, and may be arc-shaped, U-shaped, V-shaped, rectangular, trapezoidal, and other polygonal shapes, or combinations of two or more of these shapes. Also, the number and shape of the grooves are not particularly limited, and the number and shape of the grooves may be appropriately adjusted according to the use purpose and the like of the polishing pad. The shape may be lattice, radial, concentric, honeycomb, and the like, and may be a combination thereof.

Further, in the polishing pad of the second aspect of the present invention, the surface of the polishing layer may be opened by grinding (buffing) or sliced.

In the polishing pad of the second aspect of the present invention, when the polishing surface is an upper surface and the opposite surface thereof is a lower surface, the top portion 4' of the light-transmitting member coated with hydrophilic resin (that is, the upper surface of the coating portion 9) may be at a position higher than the bottom portion 8' of the groove, at the same position as the bottom portion 8', or at a level lower than the bottom portion 8', but is preferably at the same level as or lower than the bottom portion 8', and it is more preferable that the top portion 4' of the light-transmitting member is at a level lower than the bottom portion 8' of the groove. A polishing pad generally ends its life when the groove provided in the polishing surface is completely polished away, and when the top portion of the light-transmitting member is at the same level as or lower than the bottom portion of the groove, the polishing pad can be used until the groove is polished away.

In addition, in conventional polishing pads, if the top portion 4' of the light-transmitting member is positioned at the same level as or lower than the bottom portion 8' of the groove, it becomes difficult to discharge slurry and polishing swarf from the groove, so that a problem may arise that the light transmittance decreases over time. On the other hand, in the polishing pad of an embodiment of the present invention (the polishing pad in FIG. 4B or 4C), slurry and polishing swarf that have entered the concave portion in the first through hole move to the side surface of the first through hole due to the centrifugal force during the polishing process, and are difficult to see from the second through hole having a small equivalent circle diameter, making it possible to prevent the decrease in light transmittance. Furthermore, even if most of the slurry has moved to the side surface of the concave portion but only a small amount of slurry remains on the surface of the light-transmitting member, a decrease in light transmittance due to slurry is less likely to occur, enabling stable optical detection.

(Advantage)

In the polishing pad of the second aspect of the present invention, the surface on the polishing surface side of the light-transmitting member is coated with a hydrophilic resin, preferably a resin containing an ion-bonding hydrophilic group, so that whether slurry is present or absent on the surface on the polishing surface side of the light-transmitting member has little effect on the light transmittance. This makes it possible to determine the polishing endpoint with high accuracy.

In addition, when the polishing surface is an upper surface and the opposite surface thereof is a lower surface, the polishing pad of the second aspect of the present invention takes its effect even whether the resin-coated surface on the polishing surface side of the light-transmitting member is at the same height as the polishing surface or at a level lower than the polishing surface, and takes more of its effect particularly when the surface on the polishing surface side of the light-transmitting member is at a level lower than the polishing surface. Specifically, when the surface on the polishing surface side of the light-transmitting member is at a level lower than the polishing surface, there is a concave portion (such as a cylindrical concave portion) surrounded by the resin-coated surface of the light-transmitting member and the side surface of the through hole, and the slurry flows therein. Most of the slurry that has entered the concave portion moves to the side surface under the influence of centrifugal force and is discharged through the embossed groove, so that with time, there can occur timings when the slurry is present in the area of the surface of the light-transmitting member to be transmitted with laser beams (such as a timing when a large amount of slurry has flowed into the concave portion and a timing when the slurry cannot be fully discharged) and timings when the slurry is not present therein. If the surface of the light-transmitting member is highly water-repellent, the slurry adheres to the window surface in the form of water droplets or streaks, so that compared to the parallel beam transmittance when there is no slurry in the area to be transmitted with laser beams, the parallel beam transmittance when the slurry is present is greatly reduced due to the scattering of light by the droplet-shaped slurry, likely resulting in variations in light transmittance during the polishing process. In the polishing pad of the second aspect of the present invention, the surface on the polishing surface side of the light-transmitting member can be coated with a hydrophilic resin, preferably a resin containing an ion-bonding hydrophilic group, to smear the slurry over the window surface without forming into droplet shapes, so that it is possible to suppress the scattering of light and reduce the fluctuations in light transmittance between the case where the slurry is adhered and the case where the slurry is not adhered. This makes it possible to suppress variations in light transmittance during the polishing process.

The polishing pad of the first second of the present invention can be manufactured, for example, by the method described in the section “Method for Manufacturing Polishing Pad of Second Aspect”.

<<Polishing Pad of Third Aspect>>

A polishing pad of a third aspect of the present invention is a polishing pad including: a light-transmitting resin member; and a polishing layer, wherein the polishing layer includes a polishing surface for polishing an object to be polished, and the polishing pad includes a through hole penetrating from the polishing surface to an opposite surface thereof, the light-transmitting resin member is arranged so that the light-transmitting resin member is in the through hole when viewed from the polishing surface side of the polishing pad in a thickness direction of the polishing pad, and the light-transmitting resin member includes a hydrophilic monomer graft-polymerized on the surface on the polishing surface side thereof.

In addition, the polishing pad of the third aspect of the present invention may be rephrased as a polishing pad including: a light-transmitting resin member; and a polishing layer, wherein the polishing layer includes a polishing surface for polishing an object to be polished, and the polishing pad includes a through hole penetrating from the polishing surface to an opposite surface thereof, the light-transmitting resin member is arranged so that the light-transmitting resin member is in the through hole when viewed from the polishing surface side of the polishing pad in a thickness direction of the polishing pad, and the resin of the surface on the polishing surface side of the light-transmitting resin member includes, in a side chain thereof, a polymer containing a hydrophilic monomer as a structural unit.

In the present specification and the claims, the polishing layer is a layer that has a surface (polishing surface) to be brought into contact with an object to be polished, including semiconductor devices and other objects to be polished. The object to be polished is not particularly limited, and examples thereof include product substrates including multiple memory dies or processor dies, test substrates, bare substrates, and gate substrates. The substrate can be one at various stages of integrated circuit manufacturing, and for example, the substrate can be a bare wafer or can be one or more deposited and/or patterned layers.

<Light-Transmitting Resin Member>

The polishing pad of the third aspect of the present invention includes a light-transmitting resin member, that is, a window member. By irradiating the object to be polished with light through the light-transmitting resin member, it is possible to detect when the object to be polished reaches the desired surface characteristics and planarity. A visible light (white light) laser, lamp, or the like is used for optical endpoint detection.

The light-transmitting resin member is arranged so that the light-transmitting resin member is in the through hole when viewed from the polishing surface side of the polishing pad in a thickness direction of the polishing pad. Here, the phrase “arranged so that the light-transmitting resin member is in the through hole when viewed from the polishing surface side of the polishing pad in a thickness direction of the polishing pad” is intended to mean that the light-transmitting resin member is arranged so that it can be seen when the inside of the through hole is viewed in the thickness direction from the polishing surface of the polishing pad, and is a concept that includes (1) the case where, as shown in FIGS. 2B and 3B, the light-transmitting resin member is arranged in contact with (or adhering to) the side surface (side wall) of the through hole provided in the polishing layer, (2) the case where, as shown in FIG. 4B or 4C, an additional layer having a through hole having a smaller equivalent circle diameter than the equivalent circle diameter of the through hole of the polishing layer is provided under the polishing layer, and the light-transmitting resin member is arranged on an exposed portion 7 resulting from the difference in size between the through hole of the polishing layer and the through hole of the additional layer, (3) the case where, as shown in FIG. 5B, the light-transmitting resin member is sandwiched between the polishing layer and the additional layer, and is arranged such that a portion of the light-transmitting resin member is exposed in the through hole, and (4) the case where, as shown in FIG. 6B, a through hole is provided in each of the polishing layer and the additional layer, and the light-transmitting resin member is arranged in contact with (or adhering to) the side surface of one or both of the through holes. Among these, (1), (2), or (4) is preferred, (1) or (2) is more preferred, and (2) is even more preferred.

The light-transmitting resin member is not particularly limited as long as it is a resin transparent enough to transmit light, and examples thereof that can be used include thermosetting resins such as polyurethane resins, polyester resins, phenolic resins, urea resins, melamine resins, epoxy resins, and acrylic resins, thermoplastic resins such as polyurethane resins, polyester resins, polyamide resins, cellulose-based resins, acrylic resins, polycarbonate resins, halogen-based resins (such as polyvinyl chloride, polytetrafluoroethylene, and polyvinylidene fluoride), polystyrene resins, and olefin resins (such as polyethylene and polypropylene), rubbers such as butadiene rubber and isoprene rubber, photocurable resins that cure with light such as ultraviolet rays and electron beams, and photosensitive resins. Among these, acrylic resins, polyurethane resins, polyester resins, and polystyrene resins are preferred, and acrylic resins are more preferred.

The light-transmitting resin member has a certain degree of transparency such that the visible light transmittance (sometimes simply referred to as light transmittance in the present specification) when irradiated with light having a wavelength of 380 nm to 780 nm is preferably 60% or more, more preferably 65% or more, even more preferably 70% or more, even more preferably 75% or more, even more preferably 80% or more, and even more preferably 85% or more. The visible light transmittance can be obtained by measuring the transmission spectrum at a wavelength of 300 to 1000 nm with a spectrophotometer and obtaining it as visible light transmittance (%) according to Japanese Industrial Standards (JIS A5759: 2008).

(Grafting)

The polishing pad of the third aspect of the present invention includes a hydrophilic monomer graft-polymerized on the surface on the polishing surface side of the light-transmitting resin member.

In the present specification and the claims, the phrase "includes a hydrophilic monomer graft-polymerized on the surface on the polishing surface side of the light-transmitting resin member" means that a hydrophilic monomer is bonded to the light-transmitting resin on the surface on the polishing surface side by graft polymerization. Therefore, the resin present on the surface on the polishing surface side of the light-transmitting resin member has a polymer containing a hydrophilic monomer as a structural unit in a side chain thereof.

The polishing pad of the third aspect of the present invention includes a hydrophilic monomer graft-polymerized (hereinafter sometimes referred to as grafted) on the surface on the polishing surface side of the light-transmitting resin member, so that it is possible to reduce adhesion and sticking of polishing swarf to the surface of the light-transmitting resin member. Although it is not exactly clear why the grafting can reduce the adhesion and sticking of polishing swarf to the surface of the light-transmitting resin member, it is presumed as follows. Specifically, in the polishing pad of the third aspect of the present invention, the resin on the surface on the polishing surface side of the light-transmitting resin member comes to have long side chains, as a result of grafting. These long chains adsorb water molecules to form a hydrous film, making it difficult for polishing swarf that has flowed to the surface of the light-transmitting resin member to adhere or stick to the surface of the light-transmitting resin member. Further, by causing the polishing swarf to flow out of the surface of the light-transmitting resin member due to the centrifugal force during the polishing process, it is possible to prevent the polishing swarf from adhering or sticking to the surface of the light-transmitting resin member.

As grafting, grafting by plasma graft polymerization is preferred. Plasma graft polymerization is a method for forming a graft-polymerized surface by reacting monomers such as acrylic acid with radicals formed by plasma surface treatment as starting points (Sen'i Gakkaishi, 1985, Vol. 41, No. 10, pp. 388-393).

Plasma treatment is a treatment of irradiating a solid surface with plasma generated by the ionization action of the inert gas by discharging in an inert gas atmosphere.

Nitrogen gas, argon gas, oxygen gas, helium gas, neon gas, xenon gas, and the like can be used as the inert gas in the plasma treatment.

Plasma generation can be accomplished by any of the known methods for generating plasma. For example, a monomer can be placed under vacuum between parallel plate electrodes connected to a radio frequency generator, the parallel plates either outside or inside the vacuum chamber can be used to generate plasma. Alternatively, an electric field may be created with an external induction coil to generate plasma of the ionized gas, or oppositely charged electrodes may be spaced directly into the vacuum chamber to generate plasma.

Grafting with a hydrophilic monomer is preferably carried out, for example, as follows. Plasma treatment is applied to the surface on the polishing surface side of the light-transmitting resin member, and then the light-transmitting resin member is taken out from the plasma processing apparatus and immersed in an aqueous solution containing a hydrophilic monomer to graft-polymerize the hydrophilic unsaturated monomer to the light-transmitting resin member.

In the present specification and the claims, a hydrophilic monomer refers to a monomer having a functional group capable of adsorbing water molecules therearound. As the hydrophilic monomer, a hydrophilic monomer having an unsaturated double bond is preferable, and a hydrophilic monomer having a vinyl group or an allyl group is more preferable.

The hydrophilic monomer used for grafting is not particularly limited as long as it is a hydrophilic monomer, and conventionally known monomers can be used. Examples of hydrophilic monomers include acrylamide, methacrylamide, and N-vinylpyrrolidone; acrylic acid, methacrylic acid, p-styrenesulfonic acid, vinylsulfonic acid, 2-methacryloyloxyethylsulfonic acid, 3-methacryloyloxy-2-hydroxypropylsulfonic acid, allyl sulfonic acid, methacryl sulfonic acid, and ammonium salts and alkali metal salts of these acids, dimethylaminoethyl acrylate, dimethylaminoethyl methacrylate, diethylaminoethyl acrylate and diethylaminoethyl methacrylate, quaternary products of 2-vinylpyridine and 4-vinylpyridine with hydrochloric acid, nitric acid, dimethyl sulfuric acid, diethyl sulfuric acid, or ethyl chloride. Among these, acrylic monomers are preferred, acrylic acid, methacrylic acid, 2-hydroxyethyl methacrylate, 2-hydroxyethyl acrylate, acrylamide, methacrylamide, 2-acrylamido-2-methylpropanesulfonic acid, N,N dimethylaminoethyl methacrylate, or N,N dimethylaminoethyl acrylate is more preferred, acrylic acid and methacrylic acid are even more preferred, and acrylic acid is even more preferred.

As the hydrophilic monomer, one type may be used alone, or two or more types may be used in combination.

Further, the light-transmitting resin member may be formed into a composite by further reacting the graft polymer, formed by grafting the surface on the polishing surface side, with the polymer. As to polymers that form complexes, when the graft polymer is a polymer (anionic polymer) containing or composed of a monomer having a carboxylic acid group such as an acrylic monomer (for example, acrylic acid or methacrylic acid) or maleic anhydride, examples of polymers that form complexes include cationic polymers such as polyethylene glycol, polyvinylpyrrolidone, polyxylylviologen, polyethyleneimine and polyvinyl pyridinium chloride, polyvinyl benzyltrimethylammonium chloride. In addition, when the graft polymer is a polymer (cationic polymer) containing or composed of a basic monomer such as acrylamide, methacrylamide, vinylpyridine, N,N-dimethylaminoethyl methacrylate, or N,N-dimethylaminoethyl acrylate, examples of the complex-forming polymers include anionic polymers such as polyacrylic acid, polymethacrylic acid, poly-2-acrylamido-2-methylpropanesulfonic acid, polystyrene sulfonic acid, and polyvinyl sulfonic acid.

Among these, the resin on the surface grafted with the acrylic monomer is preferably bound by intermolecular interaction with a complex-forming polymer selected from polyethylene glycol, polyvinylpyrrolidone, polyxylylviologen, polyethyleneimine, polyvinyl pyridinium chloride, and polyvinyl benzyltrimethylammonium chloride, and more preferably bound by intermolecular interaction with polyvinyl benzyltrimethylammonium chloride. An intermolecular interaction such as a hydrogen bond or an ionic bond acts between a polymer chain formed by graft polymerization and a complex-forming polymer to form a complex composed of an ionic complex.

When a complex is formed with a complex-forming polymer, the ions present in the graft group and the counter ions of the complex-forming polymer increase the number of adsorption points for water molecules, thereby further decreasing the contact angle and further enhancing the hydrophilicity of the surface of the light-transmitting resin member. Also, since a water film is likely to be formed on the surface, dirt such as polishing swarf is less likely to adhere or stick.

A complex with a complex-forming polymer can be formed, for example, by immersing a light-transmitting resin member graft-polymerized with a hydrophilic monomer in an aqueous solution of the complex-forming polymer for a predetermined period of time.

In the light-transmitting resin member, not only the resin on the surface on the polishing surface side, but also the resin on the surface opposite the polishing surface (back surface) and side surface may be grafted, but grafting the back surface and side surface also leads to an increase in cost, and grafting the back surface and side surface has nothing to do with the effects of the present invention. In addition, when the resin is grafted onto the side or back surface of the light-transmitting resin member, the surface that contacts the polishing layer becomes hydrophilic, so that the slurry may cause the light-transmitting resin member to swell and deform, peel off from the polishing area, or cause slurry leakage. For the reasons described above, it is preferable to graft only the resin on the surface on the polishing surface side.

(Water Contact Angle)

In the polishing pad of the third aspect of the present invention, the surface on the polishing surface side of the light-transmitting resin member has a water contact angle of 80 degrees or less. The water contact angle is preferably 60 degrees or less, more preferably 50 degrees or less, even more preferably 30 degrees or less, even more preferably 20 degrees or less, even more preferably 1 to 20 degrees, even more preferably 2 to 15 degrees, and even more preferably 3 to 10 degrees. When the water contact angle is within the above range, it is easy to prevent adhesion and sticking of polishing swarf to the surface on the polishing surface side of the light-transmitting resin member (window member).

The reason why the water contact angle within the above range makes it easier to prevent the adhesion and sticking of polishing swarf to the surface on the polishing surface side of the light-transmitting resin member (window member) is presumed as follows.

As described above, it is presumed that in the polishing pad of the third aspect of the present invention, as a result of grafting, the resin on the surface on the polishing surface side of the light-transmitting resin member has long side chains, and while water molecules are adsorbed on the side chains, adjacent side chains have the same charge and repel each other, so many water molecules are adsorbed and wettability is improved. At this time, if the water contact angle of the surface on the polishing surface side of the light-transmitting resin member is hydrophilic with a water contact angle of 80 degrees or less, water molecules adhering to the side chain moiety tend to form a water film, making it easier for polishing swarf to be discharged from the light-transmitting resin member together with the slurry and making it possible to suppress adhesion and sticking of polishing swarf as a result.

In the polishing pad of the third aspect of the present invention, there is no particular limitation on the water contact angle of the back surface and side surface of the light-transmitting resin member. Therefore, the water contact angles of the back surface and the side surface may be greater than 80 degrees. That is, the back surface and the side surface of the light-transmitting resin member do not have to be subjected to grafting.

Window members used in conventional polishing pads generally have a water contact angle greater than 80 degrees. If a window having a water contact angle of 80 degrees or less over the entire surface of the window member is used, the slurry may swell and deform the window, causing the window to peel off the polishing area or cause slurry leakage. Therefore, the window member material is preferably a hydrophobic window member having a water contact angle greater than 80 degrees, and it is preferable that only the surface on the polishing surface side has a water contact angle of 80 degrees or less. In the present invention, it is preferable to use a light-transmitting resin member in which only the resin on the surface on the polishing surface side is grafted and thus the water contact angle on the surface on the polishing surface side is 80 degrees or less (the water contact angle on the side surface and back surface is greater than 80 degrees).

In the polishing pad of the third aspect of the present invention, when the polishing surface is an upper surface and the opposite surface thereof is a lower surface, the grafted surface 9 of the light-transmitting resin member (upper surface of light-transmitting resin member) may be the same as or lower than the polishing surface, preferably lower than the polishing surface (FIG. 2B). Since the grafted surface 9 of the light-transmitting resin member is lower than the polishing surface, it is possible to prevent the occurrence of polishing scratches due to the light-transmitting resin member being harder than the polishing layer. In addition, when the upper surface of the light-transmitting resin member is lower than the polishing surface, in general, polishing swarf enters the concave portion surrounded by the light-transmitting resin member and the side surface of the through hole and tends to adhere and stick to the surface of the light-transmitting resin member, resulting in a decrease in light transmittance over time. However, in the polishing pad of the third aspect of the present invention, since the resin present on the surface of the light-transmitting resin member is grafted with a hydrophilic monomer, even if polishing swarf enters the concave portion, the flow of the entrapped polishing swarf, along with the slurry, can be directed to the side surface of the concave portion and the groove, making it easy to prevent the polishing swarf from adhering or sticking to the surface of the light-transmitting resin member.

(Through Hole)

A through hole is a hole penetrating from the polishing surface to the opposite surface thereof when viewed from the polishing surface side of the polishing pad in a thickness direction of the polishing pad. The through hole preferably penetrates the polishing layer parallel to the thickness direction or perpendicular to the polishing surface.

One through hole may be provided in the polishing layer, or two or more separate, individual through holes may be provided therein.

The shape of the through hole when viewed from the polishing surface side of the polishing pad in a thickness direction of the polishing pad or the shape of the through hole in the polishing surface includes circular, elliptical, triangular, quadrangular, hexagonal, octagonal, and the like. Alternatively, it may be a shape formed by multiple identical or different shapes partially overlapping each other. Among these, a circular shape is preferable because it has no corners where polishing swarf tends to accumulate.

(Equivalent Circle Diameter)

In the present specification and the claims, an equivalent circle diameter is the diameter of a perfect circle corresponding to the area of the figure to be measured.

The equivalent circle diameter of a through hole is the equivalent circle diameter of the through hole when viewed from the polishing surface side of the polishing pad in a thickness direction of the polishing pad, and corresponds to the diameter when the through hole has a circular shape when viewed from the polishing surface side of the polishing pad in a thickness direction of the polishing pad.

The equivalent circle diameter of the through hole is not particularly limited, but is preferably 5 to 40 mm, more preferably 5 to 30 mm, and even more preferably 10 to 28 mm.

Also, the area of the through hole in the polishing surface is preferably 0.003 to more preferably 0.004 to 0.4%, and even more preferably 0.05 to 0.3%, based on the total area of the polishing surface.

(Structure of Polishing Layer)

Examples of resins constituting the polishing layer include polyurethane-based resins such as polyurethane and polyurethane polyurea; acrylic resins such as polyacrylate and polyacrylonitrile; vinyl-based resins such as polyvinyl chloride, polyvinyl acetate, and polyvinylidene fluoride; polysulfone-based resins such as polysulfone and polyethersulfone; acylated cellulose-based resins such as acetylated cellulose and butyrylated cellulose; polyamide-based resins; and polystyrene-based resins. Among these, polyurethane resins are more preferable in consideration of compression characteristics and flexibility.

The polishing layer may be composed of one type of resin, or may be composed of two or more types of resins.

Further, the polishing layer preferably has open cells. The term "open cells" as used herein refers to foams having spaces formed when adjacent cells are connected to each other by communicating holes. Specifically, it may be a resin obtained by the wet film-forming method, or a foam obtained by dry molding or injection molding. The wet film-forming method is preferable, and good bending and stretching motion can be expected.

In the present specification, a resin formed by the wet film-forming method means a resin (preferably polyurethane resin) formed by the wet film-forming method. The wet film-forming method is a method in which a film-forming resin is dissolved in an organic solvent, and the resin solution is applied to a sheet-shaped substrate, and then passed through a coagulation liquid to solidify the resin. Wet film-formed resins generally have multiple teardrop-shaped cells (anisotropic shapes that have a structure with a larger diameter from the polishing surface to the bottom of the polishing pad). Therefore, wet film-formed resins can be rephrased as resins having multiple teardrop-shaped cells. The multiple teardrop-shaped cells are preferably in the form of open cells.

(Groove)

The polishing pad of the third aspect of the present invention preferably has a groove in the polishing surface of the polishing layer. The groove does not penetrate the polishing layer, and can be distinguished from the through hole.

Examples of grooves include embossed grooves obtained by embossing a polishing surface and cut grooves obtained by cutting with a cutting tool. Among these, embossed grooves are preferred. By providing grooves such as embossed grooves, it is possible to obtain a polishing pad that is less likely to have burrs on the polishing surface and is suitable for final polishing.

The depth of the groove is not particularly limited as long as it is smaller than the thickness of the polishing layer, but it is preferably 50 to 90%, more preferably 60 to 80%, of the thickness of the polishing layer. If the groove disappears due to the polishing of the object to be polished, the flow dischargeability on the polishing slurry is lost and the polishing performance deteriorates, reaching the life of the polishing pad. It is therefore preferable that the groove depth is deep. On the other hand, in order to increase the groove depth of the embossed groove, it is necessary to raise the working pressure or raise the working temperature, which may cause deformation of the base material (PET) on the back surface of the polishing layer or deterioration of the surface of the polishing layer. These problems are less likely to occur when the depth of the groove is within the above range.

The cross-sectional shape of the groove is not particularly limited, and may be arc-shaped, U-shaped, V-shaped, rectangular, trapezoidal, and other polygonal shapes, or combinations of two or more of these shapes. Also, the number and shape of the grooves are not particularly limited, and the number and shape of the grooves may be appropriately adjusted according to the use purpose and the like of the polishing pad. The shape may be lattice, radial, concentric, honeycomb, and the like, and may be a combination thereof.

Further, in the polishing pad of the third aspect of the present invention, the surface of the polishing layer may be opened by grinding (buffing) or sliced.

In the polishing pad of the third aspect of the present invention, when the polishing surface is an upper surface and the opposite surface thereof is a lower surface, the grafted surface 9 of the light-transmitting resin member (that is, the upper surface 4' of light-transmitting resin member) may be at a position higher than the bottom portion 8' of the groove, at the same position as the bottom portion 8', or at a level lower than the bottom portion 8', but is preferably at the same level as or lower than the bottom portion 8', and it is preferable that the grafted surface 9 of the light-transmitting resin member is at a level lower than the bottom portion 8' of the groove. A polishing pad generally ends its life when the groove provided in the polishing surface is completely polished away, and when the top portion of the light-transmitting resin member is at the same level as or lower than the bottom portion of the groove, the polishing pad can be used until the groove is polished away.

In addition, in conventional polishing pads in general, if the upper surface 4' of the light-transmitting resin member is positioned at the same level as or lower than the bottom portion 8' of the groove, it becomes difficult to discharge slurry and polishing swarf from the groove, so that a problem may arise that the light transmittance decreases over time. On the other hand, in the polishing pad of the third aspect of the present invention, polishing swarf is unlikely to adhere or stick to the surface of the light-transmitting resin member, making it possible to suppress the decrease in light reduction rate. In addition, in the polishing pad of an embodiment of the present invention (the polishing pad in FIG. 4B or 4C), even when polishing swarf that has entered the concave portion in the first through hole moves to the side surface of the first through hole due to the centrifugal force during the polishing process, and then some of it remains without being discharged from the groove, the polishing swarf becomes difficult to see from the second through hole having a small equivalent circle diameter, making it possible to prevent the decrease in light transmittance. This enables stable optical detection.

The polishing pad of the third aspect of the present invention can be manufactured, for example, by the method described in the section "Method for Manufacturing Polishing Pad of Third Aspect".

<<Polishing Pad of Fourth Aspect>>

A polishing pad of a fourth aspect of the present invention is a polishing pad including: a light-transmitting resin member; and a polishing layer, wherein the polishing layer includes a polishing surface for polishing an object to be polished, and the polishing pad includes a through hole penetrating from the polishing surface to an opposite surface thereof, the light-transmitting resin member is arranged so that the light-transmitting resin member is in the through hole when viewed from the polishing surface side of the polishing pad in a thickness direction of the polishing pad, and the light-transmitting resin member includes, at least on the surface on the polishing surface side thereof, a resin containing a structural unit derived from a polyfunctional (meth)acrylate monomer having two or more polymerizable functional groups and having a —$C_{2-4}$ alkylene-O— unit.

Hereinafter, the resin containing a structural unit derived from a polyfunctional (meth)acrylate monomer having two or more polymerizable functional groups and having a —$C_{2-4}$ alkylene-O— unit may be abbreviated as the resin containing a structural unit derived from a polyfunctional (meth)acrylate monomer. Similarly, the polyfunctional (meth)acrylate monomer having two or more polymerizable functional groups and having a —$C_{2-4}$ alkylene-O— unit may be abbreviated as the polyfunctional (meth)acrylate monomer.

In the present specification and the claims, the polishing layer is a layer that has a surface (polishing surface) to be brought into contact with an object to be polished, including semiconductor devices and other objects to be polished. The object to be polished is not particularly limited, and examples thereof include substrates such as product substrates including multiple memory dies or processor dies, test substrates, bare substrates, and gate substrates. The substrate can be one at various stages of integrated circuit manufacturing, and for example, the substrate can be a bare wafer or can be one or more deposited and/or patterned layers.

Further, referring to FIGS. 2B, 3B, 4B, 4C, and 5B, at least the surface on the polishing surface side of the light-transmitting resin member refers to the surface portion 9 on the polishing surface side of the light-transmitting resin member 4 when the polishing surface is an upper surface and the opposite surface thereof is a lower surface.

<Light-Transmitting Resin Member>

The polishing pad of the fourth aspect of the present invention includes a light-transmitting resin member, that is, a window member. By irradiating the object to be polished with light through the light-transmitting resin member, it is possible to detect when the object to be polished reaches the desired surface characteristics and planarity. A visible light (white light) laser, lamp, or the like is used for optical endpoint detection.

The light-transmitting resin member is arranged so that the light-transmitting resin member is in the through hole when viewed from the polishing surface side of the polishing pad in a thickness direction of the polishing pad. Here, the phrase "arranged so that the light-transmitting resin member is in the through hole when viewed from the polishing surface side of the polishing pad in a thickness direction of the polishing pad" is intended to mean that the light-transmitting resin member is arranged so that it can be seen when the inside of the through hole is viewed in the thickness direction from the polishing surface of the polishing pad, and is a concept that includes (1) the case where, as shown in FIGS. 2B and 3B, the light-transmitting resin member is arranged in contact with (or adhering to) the side surface (side wall) of the through hole provided in the polishing layer, (2) the case where, as shown in FIG. 4B or 4C, an additional layer having a through hole having a smaller equivalent circle diameter than the equivalent circle diameter of the through hole of the polishing layer is provided under the polishing layer, and the light-transmitting resin member is arranged on an exposed portion 7 resulting from the difference in size between the through hole of the polishing layer and the through hole of the additional layer, and (3) the case where, as shown in FIG. 5B, the light-transmitting resin member is sandwiched between the polishing layer and the additional layer, and is arranged such that a portion of the light-transmitting resin member is exposed in the through hole. Among these, (1) or (2) is preferred, and (2) is more preferred.

The light-transmitting resin member is not particularly limited as long as it is a resin transparent enough to transmit light, and examples thereof that can be used include thermosetting resins such as polyurethane resins, polyester resins, phenolic resins, urea resins, melamine resins, epoxy resins, and acrylic resins, thermoplastic resins such as polyurethane resins, polyester resins, polyamide resins, cellulose-based resins, acrylic resins, polycarbonate resins, halogen-based resins (such as polyvinyl chloride, polytetrafluoroethylene, and polyvinylidene fluoride), polystyrene resins, and olefin resins (such as polyethylene and polypropylene), rubbers such as butadiene rubber and isoprene rubber, photocurable resins that cure with ultraviolet rays, electron beams, and the like, and photosensitive resins. Among these, acrylic resins, polyurethane resins, polyester resins, and polystyrene resins are preferred, and acrylic resins are more preferred. By using these resin members, the adhesiveness with the resin containing the polyfunctional (meth)acrylate monomer as a structural unit is improved, and the peeling becomes difficult.

The light-transmitting resin member is not particularly limited as long as it is a resin transparent enough to transmit light, but it has a certain degree of transparency such that the visible light transmittance (sometimes simply referred to as light transmittance in the present specification) when irradiated with light having a wavelength of 380 nm to 780 nm is preferably 60% or more, more preferably 65% or more, even more preferably 70% or more, even more preferably 75% or more, even more preferably 80% or more, and even more preferably 85% or more. The visible light transmittance can be obtained by measuring the transmission spectrum at a wavelength of 300 to 1000 nm with a spectrophotometer and obtaining it as visible light transmittance (%) according to Japanese Industrial Standards (JIS A5759: 2008).

(Polyfunctional (Meth)Acrylate Monomer)

The polishing pad according to the fourth aspect of the present invention includes, at least on the surface on the polishing surface side of the light-transmitting resin member, a resin containing a structural unit derived from a polyfunctional (meth)acrylate monomer having two or more polymerizable functional groups and having a —$C_{2-4}$ alkylene-O— unit.

The phrase "having a —$C_{2-4}$ alkylene-O— unit" means having one or more basic units of —$C_{2-4}$ alkylene-O—. When having one basic unit or repeating multiple basic units, it can be said to have $(—C_{2-4}$ alkylene-O—$)_n$ (n is an integer of 1 or more). Although the number of basic units or the number n is not particularly limited, 1 to 30 are preferred, 2 to 28 are more preferred, 3 to 25 are even more preferred, and 4 to 25 are even more preferred.

The polyfunctional (meth)acrylate monomer may have one type of $—C_{2-4}$ alkylene-O— unit, or may have two or more different types of $—C_{2-4}$ alkylene-O— units.

The number of $—C_{2-4}$ alkylene-O— per polyfunctional (meth)acrylate monomer is preferably 1 to 30, more preferably 2 to 28, even more preferably 3 to 25, and even more preferably 4 to 25.

The $—C_{2-4}$ alkylene-O— units are preferably $—C_{2-3}$ alkylene-O— units. Also, the $—C_{2-4}$ alkylene-O— unit is preferably derived from ethylene oxide ($—CH_2—CH_2—O—$) and/or derived from propylene oxide ($—CH_2—CH(CH_3)—O—$ or $—CH(CH_3)—CH_2—O—$ (preferably $—CH_2—CH(CH_3)—O—$)). The polyfunctional (meth)acrylate monomer is preferably a polyfunctional (meth)acrylate monomer having $—CH_2—CH_2—O—$ units and/or $—CH_2—CH(CH_3)—O—$ units.

The polyfunctional (meth)acrylate monomer contains a $—C_{2-4}$ alkylene-O— unit. The $—C_{2-4}$ alkylene-O— unit may be present in any form in the polyfunctional (meth) acrylate monomer. For example, it may be ester-bonded to the carboxyl group of (meth)acrylic acid, or may be bonded (such as ester bond or ether bond) to a group bonded (such as ester bond or amide bond) to the carboxyl group of (meth)acrylic acid.

In the light-transmitting resin member, at least the surface on the polishing surface side of the light-transmitting resin member may be coated with a resin containing a structural unit derived from a polyfunctional (meth)acrylate monomer, or the light-transmitting resin member itself may be composed of a resin containing a structural unit derived from a polyfunctional (meth)acrylate monomer, but at least the surface on the polishing surface side of the light-transmitting resin member is more preferably coated with a resin containing a structural unit derived from a polyfunctional (meth)acrylate monomer. Coating the surface on the polishing surface side with the resin improves the wettability for slurry, making it possible to suppress variations in light transmittance caused by the presence or absence of slurry on the surface of the light-transmitting resin member. This makes it possible to determine the polishing endpoint with higher accuracy.

In addition, in the light-transmitting resin member, not only the surface on the polishing surface side, but also the surface opposite the polishing surface (back surface) and side surface may be coated with the resin, but coating the back surface and side surface as well leads to an increase in cost, and coating the back surface and side surface has nothing to do with the effects of the present invention, so that only the surface on the polishing surface is preferably coated with the resin.

The thickness of the resin-coated surface layer of the light-transmitting member is not particularly limited, but is preferably 1 to 50 μm. If the thickness of the surface layer is within the above range, high light transmittance can be obtained.

The polyfunctional (meth)acrylate monomer is preferably at least one selected from the group consisting of (i) a monomer in which a compound having a $—C_{2-4}$ alkylene-O— unit and (meth)acrylic acid are ester-bonded and (ii) a monomer in which a trihydric or higher alcohol having a $C_{2-4}$ alkylene oxide added thereto and (meth)acrylic acid are ester-bonded.

The monomer (i) is preferably a monomer formed by ester-bonding a compound having a $—C_{2-3}$ alkylene-O— unit with (meth)acrylic acid.

The monomer (ii) is preferably a monomer formed by ester-bonding an ethylene oxide- and/or propylene oxide-added trihydric or higher alcohol with (meth)acrylic acid.

The above polyfunctional (meth)acrylate monomer (i) is a compound that is formed by ester-bonding a compound having a $—C_{2-4}$ alkylene-O— unit with (meth)acrylic acid, and has both a (meth)acryloyl group and a $—C_{2-4}$ alkylene-O— unit in its molecule.

The above polyfunctional (meth)acrylate monomer (i) is preferably a bifunctional (meth)acrylate monomer. A resin containing a structural unit derived from a bifunctional (meth)acrylate is relatively good in flexibility, so that it has high adhesion to a substrate and can prevent peeling.

The number of $—C_{2-4}$ alkylene-O— per polyfunctional (meth)acrylate monomer (i) is preferably 1 to 30, more preferably 4 to 30, even more preferably 5 to 25, and even more preferably 9 to 25.

Examples of compounds having $—C_{2-4}$ alkylene-O— units include ethylene oxide, propylene oxide, tetramethylene glycol, diethylene oxide, dipropylene oxide, di-tetramethylene glycol, triethylene oxide, tripropylene oxide, tri-tetramethylene glycol, and the like, and compounds formed by combining (poly)ethylene oxide, (poly)propylene oxide, (poly)tetramethylene glycol, and the like with mono(meth) acrylic acid. Among these, compounds formed by combining (poly)ethylene oxide and/or (poly)propylene oxide with mono(meth)acrylic acid are preferred. By further reacting these compounds with other (meth)acrylic acid, polyfunctional, preferably bifunctional (meth)acrylate monomers can be obtained.

Examples of the above monomers (i) include (poly)$C_{2-4}$ alkylene glycol di(meth)acrylates such as (poly)ethylene glycol di(meth)acrylate, (poly)propylene glycol di(meth) acrylate, and (poly)tetramethylene glycol di(meth)acrylate, and methoxy-(poly)$C_{2-4}$ alkylene glycol di(meth)acrylates such as methoxy-(poly)ethylene glycol (meth)acrylate. Among these, (poly)$C_{2-3}$ alkylene glycol di(meth)acrylates ((poly)ethylene glycol di(meth)acrylate and/or (poly)propylene glycol di(meth)acrylate) are preferred, and (poly) ethylene glycol di(meth)acrylate is more preferred.

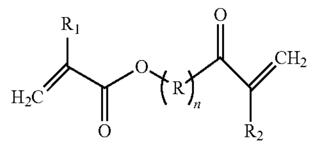

Note that in the present specification and the claims, (poly)ethylene glycol is used as a concept including both one ethylene glycol (monoethylene glycol) and two or more ethylene glycols (such as diethylene glycol, triethylene glycol, and tetraethylene glycol).

Similarly, (poly)propylene glycol is used as a concept including both one propylene glycol (monopropylene glycol) and two or more propylene glycols (such as dipropylene glycol, tripropylene glycol, and tetrapropylene glycol).

Similarly, (poly)tetramethylene glycol is used as a concept including both one tetramethylene glycol (mono-tetramethylene glycol) and two or more tetramethylene glycols (such as di-tetramethylene glycol, tri-tetramethylene glycol, and tetra-tetramethylene glycol).

The mass average molecular weight of the above monomer (i) is preferably 200 to 1500, preferably 300 to 1200, even more preferably 400 to 1400, even more preferably 500 to 1300, and even more preferably 600 to 1200.

The above polyfunctional (meth)acrylate monomer (ii) is a compound that is formed by ester-bonding a trihydric or higher alcohol added with $C_{2-4}$ alkylene oxide with (meth) acrylic acid, and has both a (meth)acryloyl group and a —$C_{2-4}$ alkylene-O— unit in its molecule.

The above polyfunctional (meth)acrylate monomer (ii) is preferably a 3- to 6-functional (meth)acrylate monomer, more preferably a 3- to 5-functional (meth)acrylate monomer, and even more preferably a 3- to 4-functional (meth) acrylate monomer. Such polyfunctional (meth)acrylates accelerate the curing rate during polymerization, increase the crosslink density, and contribute to the improvement of water resistance.

The number of basic units of $C_{2-4}$ alkylene oxide (—$C_{2-4}$ alkylene-O—) per polyfunctional (meth)acrylate monomer (ii) is preferably 1 to 30, more preferably 3 to 30, and even more preferably 3 to 25.

The trihydric or higher alcohol is preferably at least one selected from the group consisting of glycerin, diglycerin, triglycerin, trimethylolpropane, ditrimethylolpropane, erythritol, pentaerythritol, and dipentaerythritol, more preferably at least one selected from the group consisting of glycerin, diglycerin, trimethylolpropane, ditrimethylolpropane, pentaerythritol, and dipentaerythritol, even more preferably at least one selected from the group consisting of glycerin, pentaerythritol, and trimethylolpropane, and even more preferably at least one selected from the group consisting of glycerin and pentaerythritol.

In addition, the trihydric or higher alcohol added with $C_{2-4}$ alkylene oxide is preferably a trihydric or higher alcohol added with $C_{2-3}$ alkylene oxide (ethylene oxide (EO) and/or propylene oxide (PO)).

Examples of the above (ii) monomers include $C_{2-4}$ alkoxylated pentaerythritol tetra(meth)acrylate, $C_{2-4}$ alkoxylated glycerin tri(meth)acrylate, $C_{2-4}$ alkoxylated trimethylolpropane tri(meth)acrylate, and dipentaerythritol hexaacrylate. Among these, $C_{2-3}$ alkoxylated pentaerythritol tetra (meth)acrylate, $C_{2-3}$ alkoxylated glycerin tri(meth)acrylate and/or $C_{2-3}$ alkoxylated trimethylolpropane tri(meth)acrylate are preferred, and $C_{2-3}$ alkoxylated pentaerythritol tetra (meth)acrylate and/or $C_{2-3}$ alkoxylated glycerin tri(meth) acrylate are more preferred.

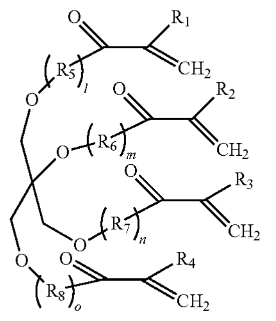

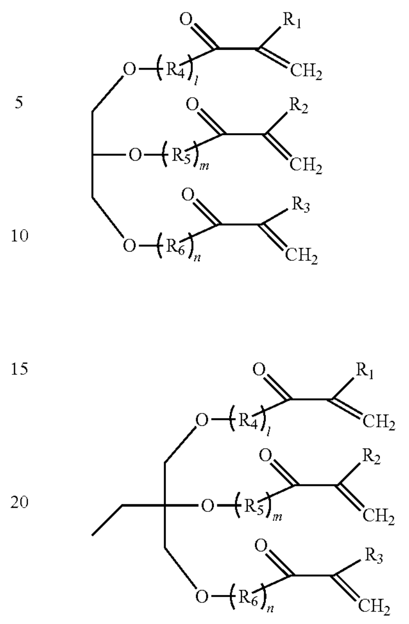

The mass average molecular weight of the above monomer (ii) is preferably 200 to 2000, preferably 300 to 1500, even more preferably 400 and 1300, and even more preferably 500 to 1200.

The above polyfunctional (meth)acrylate monomers (i) and (ii) are each preferably at least one selected from the group consisting of polyethylene glycol diacrylate, polypropylene glycol diacrylate, ethoxylated pentaerythritol tetraacrylate, propoxylated pentaerythritol tetraacrylate, ethoxylated glycerin triacrylate, propoxylated glycerin triacrylate, ethoxylated trimethylolpropane triacrylate, and propoxylated trimethylolpropane triacrylate, more preferably at least one selected from the group consisting of polyethylene glycol diacrylate, polypropylene glycol diacrylate, ethoxylated pentaerythritol tetraacrylate, propoxylated pentaerythritol tetraacrylate, ethoxylated glycerin triacrylate, and propoxylated glycerin triacrylate, and even more preferably at least one selected from the group consisting of polyethylene glycol diacrylate, ethoxylated pentaerythritol tetraacrylate, propoxylated pentaerythritol tetraacrylate, and ethoxylated glycerin triacrylate.

Specific examples of polyfunctional (meth)acrylate monomers preferably used in the present invention include polyethylene glycol diacrylate ("EBECRYL 11" manufactured by Daicel-Allnex Ltd. and "A-1000" manufactured by Shin-Nakamura Chemical Co., Ltd.), $C_{2-3}$ alkoxylated pentaerythritol tetraacrylate ("EBECRYL 40" manufactured by Daicel-Allnex Ltd.), and ethoxylated glycerin triacrylate ("A-GLY-20E" manufactured by Shin-Nakamura Chemical Co., Ltd.).

The content of the monomer in the resin containing a structural unit derived from a polyfunctional (meth)acrylate monomer is preferably 30 to 100 parts by mass, more preferably 40 to 100 parts by mass, even more preferably 45 to 100 parts by mass, even more preferably 70 to 100 parts by mass, even more preferably 80 to 100 parts by mass, and may be 100 parts by mass, based on 100 parts by mass of all monomer components constituting the resin. The content of the monomer is also preferably 40 to 60 parts by mass based on 100 parts by mass of all constituent components of the resin.

The mass average molecular weight of the resin containing a structural unit derived from a polyfunctional (meth) acrylate monomer is not particularly limited, and resins having various mass average molecular weights can be used. For example, the resin may have a mass average molecular weight of 500 to 30000. If the molecular weight is 500 or more, high hydrophilicity is exhibited, and sufficient durability can be obtained due to the increase in molecular weight upon cross-linking. If the molecular weight is 30000 or less, uniform coating is possible without an excessive increase in viscosity. Also, the mass average molecular weight of the resin may be 600 to 20000, or 700 to 15000.

A polyfunctional (meth)acrylate monomer has two or more polymerizable functional groups. The polyfunctional (meth) acrylate monomer preferably has 2 to 6 polymerizable functional groups, more preferably has 2 to 5 polymerizable functional groups, and further preferably has 2 to 4 polymerizable functional groups.

The polymerizable functional group is preferably an ethylenically unsaturated double bond (unsaturated double bond between carbon atoms), and more preferably an ethylenically unsaturated double bond present in a (meth) acryloyl group (unsaturated double bond between carbon atoms).

Moreover, the resin containing a structural unit derived from a polyfunctional (meth)acrylate may further contain a structural unit derived from urethane (meth)acrylate. By further containing a structural unit derived from urethane (meth)acrylate, it becomes easier to improve adhesion to the light-transmitting resin member and curability. Moreover, it becomes easy to suppress the swelling by polishing slurry.

Urethane (meth)acrylate is a compound having a urethane bond obtained by reacting an isocyanate group and a hydroxy group and a (meth)acryloyl group. The urethane (meth)acrylate preferably has 2 or more polymerizable functional groups, more preferably has 2 to 4 polymerizable functional groups, even more preferably has 2 or 3 polymerizable functional groups, and even more preferably 2 polymerizable functional groups. The polymerizable functional group is preferably an ethylenically unsaturated double bond (unsaturated double bond between carbon atoms), and more preferably an ethylenically unsaturated double bond present in a (meth)acryloyl group (unsaturated double bond between carbon atoms).

Examples of urethane (meth)acrylates include aliphatic urethane (meth)acrylates and aromatic urethane (meth)acrylates. Moreover, the urethane (meth)acrylates are preferably free of a structure derived from polysiloxane.

Urethane (meth)acrylates are obtained, for example, by reacting a hydroxy compound having at least two (meth) acryloyl groups with an isocyanate. Examples of the isocyanate include aliphatic polyisocyanate and aromatic polyisocyanate.

Aliphatic urethane (meth)acrylates are obtained, for example, by reacting a hydroxy compound having at least two (meth)acryloyl groups with an aliphatic isocyanate. Examples of the aliphatic isocyanate include aliphatic diisocyanate and aliphatic triisocyanate.

Aromatic urethane (meth)acrylates are obtained, for example, by reacting a hydroxy compound having at least two (meth)acryloyl groups with an aromatic isocyanate. Examples of the aromatic isocyanate include aromatic diisocyanate and aromatic triisocyanate.

When the resin containing a structural unit derived from a polyfunctional (meth)acrylate monomer contains a structural unit derived from urethane (meth)acrylate, the content of the urethane (meth)acrylate is preferably 70 parts by mass or less, more preferably 60 parts by mass or less, and even more preferably 55 parts by mass or less, based on 100 parts by mass of all the monomer components constituting the resin. It is also preferable that the constituent component derived from the urethane (meth)acrylate monomer is 40 to 60 parts by mass based on 100 parts by mass of all the monomer components of the resin.

There is no particular limitation on the method of coating with the resin containing a structural unit derived from a polyfunctional (meth)acrylate monomer. For example, the polyfunctional (meth)acrylate monomer and, if necessary, other monomers or oligomers (preferably acrylic monomers or oligomers) can be polymerized (solution polymerization or photopolymerization) by a usual method. Among these, photopolymerization is preferred.

In the case of using solution polymerization, while a solution containing the above monomers and the like and a polymerization initiator (such as a catalyst) is applied to the surface of the light-transmitting resin member and dried, the polymerization reaction proceeds and a coating can be obtained.

In the case of using photopolymerization, a coating can be obtained by applying a solution containing the above monomers and the like and a photopolymerization initiator to the surface of the light-transmitting resin member and irradiating it with ultraviolet rays.

The photopolymerization initiator is not particularly limited as long as it can cure the photocurable resin by irradiation with ultraviolet rays, electron beams, or the like, and conventionally known photopolymerization initiators can be used. Examples thereof include radical polymerization initiators, cationic polymerization initiators, and anionic polymerization initiators. Commercially available products include Irgacure (manufactured by IGM Resin B.V.).

<Arrangement of Light-Transmitting Resin Member>

In the polishing pad of the fourth aspect of the present invention, when the polishing surface is an upper surface and the opposite surface thereof is a lower surface, the top portion of the light-transmitting resin member may be at the same height as the polishing surface or lower than the polishing surface, and is preferably lower than the polishing surface (FIG. 2B). Since the top portion of the light-transmitting resin member is lower than the polishing surface, it is possible to prevent the occurrence of polishing scratches due to the light-transmitting resin member being harder than the polishing layer. Also, if the top portion of the light-transmitting resin member is lower than the polishing surface, slurry enters the concave portion surrounded by the light-transmitting resin member and the side surface of the through hole, and most of it moves to the side surface of the through hole due to centrifugal force and is discharged through the groove, so that the odds are even that a small amount of slurry may remain on the surface of the light-transmitting resin member. In the case of using a conventional polishing pad, the light transmittance differs depending on whether or not a small amount of slurry remains on the surface of the light-transmitting resin member, so that it is difficult to determine the polishing endpoint with high accuracy. Meanwhile, the polishing pad of the fourth aspect of the present invention has good compatibility with slurry because the resin containing a structural unit derived from a polyfunctional (meth)acrylate monomer is present on the surface on the polishing surface side of the light-transmitting resin member. For this reason, even if a small amount of slurry is present, it spreads uniformly on the window surface, thereby reducing fluctuations in light transmittance from the initial stage of polishing to the end. Therefore, even when the top portion of the light-transmitting resin member is at a level lower than the polishing surface, it is possible to determine the polishing endpoint with high accuracy.

(Transmittance)

In the polishing pad of the fourth aspect of the present invention, the difference between the visible light transmittance (sometimes simply referred to as light transmittance in the present specification) when water is not adhered to the surface on the polishing surface side of the light-transmitting resin member and the visible light transmittance when water is adhered to the surface on the polishing surface side of the light-transmitting resin member is preferably 10% or less. When the difference in light transmittance is within the above range, differences in light transmittance between the presence and absence of slurry on the surface of the light-transmitting resin member are less likely to occur, making it possible to determine the polishing endpoint with high accuracy.

The light transmittance can be obtained by measuring the transmission spectrum at a wavelength of 300 to 1000 nm with a spectrophotometer and obtaining it as visible light transmittance (%) according to Japanese Industrial Standards (JIS A5759: 2008). That is, the transmittance is obtained by measuring the transmittance of each wavelength in the wavelength range of 380 to 780 nm, and multiplying the transmittance at each wavelength by the weighted coefficient obtained from the spectral distribution of CIE (Commission Internationale de l'Eclairage) illuminant D65, the wavelength distribution of the CIE photopic normalized luminous efficiency, and the wavelength interval to perform weighted averaging.

Also, the light transmittance when water is adhered to the surface on the polishing surface side of the light-transmitting resin member can be measured as follows. A sufficient amount of water (for example, about 0.01 to 0.03 mL for a light-transmitting resin member cut into a size of 9 mm×50 mm) is adhered by spraying to the entire surface on the polishing surface side of the light-transmitting resin member, and then the light-transmitting resin member is allowed to stand perpendicularly to the ground for 60 seconds to drain moisture from the light-transmitting resin member.

(Through Hole)

A through hole is a hole penetrating from the polishing surface to the opposite surface thereof when viewed from the polishing surface side of the polishing pad in a thickness direction of the polishing pad. The through hole preferably penetrates the polishing layer parallel to the thickness direction or perpendicular to the polishing surface. One through hole may be provided in the polishing layer, or two or more separate, individual through holes may be provided therein.

The shape of the through hole when viewed from the polishing surface side of the polishing pad in a thickness direction of the polishing pad or the shape of the through hole in the polishing surface includes circular, elliptical, triangular, quadrangular, hexagonal, octagonal, and the like. Alternatively, it may be a shape formed by multiple identical or different shapes partially overlapping each other. Among these, a circular shape is preferable, because it has no corners where polishing swarf tends to accumulate.

(Equivalent Circle Diameter)

In the present specification and the claims, an equivalent circle diameter is the diameter of a perfect circle corresponding to the area of the figure to be measured.

The equivalent circle diameter of a through hole is the equivalent circle diameter of the through hole when viewed from the polishing surface side of the polishing pad in a thickness direction of the polishing pad, and corresponds to the diameter when the through hole has a circular shape when viewed from the polishing surface side of the polishing pad in a thickness direction of the polishing pad.

The equivalent circle diameter of the through hole is not particularly limited, but is preferably 5 to 40 mm, more preferably 5 to 30 mm, and even more preferably 8 to 28 mm.

Also, the area of the through hole in the polishing surface is preferably 0.003 to 0.5%, more preferably 0.004 to 0.4%, and even more preferably 0.005 to 0.3%, based on the total area of the polishing surface.

(Structure of Polishing Layer)

Examples of resins constituting the polishing layer include polyurethane-based resins such as polyurethane and polyurethane polyurea; acrylic resins such as polyacrylate and polyacrylonitrile; vinyl-based resins such as polyvinyl chloride, polyvinyl acetate, and polyvinylidene fluoride; polysulfone-based resins such as polysulfone and polyethersulfone; acylated cellulose-based resins such as acetylated cellulose and butyrylated cellulose; polyamide-based resins; and polystyrene-based resins. Among these, polyurethane resins are more preferable in consideration of compression characteristics and flexibility.

The polishing layer may be composed of one type of resin, or may be composed of two or more types of resins.

Further, the polishing layer preferably has open cells. The term "open cells" as used herein refers to foams having spaces formed when adjacent cells are connected to each other by communicating holes. Specifically, it may be a resin obtained by the wet film-forming method, or a foam obtained by dry molding or injection molding. The wet film-forming method is preferable, and good bending and stretching motion can be expected.

In the present specification, a resin formed by the wet film-forming method means a resin (preferably polyurethane resin) formed by the wet film-forming method. The wet film-forming method is a method in which a film-forming resin is dissolved in an organic solvent, and the resin solution is applied to a sheet-shaped substrate, and then passed through a coagulation liquid to solidify the resin. Wet film-formed resins generally have multiple teardrop-shaped cells (anisotropic shapes that have a structure with a larger diameter from the polishing surface to the bottom of the polishing pad). Therefore, wet film-formed resins can be rephrased as resins having multiple teardrop-shaped cells. The multiple teardrop-shaped cells are preferably in the form of open cells.

The polishing layer constituting the polishing pad of the fourth aspect of the present invention is preferably a resin sheet (preferably a polyurethane sheet) formed by the wet film-forming method, more preferably a polyurethane sheet containing multiple teardrop-shaped cells, and even more preferably a polyurethane sheet having open cells containing multiple teardrop-shaped cells, with some or all of the cells being connected by communicating holes.

(Groove)

The polishing pad of the fourth aspect of the present invention preferably has a groove in the polishing surface of the polishing layer. The groove does not penetrate the polishing layer, and can be distinguished from the through hole.

Examples of grooves include embossed grooves obtained by embossing a polishing surface and cut grooves obtained by cutting with a cutting tool. Among these, embossed grooves are preferred. By providing grooves such as embossed grooves, it is possible to obtain a polishing pad that is less likely to have burrs on the polishing surface and is suitable for final polishing.

The depth of the groove is not particularly limited as long as it is smaller than the thickness of the polishing layer, but it is preferably 50 to 90%, more preferably 60 to 80%, of the thickness of the polishing layer. If the groove disappears due to the polishing of the object to be polished, the flow dischargeability on the polishing slurry is lost and the polishing performance deteriorates, reaching the life of the polishing pad. It is therefore preferable that the groove depth is deep. On the other hand, in order to increase the groove depth of the embossed groove, it is necessary to raise the working pressure or raise the working temperature, which may cause deformation of the base material (PET) on the back surface of the polishing layer or deterioration of the surface of the polishing layer, or the like. These problems are less likely to occur when the depth of the groove is within the above range.

The cross-sectional shape of the groove is not particularly limited, and may be arc-shaped, U-shaped, V-shaped, rectangular, trapezoidal, and other polygonal shapes, or combinations of two or more of these shapes. Also, the number and shape of the grooves are not particularly limited, and the number and shape of the grooves may be appropriately adjusted according to the use purpose and the like of the polishing pad. The shape may be lattice, radial, concentric, honeycomb, and the like, and may be a combination thereof.

Further, in the polishing pad of the fourth aspect of the present invention, the surface of the polishing layer may be opened by grinding (buffing) or sliced.

In the polishing pad of the fourth aspect of the present invention, when the polishing surface is an upper surface and the opposite surface thereof is a lower surface, the top portion 4' of the light-transmitting resin member (that is, the upper surface of the resin containing a structural unit derived from a polyfunctional (meth)acrylate monomer) may be at a position higher than the bottom portion 8' of the groove, at the same position as the bottom portion 8', or at a level lower than the bottom portion 8', but is preferably at the same level as or higher than the bottom portion 8', and it is more preferable that the top portion 4' of the light-transmitting resin member is at a level higher than the bottom portion 8' of the groove. In the polishing pad of an embodiment of the present invention (the polishing pad in FIG. 4B or 4C), slurry and polishing swarf that have entered the concave portion in the first through hole move to the groove due to the centrifugal force during the polishing process, making it possible to prevent the decrease in light transmittance. Furthermore, even if most of the slurry has moved to the groove but only a small amount of slurry remains on the surface of the light-transmitting resin member, a decrease in light transmittance due to slurry is less likely to occur, enabling stable optical detection.

(Advantage)

In the polishing pad of the fourth aspect of the present invention, at least the surface on the polishing surface side of the light-transmitting member includes a resin containing a structural unit derived from a polyfunctional (meth)acrylate monomer, so that wettability for slurry is improved, and whether slurry is present or absent on the surface on the polishing surface side of the light-transmitting member has little effect on the light transmittance. This makes it possible to determine the polishing endpoint with high accuracy.

In addition, when the polishing surface is an upper surface and the opposite surface thereof is a lower surface, the polishing pad of the fourth aspect of the present invention takes its effect even whether the surface on the polishing surface side of the light-transmitting member is at the same height as the polishing surface or at a level lower than the polishing surface, and takes more of its effect particularly when the surface on the polishing surface side of the light-transmitting member is at a level lower than the polishing surface. Specifically, when the surface on the polishing surface side of the light-transmitting member is at a level lower than the polishing surface, there is a concave portion (such as a cylindrical concave portion) surrounded by the surface of the light-transmitting member and the side surface of the through hole, and the slurry flows therein. Most of the slurry that has entered the concave portion moves to the side surface under the influence of centrifugal force and can be discharged through the embossed groove, so that with time, there can occur timings when the slurry is present in the area of the surface of the light-transmitting member to be transmitted with laser beams (such as a timing when a large amount of slurry has flowed into the concave portion and a timing when the slurry cannot be fully discharged) and timings when the slurry is not present therein. In the polishing pad of the fourth aspect of the present invention, the surface on the polishing surface side of the light-transmitting member contains the resin containing a structural unit derived from a polyfunctional (meth)acrylate monomer, so that it is possible to reduce the fluctuations in light transmittance that occurs between the case where slurry is adhered and the case where slurry is not adhered, thereby suppressing the variations in light transmittance during the polishing process.

In addition, since the light-transmitting resin member includes, at least on the surface on the polishing surface side thereof, a resin containing a structural unit derived from a polyfunctional (meth)acrylate monomer, the polishing pad of the fourth aspect of the present invention has high chemical resistance, and can prevent deterioration of the light-transmitting resin member in both cases of using an acidic slurry and an alkaline slurry.

The polishing pad of the fourth aspect of the present invention can be manufactured, for example, by the method described in the section "Method for Manufacturing Polishing Pad of Fourth Aspect".

<Configurations Common to First to Fourth Aspects>

(Shore A Hardness)

In the present specification, Shore A hardness means a value measured according to Japanese Industrial Standards (JIS K7311).

In the polishing pads of the first to fourth aspects of the present invention, the Shore A hardness of the polishing layer is preferably 5 to 70 degrees)(°, more preferably 8 to 65 degrees. A Shore A hardness of the polishing layer falling within the above range curtails excessive contact of polishing swarf with the object to be polished, thereby suppressing the occurrence of scratches.

Further, in the polishing pads of the first to fourth aspects of the present invention, the polishing layer is preferably softer than the light-transmitting member or light-transmitting resin member, and more preferably has a Shore A hardness lower than that of the light-transmitting member or light-transmitting resin member.

(Compressibility and Compression Modulus)

In the present specification, a compressibility is an index of softness, and a compression modulus is an index of resilience after compressive deformation.

The compressibility and compression modulus can be determined using a Schopper-type thickness gauge (pressurized surface: circular with a diameter of 1 cm) according to Japanese Industrial Standards (JIS L1021). Specifically, it is as follows.

The thickness $t_0$ is measured after applying the initial load for 30 seconds from the no-load state, and then the thickness $t_1$ is measured after applying the final load for 5 minutes from the thickness $t_0$. Next, all the load is removed from the state of the thickness $t_1$, and after being left for 5 minutes (no load state), the thickness to' is measured after the initial load is applied again for 30 seconds.

The compressibility can be calculated by the formula compressibility (%)=$100\times(t_0-t_1)/t_0$ (the initial load is 100 g/cm$^2$ and the final load is 1120 g/cm$^2$).

The compression modulus can be calculated by the formula compression modulus (%)=$100\times(t_0'-t_1)/(t_0-t_1)$ (the initial load is 100 g/cm$^2$ and the final load is 1120 g/cm$^2$).

The compressibility of the polishing layer is preferably 1 to 60%, more preferably 3 to 50%. The compression modulus of the polishing layer is preferably 50 to 100%, more preferably 60 to 98%. When the compressibility and compression modulus are within the above ranges, the polishing layer is compressed when the object to be polished passes over the through hole, and is excellent in recoverability after being pushed by the object to be polished, so that the bending and stretching motion of the polishing layer causes the slurry to flow inside the through hole, and the slurry circulates without remaining in the through hole, and polishing swarf entering the through hole together with the slurry is easily discharged out of the through hole by compression and recovery operations. This makes it easier to prevent polishing swarf from accumulating in the through hole.

(Thickness)

The thickness can be determined using a Schopper-type thickness gauge (pressurized surface: circular with a diameter of 1 cm) according to Japanese Industrial Standards (JIS K6505). Specifically, it is as follows.

A sample of 10 cm square in length and width is prepared. The sample is placed with its face up on the measuring instrument. A pressurized surface with a load of 100 g/cm$^2$ is placed on the sample, and the thickness is measured after 5 seconds. Measurement is performed at 5 points per sheet, and the average value is taken as the thickness. Note that if a 10 cm square sample cannot be taken, the average of five points is used.

Although the thickness of the polishing layer is not particularly limited, it is preferably 0.5 to 2 mm, and even more preferably 0.75 to 1.55 mm.

(Layers Other Than Polishing Layer)

The polishing pads of the first to fourth aspects of the present invention may have a layer (additional layer) other than the polishing layer. One or more additional layers may be present on the surface opposite the polishing surface of the polishing layer. The additional layer has a through hole as with the polishing layer.

Also, the shape of the through hole of the polishing layer and the shape of the through hole of the additional layer may be the same or different, but the through hole of the polishing layer and the through hole of the additional layer preferably at least partially overlap when the polishing pad is viewed from the polishing surface side in the thickness direction. Accordingly, when the light-transmitting member or the light-transmitting resin member is irradiated with light, the light passes through the light-transmitting member or the light-transmitting resin member.

As an aspect of the present invention, when the polishing pad includes an additional layer, the additional layer may have a through hole (second through hole) having a smaller equivalent circle diameter than the through hole (first through hole) present in the polishing layer (FIG. 4A or 4B). The additional layer is a layer located on the opposite side of the polishing layer to the polishing surface.

It is preferable that when the polishing pad of this aspect is viewed in the thickness direction from the polishing surface side, the first through hole and the second through hole at least partially overlap each other. Further, it is preferable that the light-transmitting member or light-transmitting resin member is arranged so that the light-transmitting member or light-transmitting resin member is in the first through hole, when viewed from the polishing surface side of the polishing pad in the thickness direction of the polishing pad.

In the polishing pad of this aspect, when viewed in the thickness direction from the polishing surface side of the polishing pad, it is preferable the outer peripheral portion of the first through hole 5 covers part or all of the outer peripheral portion of the second through hole 6, it is more preferable the outer peripheral portion of the first through hole covers the entire outer peripheral portion of the second through hole 6, and it is even more preferable that both the first through hole 5 and the second through hole 6 are cylindrical, and the cylindrical central axis of the first through hole 5 and the cylindrical central axis of the second through hole 6 coincide.

The phrase, the outer peripheral portion of the first through hole covers the entire outer peripheral portion of the second through hole, means that the diameter of the first through hole 5 is larger than the diameter of the second through hole 6, and the outer peripheral portion of the first through hole 5 is present outside the outer peripheral portion of the second through hole 6, like a double circle.

Here, the phrase, the first through hole and the second through hole at least partially overlap each other when viewed in the thickness direction from the polishing surface side, means that the opening position of the first through hole and the opening position of the second through hole are at least partially aligned when viewed in the thickness direction from the polishing surface side. In the polishing pad of this aspect, the opening position of the first through hole and the opening position of the second through hole are at least partially aligned when viewed in the thickness direction, so that the first through hole and the second through hole are connected in the thickness direction of the polishing pad. Since the positions of the first through hole and the second through hole at least partially overlap each other when viewed in the thickness direction from the polishing surface side, it is possible to transmit light from the second through hole side to the first through hole side via the light-transmitting member or the light-transmitting resin member provided in the first through hole, making it possible to optically detect the surface state of the object to be polished during polishing process.

In the polishing pad of this aspect, it is preferable that the light-transmitting member or the light-transmitting resin member is arranged so that the light-transmitting member 4 or the light-transmitting resin member 4 is in the first through hole 5, when viewed from the polishing surface side of the polishing pad in a thickness direction of the polishing pad. Moreover, it is preferable that the light-transmitting member 4 or the light-transmitting resin member 4 is provided inside the first through hole 5.

Here, the phrase, the light-transmitting member or the light-transmitting resin member is arranged so that the light-transmitting member or the light-transmitting resin member is in the first through hole, when viewed from the polishing surface side of the polishing pad in the thickness direction of the polishing pad, means that the light-transmitting member or the light-transmitting resin member can be seen when the inside of the first through hole is viewed in the thickness direction of the polishing pad from the polishing surface side of the polishing pad.

In addition, the first through hole 5 is preferably arranged so that a portion of the additional layer 3 (hereinafter referred to as an exposed portion 7 of the additional layer) and at least a portion of the second through hole 6 are exposed, when the polishing pad 1 is viewed from the polishing surface side in the thickness direction. As a result, the light-transmitting member 4 or the light-transmitting resin member 4 can be placed inside the first through hole 5 as well as on the second through hole 6 and the exposed portion 7 of the additional layer 3. Preferably, the first through hole 5 is arranged so that part of the additional layer 3 and all of the second through hole 6 are exposed when the first through hole 5 is viewed from the polishing surface side. Moreover, it is preferable that the light-transmitting member 4 or the light-transmitting resin member 4 is provided in the first through hole 5 and adhered to the exposed portion 7 of the additional layer 3. Referring to FIG. 4A or FIG. 4B, in the cross sections in the thickness direction of the polishing pads 1 of the first to fourth aspects of the present invention, the first through hole 5 is provided in the polishing layer 2 on the second through hole 6 and the exposed portion 7. Note that there may be provided a further additional layer between the additional layer 3 having the exposed portion 7 and the polishing layer 2. In this case, it is preferable that the through hole present in the further additional layer has the same cross-sectional shape (cross-sectional shape horizontal to the polishing surface) as the through hole (first through hole) of the polishing layer 2, and completely overlap the first through hole 5 when viewed in the thickness direction from the polishing surface. It is preferable that the light-transmitting member 4 or the light-transmitting resin member 4 is arranged on the second through hole 6 and the exposed portion 7 and inside the first through hole 5 of the polishing layer 2 and the through hole of further additional layer.

One second through hole may be provided in the additional layer, or two or more separated, independent through holes may be provided. It is preferable that the number of the first through holes and the number of the second through holes are equal. When multiple first through holes and multiple second through holes are provided, each first through hole is preferably provided on each second through hole provided in the additional layer and the exposed portion thereof.

The second through hole preferably penetrates the additional layer parallel to the thickness direction or perpendicular to the polishing surface.

In the polishing pads of the first to fourth aspects of the present invention, the cross-sectional shape of the first through hole and the cross-sectional shape of the second through hole when cut perpendicularly to the thickness direction may have the same shape or different shapes, but preferably have the same shape.

The shape of the second through hole when viewed from the polishing surface side of the polishing pad in a thickness direction of the polishing pad, the cross-sectional shape of the second through hole when cut perpendicularly to the thickness direction of the polishing pad, and/or the shape of the second through hole in the surface of the additional layer include circular, elliptical, triangular, quadrangular, hexagonal, octagonal, and combinations of these shapes. Alternatively, it may be a shape formed by multiple identical or different shapes partially overlapping each other. Among these, a circular shape is preferable.

(Equivalent Circle Diameter)

In the present specification and the claims, the equivalent circle diameter of a second through hole is the equivalent circle diameter of the second through hole when viewed from the polishing surface side of the polishing pad in a thickness direction of the polishing pad, and corresponds to the diameter when the shape of the second through hole is circular when viewed from the polishing surface side of the polishing pad in a thickness direction of the polishing pad.

It is preferable that the equivalent circle diameter of the first through hole is larger than the equivalent circle diameter of the second through hole. The equivalent circle diameter of the second through hole is not particularly limited as long as the equivalent circle diameter of the first through hole is larger than the equivalent circle diameter of the second through hole, but the equivalent circle diameter of the second through hole is preferably 1 to 20 mm, more preferably 2 to 18 mm, and even more preferably 5 to 15 mm. Moreover, there is no particular limitation on the difference between the equivalent circle diameter of the first through hole and the equivalent circle diameter of the second through hole, but the equivalent circle diameter of the first through hole is preferably 5 to 30 mm larger, more preferably 6 to 25 mm larger, and even more preferably 7 to 20 mm larger, than the equivalent circle diameter of the second through hole.

In addition, when viewed in the thickness direction from the polishing surface side of the polishing pad, the outer peripheral portion of the first through hole is provided so as to cover the entire outer peripheral portion of the second through hole, and the equivalent circle diameter of the first though hole is preferably 5 to 30 mm larger, more preferably 6 to 25 mm larger, even more preferably 7 to 20 mm larger, even more preferably 8 to 20 mm larger, even more preferably 9 to 20 mm larger, and even more preferably 10 to 20 mm larger, than the equivalent circle diameter of the second through hole.

In addition, when viewed in the thickness direction from the polishing surface side of the polishing pad, the outer peripheral portion of the first through hole is provided so as to cover the entire outer peripheral portion of the second through hole, and the equivalent circle diameter of the first through hole is preferably 1.5 to 4 times, more preferably 2 to 4 times, and even more preferably 2.5 to 3 times, the equivalent circle diameter of the second through hole.

In addition, when viewed from the polishing surface side of the polishing pad in a thickness direction of the polishing pad, the shortest distance between the outer peripheral portion of the second through hole and the outer peripheral portion of the first through hole (that is, the shortest distance between a given point on the outer peripheral portion of the second through hole and a given point on the outer peripheral portion of the first through hole) is preferably greater than 0, the shortest distance is more preferably 2 to 15 mm, the shortest distance is even more preferably 3 to 12 mm, and the shortest distance is 4 to 10 mm.

If the difference in size between the first through hole and the second through hole is within the above range, slurry and polishing swarf that have entered the concave portion in the first through hole move to the outer peripheral side due to the centrifugal force during the polishing process, and are difficult to see from the second through hole having a small equivalent circle diameter, making it possible to prevent clogging of the optical path with polishing swarf when the light-transmitting member or the light-transmitting resin member is irradiated with light. Therefore, excellent light transmittance can be maintained, and stable signal intensity for endpoint detection can be obtained during polishing. In addition, since the area of the exposed portion is sufficiently large, the adhesive strength between the light-transmitting member or light-transmitting resin member and the additional layer can be maintained, and peeling of the light-transmitting member or light-transmitting resin member can be prevented. In addition, even if most of the slurry has moved to the side surface of the concave portion but only a small amount of slurry remains on the surface of the light-transmitting member or light-transmitting resin member, variations in light transmittance due to the presence or absence of slurry are less likely to occur in the polishing pads of the first to fourth aspects of the present invention, enabling stable optical detection. In addition, as another aspect, when the polishing pads of the first to fourth aspects of the present invention include an additional layer, the sheet-shaped light-transmitting member or light-transmitting resin member may be arranged to be sandwiched between the polishing layer and the additional layer so that part of the light-transmitting member or light-transmitting resin member is exposed in the through hole (FIG. 5A or 5B). At this time, when viewed in the thickness direction from the polishing surface side, the through hole (second through hole) present in the additional layer and the through hole (first through hole) present in the polishing layer preferably at least partially overlap each other, more preferably completely overlap each other. At this time, the polishing layer preferably has open cells with communicating holes.

When the polishing layer has open cells with communicating holes, the open cells are also opened on the side surface of the first through hole provided in the polishing layer, so that some of them communicate with the polishing surface or the groove region. As a result, the slurry and polishing swarf that have entered the first through hole during polishing move to the side surface of the first through hole due to the centrifugal force generated during polishing process, and are discharged to the polishing surface and groove region through the open cells having communicating holes, so that it is possible to prevent deterioration of the light transmittance over time due to the accumulation of polishing swarf in the first through hole, leading to a longer lifespan of the polishing pad.

In addition, as another aspect, when the polishing pads of the first to fourth aspects of the present invention include an additional layer, one may provide through holes in both the polishing layer and the additional layer provided below, and arrange the light-transmitting member or light-transmitting resin member so as to be in contact with (or adhering to) the side surface of one or both of the through holes (preferably the side surface of the additional layer) (FIG. 6A or 6B). At this time, when viewed in the thickness direction from the polishing surface side, the through hole (second through hole) present in the additional layer and the through hole (first through hole) present in the polishing layer preferably at least partially overlap each other, more preferably completely overlap each other. The light-transmitting member or light-transmitting resin member is preferably adhered to the side surface of the second through hole. Moreover, it is preferable that the light-transmitting member or light-transmitting resin member is not in the first through hole.

Since the light-transmitting member or the light-transmitting resin member is adhered to the side surface of the second through hole of the additional layer, the thickness of the polishing layer that can be used for polishing is maximized, and even if the polishing surface is scraped due to wear during dressing or polishing, the light-transmitting member or the light-transmitting resin member does not protrude from the polishing surface, thereby reducing the occurrence of scratches. In general, the softer the polishing layer of the polishing pad, the more likely it is that the polishing pad will sink when the polishing pad is pressed against the wafer, causing the light-transmitting member or the light-transmitting resin member to protrude. A polishing pad with protrusions cannot be used for polishing an object to be polished. Since the polishing pad of this aspect can prevent the light-transmitting member or the light-transmitting resin member from protruding, it is possible to extend the lifespan of the polishing pad. Also, if the light-transmitting member or the light-transmitting resin member is not joined to the polishing layer, but is arranged so as to adhere to the side surface of the second through hole, even if the polishing layer is provided with an expansion mechanism so that the polishing swarf that has entered the first through hole can be easily discharged to the groove or polishing surface, distortion is less likely to occur at the adhesion portion of the light-transmitting member or the light-transmitting resin member, making it possible to suppress the peeling of the light-transmitting member or the light-transmitting resin member.

(Structure of Additional Layer)

Examples of materials constituting the additional layer include polyolefin-based sheets such as polyethylene (PE), polypropylene (PP), and ethylenepropylene copolymers, polyester-based sheets such as polyethylene terephthalate (PET), polybutylene terephthalate (PBT), and polyethylene naphthalate (PEN), vinyl chloride-based sheets, vinyl acetate-based sheets, polyimide-based sheets, polyamide-based sheets, fluororesin-based sheets, resin-impregnated non-woven fabrics, non-woven fabrics, and woven fabrics. Also, the additional layer is preferably a non-porous sheet into which the slurry does not permeate. Among these, the additional layer is a non-porous sheet into which the slurry does not permeate, more preferably a polyester-based sheet, and among these, particularly preferably a sheet made of polyethylene terephthalate (hereinafter abbreviated as PET), from the viewpoint of physical characteristics (such as dimensional stability, thickness accuracy, workability, and tensile strength), economic efficiency, and the like.

As to the method for laminating an additional layer and the polishing layer or the method for laminating an additional layer and another additional layer, for example, a sheet such as a PET sheet coated with an adhesive on one or both sides thereof can be used as an additional layer, and the additional layer can be adhered via the adhesive to the polishing layer or another additional layer. A sheet such as a PET sheet not coated with adhesive is prepared as an additional layer, and separately from this, a polishing layer or another additional layer and an adhesive are prepared. Then, the additional layer can be adhered via an adhesive to the polishing layer or another additional layer.

<<Method for Manufacturing Polishing Pad of First Aspect>>

A method for manufacturing a polishing pad of the first aspect of the present invention is a method for manufacturing a polishing pad including the steps of: preparing a polishing layer and a light-transmitting member having a water contact angle of 80 degrees or less on at least one surface thereof; providing a through hole in the polishing layer; and arranging the light-transmitting member so that the light-transmitting member can be seen in the through hole (arranged so that the one surface of the light-transmitting member faces the polishing surface).

Each step is explained.

<1. Step of Preparing a Polishing Layer and a Light-Transmitting Member Having a Water Contact Angle of 80 Degrees or Less on at Least One Surface Thereof>

The present step prepares a polishing layer and a light-transmitting member having a water contact angle of 80 degrees or less on at least one surface thereof.

As the polishing layer and the light-transmitting member, those described above can be used. As the polishing layer and the light-transmitting member, commercially available ones may be used, or manufactured ones may be used. Examples of commercial light-transmitting members include "Diafoil T910E" and "Diafoil T600E" manufactured by Mitsubishi Chemical Corporation, which are made of polyester resin, "Cosmoshine A4300", "Cosmoshine A2330", "Cosmoshine TA017", "Cosmoshine TA015", "Cosmoshine TA042", "Cosmoshine TA044", "Cosmoshine TA048", and "Softshine TA009" manufactured by Toyobo Co., Ltd., "Acryplen HBXN47" and "Acryplen HBS010" manufactured by Mitsubishi Chemical Corporation, which are made of polymethyl methacrylate resin, "Panlite Film PC-2151" manufactured by Teijin Chemicals Ltd., "Sunduren SD009" and "Sunduren SD010" manufactured by Kaneka Corporation, "C000" manufactured by Sumitomo Chemical Co., Ltd., which is made of polycarbonate resin, "Iupilon H-3000" manufactured by Teijin Chemicals Ltd., "C001" manufactured by Sumitomo Chemical Co., Ltd., which is made of acrylic resin/polycarbonate resin, "S000", "S001G", and "S014G" manufactured by Sumitomo Chemical Co., Ltd., which are made of acrylic resin, "Acryplen HBS006" manufactured by Mitsubishi Chemical Corporation, "Zeonor ZF14" and "Zeonor ZF16" manufactured by Nippon Zeon, which are made of alicyclic polyolefin resin, "Arton Film" manufactured by JSR Corporation, and the like, all of which are available as commercial products. When manufacturing the polishing layer, for example, referring to Japanese Patent No. 5421635 and Japanese Patent No. 5844189, it can be manufactured by subjecting polyurethane resin to wet film-forming and laminating it to a flexible sheet made of PET resin.

The method for manufacturing a polishing pad of the first aspect of the present invention may further include a step of subjecting at least one surface (preferably only the surface on the polishing surface side) of the light-transmitting member to hydrophilic treatment. This makes it possible to obtain a light-transmitting member having a water contact angle of 80 degrees or less on the surface on the polishing surface side. Methods for hydrophilic treatment include those described above.

<2. Step of Providing a Through Hole in the Polishing Layer>

The present step provides a through hole in the polishing layer. A through hole is a hole penetrating from the polishing surface of the polishing layer to the opposite surface thereof. As a method for forming through hole in the polishing layer, for example, a through hole can be provided by punching a hole in the thickness direction of the polishing layer using a circular, elliptical, polygonal, or other cutting die (preferably a circular cutting die). By using a cutting die, the equivalent circle diameter of the through hole in any cross-section of the polishing layer obtained by cutting the polishing layer of the polishing pad perpendicularly to the thickness direction can be the same as the equivalent circle diameter of the through hole in any other cross section of the polishing layer.

<3. Step of Arranging the Light-Transmitting Member so that the Light-Transmitting Member is in in the Through Hole when Viewed from the Polishing Surface Side of the Polishing Pad in a Thickness Direction of the Polishing Pad>

The present step arranges the light-transmitting member so that the light-transmitting member is in in the through hole when viewed from the polishing surface side of the polishing pad in a thickness direction of the polishing pad. At this time, the one surface of the light-transmitting member is arranged so as to face the polishing surface.

As a method for arranging the light-transmitting member so that the light-transmitting member is in in the through hole, examples thereof include (1) a method of, as shown in FIGS. 2A and 3A, arranging the light-transmitting member so that the light-transmitting member is in contact with (or adhering to) the side surface of the through hole provided in the polishing layer, (2) a method of, as shown in FIG. 4A, providing an additional layer having a through hole having a smaller equivalent circle diameter under the polishing layer, and arranging the light-transmitting member is an exposed portion resulting from the difference in size between the through hole of the polishing layer and the through hole of the additional layer, thereby arranging the light-transmitting member so that the light-transmitting member is seen in the through hole, (3) a method of, as shown in FIG. 5A, sandwiching the light-transmitting member between the polishing layer and the additional layer to expose a portion of the light-transmitting member in the through hole, and (4) a method of, as shown in FIG. 6A, providing identical-shape through holes in both the polishing layer and the additional layer provided thereunder, and arranging the light-transmitting member in contact with (or adhering to) the side surface of one or both of the through holes. Among these, (1), (2), or (4) is preferred, (1) or (2) is more preferred, and (2) is even more preferred.

The method for manufacturing a polishing pad of the first aspect of the present invention may have a step of preparing a layer other than the polishing layer, or may have a step of laminating a layer (additional layer) other than the polishing layer on the polishing layer. The additional layer has a through hole that is the same as or different from the through hole of the polishing layer. The through hole in the additional layer may be provided before the additional layer is laminated on the polishing layer, or may be provided after the additional layer is laminated on the polishing layer. The additional layer and through hole include ones same as those described above.

In addition, the method for manufacturing a polishing pad of the first aspect of the present invention may include a step of providing the additional layer with a second through hole having a smaller equivalent circle diameter than the through hole (first through hole) provided in the polishing layer.

When using the polishing pad of the first aspect of the present invention, the polishing pad is attached to the polishing platen of the polishing machine so that the polishing surface of the polishing layer faces the object to be polished. Then, while supplying the slurry, the polishing platen is rotated to polish the process surface of the object to be polished.

Examples of the object to be polished processed by the polishing pad of the first aspect of the present invention include bare silicon and semiconductor devices. Among them, the polishing pad of the first aspect of the present invention is preferable because it is suitable for polishing semiconductor devices, particularly for final polishing.

As the slurry, any slurry containing water (aqueous slurry) can be used without particular limitation. Examples thereof include colloidal silica slurry and cerium oxide slurry.

The polishing pad of the first aspect of the present invention can be used to, for example, irradiate the wafer with a light beam through the light-transmitting member in the through hole and over the polishing pad during the CMP polishing process, and monitor the interference signals generated by its reflection, thereby making it possible to polish the object to be polished and simultaneously optically detect the surface characteristics of the object to be polished such as a semiconductor wafer and the time when planarity is reached.

<<Method for Manufacturing Polishing Pad of Second Aspect>>

A method for manufacturing a polishing pad of the second aspect of the present invention is a method for manufacturing a polishing pad including the steps of: preparing a light-transmitting member having at least one surface coated with a hydrophilic resin and a polishing layer; providing a through hole in the polishing layer; and arranging the light-transmitting member so that the light-transmitting member is in the through hole when viewed from the polishing surface side of the polishing pad in a thickness direction of the polishing pad (arranged so that the coating surface of the light-transmitting member faces the polishing surface).

Each step is explained.

<1. Step of Preparing a Light-Transmitting Member Having at Least One Surface Coated with a Hydrophilic Resin and a Polishing Layer>

The present step prepares a light-transmitting member having at least one surface coated with a hydrophilic resin and a polishing layer.

As the polishing layer, the light-transmitting member, and the hydrophilic resin, those described above can be used. As the polishing layer and the light-transmitting member, commercially available ones may be used, or manufactured ones may be used. Examples of commercial light-transmitting members include "Diafoil T910E" and "Diafoil T600E" manufactured by Mitsubishi Chemical Corporation, which are made of polyester resin, "Cosmoshine A4300", "Cosmoshine A2330", "Cosmoshine TA017", "Cosmoshine TA015", "Cosmoshine TA042", "Cosmoshine TA044", "Cosmoshine TA048", and "Softshine TA009" manufactured by Toyobo Co., Ltd., "Acryplen HBXN47" and "Acryplen HBS010" manufactured by Mitsubishi Chemical Corporation, which are made of polymethyl methacrylate resin, "Panlite Film PC-2151" manufactured by Teijin Chemicals Ltd., "Sunduren SD009" and "Sunduren SD010" manufactured by Kaneka Corporation, "C000" manufactured by Sumitomo Chemical Co., Ltd., which is made of polycarbonate resin, "Iupilon H-3000" manufactured by Teijin Chemicals Ltd., "C001" manufactured by Sumitomo Chemical Co., Ltd., which is made of acrylic resin/polycarbonate resin, "S000", "S001 G", and "S014G" manufactured by Sumitomo Chemical Co., Ltd., which are made of acrylic resin, "Acryplen HBS006" manufactured by Mitsubishi Chemical Corporation, "Zeonor ZF14" and "Zeonor ZF16" manufactured by Nippon Zeon, which are made of alicyclic polyolefin resin, "Arton Film" manufactured by JSR Corporation, and the like, all of which are available as commercial products. When manufacturing the polishing layer, for example, referring to Japanese Patent No. 5421635 and Japanese Patent No. 5844189, it can be manufactured by subjecting polyurethane resin to wet film-forming and laminating it to a flexible sheet made of PET resin.

The method for manufacturing a polishing pad of the second aspect of the present invention may further include a step of coating at least one surface (preferably only the surface on the polishing surface side) of the light-transmitting member with a hydrophilic resin.

The method for coating at least one surface of the light-transmitting member with a hydrophilic resin is not particularly limited, and the surface of the light-transmitting member can be coated with the resin using, for example, a polymerization reaction or a photocuring reaction.

When a photocuring reaction is used, a hydrophilic resin is mixed with a photocuring resin and a photopolymerization initiator, applied to the surface of the light-transmitting member, and cured by irradiation with ultraviolet rays or the like. Examples of the photocurable resin and the photopolymerization initiator include those described above.

<2. Step of Providing a Through Hole in the Polishing Layer>

The present step provides a through hole in the polishing layer. A through hole is a hole penetrating from the polishing surface of the polishing layer to the opposite surface thereof. As a method for forming through hole in the polishing layer, for example, a through hole can be provided by punching a hole in the thickness direction of the polishing layer using a circular, elliptical, polygonal, or other cutting die (preferably a circular cutting die). By using a cutting die, the equivalent circle diameter of the through hole in any cross-section of the polishing layer obtained by cutting the polishing layer of the polishing pad perpendicularly to the thickness direction can be the same as the equivalent circle diameter of the through hole in any other cross section of the polishing layer.

<3. Step of Arranging the Light-Transmitting Member so that the Light-Transmitting Member is in in the Through Hole when Viewed from the Polishing Surface Side of the Polishing Pad in a Thickness Direction of the Polishing Pad>

The present step arranges the light-transmitting member so that the light-transmitting member is in in the through hole when viewed from the polishing surface side of the polishing pad in a thickness direction of the polishing pad. At this time, the coating surface of the light-transmitting member is arranged so as to face the polishing surface.

As a method for arranging the light-transmitting member so that the light-transmitting member is in in the through hole, examples thereof include (1) a method of, as shown in FIGS. 2B and 3B, arranging the light-transmitting member so that the light-transmitting member is in contact with (or adhering to) the side surface of the through hole provided in the polishing layer, (2) a method of, as shown in FIG. 4B or 4C, providing an additional layer having a through hole having a smaller equivalent circle diameter under the polishing layer, and arranging the light-transmitting member is an exposed portion resulting from the difference in size between the through hole of the polishing layer and the through hole of the additional layer, thereby arranging the light-transmitting member so that the light-transmitting member is seen in the through hole, (3) a method of, as shown in FIG. 5B, sandwiching the light-transmitting member between the polishing layer and the additional layer to expose a portion of the light-transmitting member in the through hole, and (4) a method of, as shown in FIG. 6B, providing identical-shape through holes in both the polishing layer and the additional layer provided thereunder, and arranging the light-transmitting member in contact with (or adhering to) the side surface of one or both of the through holes. Among these, (1), (2), or (4) is preferred, (1) or (2) is more preferred, and (2) is even more preferred.

The method for manufacturing a polishing pad of the second aspect of the present invention may have a step of preparing a layer other than the polishing layer, or may have a step of laminating a layer (additional layer) other than the polishing layer on the polishing layer. The additional layer has a through hole that is the same as or different from the through hole of the polishing layer. The through hole in the additional layer may be provided before the additional layer is laminated on the polishing layer, or may be provided after the additional layer is laminated on the polishing layer. The additional layer and through hole include ones same as those described above.

In addition, the method for manufacturing a polishing pad of the second aspect of the present invention may include a step of providing the additional layer with a second through hole having a smaller equivalent circle diameter than the through hole (first through hole) provided in the polishing layer.

When using the polishing pad of the second aspect of the present invention, the polishing pad is attached to the polishing platen of the polishing machine so that the polishing surface of the polishing layer faces the object to be polished. Then, while supplying the slurry, the polishing platen is rotated to polish the process surface of the object to be polished.

Examples of the object to be polished by the polishing pad of the second aspect of the present invention include bare silicon and semiconductor devices. Among them, the polishing pad of the second aspect of the present invention is preferable because it is suitable for polishing semiconductor devices, particularly for final polishing. As the slurry, any slurry containing water (aqueous slurry) can be used without particular limitation. Examples thereof include colloidal silica slurry and cerium oxide slurry.

The polishing pad of the second aspect of the present invention can be used to, for example, irradiate the wafer with a light beam through the light-transmitting member in the through hole and over the polishing pad during the CMP polishing process, and monitor the interference signals generated by its reflection, thereby making it possible to polish the object to be polished and simultaneously optically detect the surface characteristics of the object to be polished such as a semiconductor wafer and the time when planarity is reached.

<<Method for Manufacturing Polishing Pad of Third Aspect>>

A method for manufacturing a polishing pad of the third aspect of the present invention is a method for manufacturing a polishing pad according to any one of claims 1 to 10 including the steps of: preparing a polishing layer and a light-transmitting resin member having at least one surface graft-polymerized with a hydrophilic monomer; providing a through hole in the polishing layer; and arranging the light-transmitting resin member so that the light-transmitting resin member is in the through hole when viewed from the polishing surface side of the polishing pad in a thickness direction of the polishing pad (arranged so that the grafted surface of the light-transmitting resin member faces the polishing surface).

Each step is explained.

<1. Step of Preparing a Polishing Layer and a Light-Transmitting Resin Member Having at Least One Surface Graft-Polymerized with a Hydrophilic Monomer>

The present step prepares a polishing layer and a light-transmitting resin member having at least one surface graft-polymerized with a hydrophilic monomer.

In the present specification and the claims, the phrase "having at least one surface graft-polymerized with a hydrophilic monomer" means that a hydrophilic monomer is bonded by graft polymerization to at least one surface of the light-transmitting resin.

It is preferable that only one surface of the light-transmitting resin member is graft-polymerized with a hydrophilic monomer.

As the polishing layer and the light-transmitting resin member, those described above can be used. As the polishing layer and the light-transmitting resin member, commercially available ones may be used, or manufactured ones may be used. Examples of commercial light-transmitting resin members include "Diafoil T910E" and "Diafoil T600E" manufactured by Mitsubishi Chemical Corporation, which are made of polyester resin, "Cosmoshine A4300", "Cosmoshine A2330", "Cosmoshine TA017", "Cosmoshine TA015", "Cosmoshine TA042", "Cosmoshine TA044", "Cosmoshine TA048", and "Softshine TA009" manufactured by Toyobo Co., Ltd., "Acryplen HBXN47" and "Acryplen HBS010" manufactured by Mitsubishi Chemical Corporation, which are made of polymethyl methacrylate resin, "Panlite Film PC-2151" manufactured by Teijin Chemicals Ltd., "Sunduren SD009" and "Sunduren SD010" manufactured by Kaneka Corporation, "C000" manufactured by Sumitomo Chemical Co., Ltd., which is made of polycarbonate resin, "Iupilon H-3000" manufactured by Teijin Chemicals Ltd., "C001" manufactured by Sumitomo Chemical Co., Ltd., which is made of acrylic resin/polycarbonate resin, "S000", "S001G", and "S014G" manufactured by Sumitomo Chemical Co., Ltd., which are made of acrylic resin, "Acryplen HBS006" manufactured by Mitsubishi Chemical Corporation, "Zeonor ZF14" and "Zeonor ZF16" manufactured by Nippon Zeon, which are made of alicyclic polyolefin resin, "Arton Film" manufactured by JSR Corporation, and the like, all of which are available as commercial products. When manufacturing the polishing layer, for example, referring to Japanese Patent No. 5421635 and Japanese Patent No. 5844189, it can be manufactured by subjecting polyurethane resin to wet film-forming and laminating it to a flexible sheet made of PET resin.

The method for manufacturing a polishing pad of the third aspect of the present invention may further include a step of plasma-grafting the at least one surface of the light-transmitting resin member. Examples of the method for plasma graft treatment include those described above. By subjecting the at least one surface of the light-transmitting resin member to the plasma graft treatment, it is possible to obtain a light-transmitting resin member having at least one surface graft-polymerized with a hydrophilic monomer.

<2. Step of Providing a Through Hole in the Polishing Layer>

The present step provides a through hole in the polishing layer. A through hole is a hole penetrating from the polishing surface of the polishing layer to the opposite surface thereof. As a method for forming through hole in the polishing layer, for example, a through hole can be provided by punching a hole in the thickness direction of the polishing layer using a circular, elliptical, polygonal, or other cutting die (preferably a circular cutting die). By using a cutting die, the equivalent circle diameter of the through hole in any cross-section of the polishing layer obtained by cutting the polishing layer of the polishing pad perpendicularly to the thickness direction can be the same as the equivalent circle diameter of the through hole in any other cross section of the polishing layer.

<3. Step of Arranging the Light-Transmitting Resin Member so that the Light-Transmitting Resin Member is in in the Through Hole when Viewed from the Polishing Surface Side of the Polishing Pad in a Thickness Direction of the Polishing Pad>

The present step arranges the light-transmitting resin member so that the light-transmitting resin member is in in the through hole when viewed from the polishing surface side of the polishing pad in a thickness direction of the polishing pad. At this time, the grafted surface of the light-transmitting resin member is arranged so as to face the polishing surface.

As a method for arranging the light-transmitting resin member so that the light-transmitting resin member is in in the through hole, examples thereof include (1) a method of, as shown in FIGS. 2B and 3B, arranging the light-transmitting resin member so that the light-transmitting resin member is in contact with (or adhering to) the side surface of the through hole provided in the polishing layer, (2) a method of, as shown in FIG. 4B or 4C, providing an additional layer having a through hole having a smaller equivalent circle diameter under the polishing layer, and arranging the light-transmitting resin member is an exposed portion resulting from the difference in size between the through hole of the polishing layer and the through hole of the additional layer, thereby arranging the light-transmitting resin member so that the light-transmitting resin member is seen in the through hole, (3) a method of, as shown in FIG. 5B, sandwiching the light-transmitting resin member between the polishing layer and the additional layer to expose a portion of the light-transmitting resin member in the through hole, and (4) a method of, as shown in FIG. 6B, providing identical-shape through holes in both the polishing layer and the additional layer provided thereunder, and arranging the light-transmitting resin member in contact with (or adhering to) the side surface of one or both of the through holes. Among these, (1), (2), or (4) is preferred, (1) or (2) is more preferred, and (2) is even more preferred.

The method for manufacturing a polishing pad of the third aspect of the present invention may have a step of preparing a layer other than the polishing layer, or may have a step of laminating a layer (additional layer) other than the polishing layer on the polishing layer. The additional layer has a through hole that is the same as or different from the through hole of the polishing layer. The through hole in the additional layer may be provided before the additional layer is laminated on the polishing layer, or may be provided after the additional layer is laminated on the polishing layer. The additional layer and through hole include ones same as those described above.

In addition, the method for manufacturing a polishing pad of the third aspect of the present invention may include a step of providing the additional layer with a second through hole having a smaller equivalent circle diameter than the through hole (first through hole) provided in the polishing layer.

When using the polishing pad of the third aspect of the present invention, the polishing pad is attached to the polishing platen of the polishing machine so that the polishing surface of the polishing layer faces the object to be polished. Then, while supplying the slurry, the polishing platen is rotated to polish the process surface of the object to be polished.

Examples of the object to be polished processed by the polishing pad of the third aspect of the present invention include bare silicon and semiconductor devices. Among them, the polishing pad of the third aspect of the present invention is preferable because it is suitable for polishing semiconductor devices, particularly for final polishing.

As the slurry, any slurry containing water (aqueous slurry) can be used without particular limitation. Examples thereof include colloidal silica slurry and cerium oxide slurry.

The polishing pad of the third aspect of the present invention can be used to, for example, irradiate the wafer with a light beam through the light-transmitting resin member in the through hole and over the polishing pad during the CMP polishing process, and monitor the interference signals generated by its reflection, thereby making it possible to polish the object to be polished and simultaneously optically detect the surface characteristics of the object to be polished such as a semiconductor wafer and the time when planarity is reached.

<<Method for Manufacturing Polishing Pad of Fourth Aspect>>

A method for manufacturing a polishing pad of the fourth aspect of the present invention is a method for manufacturing a polishing pad including the steps of: preparing a polishing layer and a light-transmitting resin member including, on at least one surface, a resin containing a structural unit derived from a polyfunctional (meth)acrylate monomer having two or more polymerizable functional groups and having a —$C_{2-4}$ alkylene-O— unit; providing a through hole in the polishing layer; and arranging the light-transmitting resin member so that the light-transmitting resin member is in the through hole when viewed from the polishing surface side of the polishing pad in a thickness direction of the polishing pad (arranged so that the surface of the light-transmitting resin member having the resin containing a structural unit derived from a polyfunctional (meth)acrylate monomer faces the polishing surface).

Each step is explained.

<1. Step of Preparing a Polishing Layer and a Light-Transmitting Resin Member Including, on at Least One Surface, a Resin Containing a Structural Unit Derived from a Polyfunctional (Meth)Acrylate Monomer Having Two or More Polymerizable Functional Groups and Having a —$C_{2-4}$ Alkylene-O— Unit>

The present step prepares a light-transmitting resin member including, on at least one surface, a resin containing a structural unit derived from a polyfunctional (meth)acrylate monomer having two or more polymerizable functional groups and having a —$C_{2-4}$ alkylene-O— unit, and a polishing layer.

As the polishing layer, the light-transmitting resin member, and the resin containing a structural unit derived from a polyfunctional (meth)acrylate monomer, those described above can be used. As the polishing layer and the light-transmitting resin member, commercially available ones may be used, or manufactured ones may be used. Examples of commercial light-transmitting resin members include "Diafoil T910E" and "Diafoil T600E" manufactured by Mitsubishi Chemical Corporation, which are made of polyester resin, "Cosmoshine A4300", "Cosmoshine A2330", "Cosmoshine TA017", "Cosmoshine TA015", "Cosmoshine TA042", "Cosmoshine TA044", "Cosmoshine TA048", and "Softshine TA009" manufactured by Toyobo Co., Ltd., "Acryplen HBXN47" and "Acryplen HBS010" manufactured by Mitsubishi Chemical Corporation, which are made of polymethyl methacrylate resin, "Panlite Film PC-2151" manufactured by Teijin Chemicals Ltd., "Sunduren SD009" and "Sunduren SD010" manufactured by Kaneka Corporation, "C000" manufactured by Sumitomo Chemical Co., Ltd., which is made of polycarbonate resin, "Iupilon H-3000" manufactured by Teijin Chemicals Ltd., "C001" manufactured by Sumitomo Chemical Co., Ltd., which is made of acrylic resin/poly carbonate resin, "S000", "S001G", and "S014G" manufactured by Sumitomo Chemical Co., Ltd., which are made of acrylic resin, "Acryplen HBS006" manufactured by Mitsubishi Chemical Corporation, "Zeonor ZF14" and "Zeonor ZF16" manufactured by Nippon Zeon, which are made of alicyclic polyolefin resin, "Arton Film" manufactured by JSR Corporation, and the like, all of which are available as commercial products. When manufacturing the polishing layer, for example, referring to Japanese Patent No. 5421635 and Japanese Patent No. 5844189, it can be manufactured by subjecting polyurethane resin to wet film-forming and laminating it to a flexible sheet made of PET resin.

The method for manufacturing a polishing pad of the fourth aspect of the present invention may further include a step of coating at least one surface of the light-transmitting resin member with a resin containing a structural unit derived from a polyfunctional (meth)acrylate monomer.

The method for coating at least one surface of the light-transmitting resin member with the resin is not particularly limited, and the surface of the light-transmitting resin member can be coated with the resin using, for example, a polymerization reaction or a photocuring reaction.

When a photocuring reaction is used, the resin is mixed with a photocuring resin and a photopolymerization initiator, applied to the surface of the light-transmitting resin member, and cured by irradiation with ultraviolet rays or the like. Examples of the photocurable resin and the photopolymerization initiator include those described above.

Therefore, the method for manufacturing a polishing pad of the fourth aspect of the present invention may include the steps of applying a mixture containing a monomer component including a polyfunctional (meth)acrylate monomer and a photopolymerization initiator onto the light-transmitting resin member, and photopolymerizing the mixture.

<2. Step of Providing a Through Hole in the Polishing Layer>

The present step provides a through hole in the polishing layer. A through hole is a hole penetrating from the polishing surface of the polishing layer to the opposite surface thereof. As a method for forming through hole in the polishing layer, for example, a through hole can be provided by punching a hole in the thickness direction of the polishing layer using a circular, elliptical, polygonal, or other cutting die (preferably a circular cutting die). By using a cutting die, the equivalent circle diameter of the through hole in any cross-section of the polishing layer obtained by cutting the polishing layer of the polishing pad perpendicularly to the thickness direction can be the same as the equivalent circle diameter of the through hole in any other cross section of the polishing layer.

<3. Step of Arranging the Light-Transmitting Resin Member so that the Light-Transmitting Resin Member is in in the Through Hole when Viewed from the Polishing Surface Side of the Polishing Pad in a Thickness Direction of the Polishing Pad>

The present step arranges the light-transmitting resin member so that the light-transmitting resin member is in in the through hole when viewed from the polishing surface side of the polishing pad in a thickness direction of the polishing pad. At this time, it is arranged so that the surface of the light-transmitting resin member having the resin containing a structural unit derived from a polyfunctional (meth)acrylate monomer faces the polishing surface.

As a method for arranging the light-transmitting resin member so that the light-transmitting resin member is in in the through hole, examples thereof include (1) a method of, as shown in FIGS. 2B and 3B, arranging the light-transmitting resin member so that the light-transmitting resin member is in contact with (or adhering to) the side surface of the through hole provided in the polishing layer, (2) a method of, as shown in FIG. 4B or 4C, providing an additional layer having a through hole having a smaller equivalent circle diameter under the polishing layer, and arranging the light-transmitting resin member is an exposed portion resulting from the difference in size between the through hole of the polishing layer and the through hole of the additional layer, thereby arranging the light-transmitting resin member so that the light-transmitting resin member is seen in the through hole, and (3) a method of, as shown in FIG. 5B, sandwiching the light-transmitting resin member between the polishing layer and the additional layer to expose a portion of the light-transmitting resin member in the through hole. Among these, (1) or (2) is preferred, and (2) is more preferred.

In addition, the method for manufacturing a polishing pad of the fourth aspect of the present invention may have a step of preparing a layer other than the polishing layer, or may have a step of laminating a layer (additional layer) other than the polishing layer on the polishing layer. The additional layer has a through hole that is the same as or different from the through hole of the polishing layer. The through hole in the additional layer may be provided before the additional layer is laminated on the polishing layer, or may be provided after the additional layer is laminated on the polishing layer. The additional layer and through hole include ones same as those described above.

In addition, the method for manufacturing a polishing pad of the fourth aspect of the present invention may include a step of providing the additional layer with a second through hole having a smaller equivalent circle diameter than the through hole (first through hole) provided in the polishing layer.

When using the polishing pad of the fourth aspect of the present invention, the polishing pad is attached to the polishing platen of the polishing machine so that the polishing surface of the polishing layer faces the object to be polished. Then, while supplying the slurry, the polishing platen is rotated to polish the process surface of the object to be polished.

Examples of the object to be polished by the polishing pad of the fourth aspect of the present invention include bare silicon and semiconductor devices. Among them, the polishing pad of the fourth aspect of the present invention is preferable because it is suitable for polishing semiconductor devices, particularly for final polishing.

As the slurry, any slurry containing water (aqueous slurry) can be used without particular limitation. Examples thereof include colloidal silica slurry and cerium oxide slurry.

The polishing pad of the fourth aspect of the present invention can be used to, for example, irradiate the wafer with a light beam through the light-transmitting resin member in the through hole and over the polishing pad during the CMP polishing process, and monitor the interference signals generated by its reflection, thereby making it possible to polish the object to be polished and simultaneously optically detect the surface characteristics of the object to be polished such as a semiconductor wafer and the time when planarity is reached.

EXAMPLES

The present invention is described in more detail below with reference to Examples, but the present invention is not limited to these Examples.

<<Polishing Pad of First Aspect>>

Example 1-1

A 20 cm×20 cm transparent acrylic resin film (manufactured by Mitsubishi Chemical Corporation, Acryplen HBS006, thickness 150 μm) was prepared, and one surface thereof was subjected to hydrophilic treatment by plasma processing. Thus, a light-transmitting member of Example 1-1 was obtained.

Example 1-2

A 20 cm×20 cm transparent acrylic resin film (manufactured by Mitsubishi Chemical Corporation, Acryplen HBS006, thickness 150 μm) was prepared, and one surface thereof was subjected to hydrophilic treatment by roll blasting processing. Thus, a light-transmitting member of Example 1-2 was obtained.

Comparative Example 1-1

A 20 cm×20 cm transparent acrylic resin film (manufactured by Mitsubishi Chemical Corporation, Acryplen HBS006, thickness 150 μm) was prepared, and this was used as a light-transmitting member of Comparative Example 1-1.

<Water Contact Angle Measurement>

The water contact angles of the light-transmitting members of Examples 1-1 and 1-2 and Comparative Example 1-1 were measured by the following method using an automatic contact angle meter DropMaster DM500 (manufactured by Kyowa Interface Science Co., Ltd.).

(1) Put distilled water in the syringe, attach the dispenser, and set it in DM500.
(2) Cut the measurement sample into a size of 5 mm×50 mm and attach it to the stage.
(3) Launch the analysis software, select contact angle measurement [droplet method], and set each parameter.

Waiting time until measurement: 1000 ms
Measurement time interval: 1000 ms
Number of continuous measurements: 180 times (4) Set the droplet volume to be measured and the injection needle position on the image monitor to optimize the focus value of the image monitor.
(5) Drop a droplet onto the sample to start measurement, and read the water contact angle seconds after the start of measurement.

Table 1 shows the results of the water contact angle measurement test.

<Transmittance Measurement>

The visible light transmittance of the light-transmitting members of Examples 1-1 and 1-2 and Comparative Example 1-1 was measured by the following method using an ultraviolet-visible-near infrared spectrophotometer V-770 (manufactured by JASCO Corporation). Note that the visible light transmittance was measured under two conditions, one in which water adhered to the surface of the light-transmitting member (processed surface for Examples 1-1 and 1-2) and the other in which water did not adhere. 1. Measurement in the case where water is adhered (1) Insert a quartz glass cell and measure a blank.
(2) Cut the light-transmitting members of Examples 1-1 and 1-2 and Comparative Example 1-1 into a size of 9 mm×50 mm.
(3) Place the light-transmitting member on a Kimwipe, and spray purified water three times on the surface of the light-transmitting member (only the processed surface for Examples 1-1 and 1-2, and only one surface for Comparative Example 1-1) from a position 20 cm away using a sprayer (capacity: 50 ml, PP bottle) (amount sprayed per spray: about 0.160 to 0.165 ml, amount applied to the surface of the light-transmitting member after spraying three times: about 0.01 to 0.03 ml). After the spraying, the light-transmitting member was placed in a vertical position and allowed to stand still for 60 seconds. The light-transmitting member is placed in the quartz glass cell so that the surface no sprayed with water is in contact with the inner surface of the quartz glass cell.
(3) Arrange the light-transmitting member on the inner wall of the quartz glass cell so as to come into contact with the entire light source side of the quartz cell, with the surface-treated surface facing away from the light source.
(4) Use an ultraviolet-visible-near infrared spectrophotometer V-770 (manufactured by JASCO Corporation) to measure straight transmittance for light of 250 nm to 1000 nm.
(5) Calculate the visible light transmittance for wavelengths of 380 to 780 nm based on JIS A5759: 2008.

1. Measurement in the case where water is not adhered (1) Insert a quartz glass cell and measure a blank.
(2) Cut the light-transmitting members of Examples 1-1 and 1-2 and Comparative Example 1-1 into a size of 9 mm×50 mm.
(3) Arrange the light-transmitting member on the inner wall of the quartz glass cell so as to come into contact with the entire light source side of the quartz cell, with the surface-treated surface facing away from the light source.
(4) Use an ultraviolet-visible-near infrared spectrophotometer V-770 (manufactured by JASCO Corporation) to measure straight transmittance for light of 250 nm to 1000 nm.
(5) Calculate the visible light transmittance for wavelengths of 380 to 780 nm based on JIS A5759: 2008.

By the above method, for the light-transmitting members of Examples 1-1 and 1-2 and Comparative Example 1-1, the visible light transmittance with and without water adhering to the surface was determined. Table 1 shows the results.

TABLE 1

| | Example 1-1 Plasma Processed Product | Example 1-2 Blast Processed Product | Comparative Example 1-1 Unprocessed Product |
|---|---|---|---|
| Water Contact Angle | 11.4 Degrees | 78.3 Degrees | 87.4 Degrees |
| Visible Light Transmittance without Water (%) | 88.50 | 73.55 | 92.64 |
| Visible Light Transmittance with Water (%) | 83.96 | 66.21 | 54.15 |
| Difference in Visible Light Transmittance(%) | 4.55 | 7.34 | 38.49 |

For the light-transmitting member of Comparative Example 1-1, the surface had a water contact angle greater than 80 degrees, so that there was a large difference in visible light transmittance between the surface with water and the surface without water. Meanwhile, for the light-transmitting members of Examples 1-1 and 1-2, the surface had a water contact angle of 80 degrees or less, so that there was almost no difference in visible light transmittance between the surface with water and the surface without water. Therefore, in polishing pads containing the light-transmitting member of Examples 1-1 and 1-2, visible light transmittance does not vary between the presence and absence of slurry on the surface, making it possible to determine the polishing endpoint with higher accuracy.

Production Example 1-1

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution.

The resulting resin-containing solution was filtered to remove insoluble components. The solution was cast on a polyester film using a knife coater so that the coating thickness was 0.8 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 μm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of 0.45 mm. On a concentric circle at a position ½ the radius of the polishing pad from the center of the polishing pad on the grooved surface side, a circular cutting die with a diameter of 18 mm was used to punch three holes at regular intervals to form first through holes. A double-sided tape having a release paper on one side thereof was adhered to the side of the resin base material without polyurethane resin film attached, and a circular cutting die with a diameter of 9 mm was fitted into the first through hole with a diameter of 18 mm, and a second through hole was opened so that the double-sided tape and the release paper could pass through. At this time, the holes were drilled so that the center of the first through hole and the center of the second through hole were substantially the same. As a light-transmitting member, an acrylic resin film (manufactured by Mitsubishi Chemical Corporation, Acryplen HBS006, thickness 150 μm) having one surface treated with plasma was prepared and cut into 3 pieces with a diameter of 17 mm, and the ring-shaped double-sided tape exposed in the first through hole and the light-transmitting member were bonded together so that the surface-treated surface of the light-transmitting member faced the polishing surface, thereby manufacturing a polishing pad.

Production Example 1-2

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution.

The resulting resin-containing solution was filtered to remove insoluble components. The solution was cast on a polyester film using a knife coater so that the coating thickness was 0.8 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 μm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of mm. To the side where the polyurethane resin film of the resin base material was not attached, a double-sided tape having a thickness of about 0.1 mm and having a release paper on one side (the thickness of the PET base material was 0.023 mm and the thickness of the adhesive component on both the front and back surfaces of the PET base material was 0.04 mm) was adhered. On a concentric circle at a position ½ the radius of the polishing pad from the center of the polishing pad on the grooved surface side, a circular cutting die with a diameter of 20 mm was used to punch three holes at regular intervals to form first through holes so as to penetrate to the release paper of the double-sided tape. The release paper of the double-sided tape was removed, and as a light-transmitting member, an acrylic resin film (manufactured by Mitsubishi Chemical Corporation, Acryplen HBS006, thickness 150 μm) having the same diameter as that of the polishing layer with plasma treatment on one side was prepared, and the adhesive portion of the double-sided tape and the surface-treated surface of the light-transmitting member were adhered together. As an additional layer, a double-sided tape having a thickness of about mm and having a release paper on one side (the thickness of the PET base material was 0.023 mm and the thickness of the adhesive component on both the front and back surfaces of the PET base material was 0.04 mm) was prepared, and three holes were drilled at positions overlapping the first through holes when viewed in the thickness direction to provide second through holes, and a polishing pad was manufactured by adhering to the non-surface-treated side of the light-transmitting member.

Production Example 1-3

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution.

The resulting resin-containing solution was filtered to remove insoluble components. The solution was cast on a polyester film using a knife coater so that the coating thickness was 0.8 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 μm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of mm. To the side where the polyurethane resin film of the resin base material was not attached, an additional layer was bonded via a hot-melt adhesive. The additional layer used was a non-woven fabric manufactured by needle punching from polyester fibers having a fineness of 2 dtex and a fiber length of 51 mm, with a thickness of 0.50 mm and a density of 0.35 g/cm$^3$. A double-sided tape having a release paper on one side was adhered to the side of the non-woven fabric without polyurethane resin film attached. On a concentric circle at a position ½ the radius of the polishing pad from the center of the polishing pad on the grooved surface side, a circular cutting die with a diameter of 20 mm was used to punch three holes at regular intervals to form first through holes and second through holes so as to penetrate from the polishing surface to the double-sided tape. As a light-transmitting member, an acrylic resin/polycarbonate resin sheet (manufactured by Sumitomo Chemical Co., Ltd., Technolloy C001, thickness 500 μm) having one surface treated with plasma was cut into 3 pieces with a diameter of 20 mm, and a hot-melt adhesive was applied to the side surface of each circular light-transmitting member, which was adhered to the side surface of the second through hole so that the surface-treated surface of the light-transmitting member faced the polishing surface, thereby manufacturing a polishing pad.

With the polishing pads of Production Examples 1-1 to 1-3, the light transmittance does not fluctuate greatly depending on the presence or absence of aqueous slurry, so that the polishing endpoint can be detected with high accuracy.

<<Polishing Pad of Second Aspect>>

Example 2-1

Dipentaerythritol hexaacrylate (DPHA) (manufactured by Shin-Nakamura Chemical Co., Ltd., NK Ester A-DPH) in an amount of 90 parts by weight, 25 parts by weight of an acrylate polymer having an ion-bonding hydrophilic group (a group containing ammonium cations) (Acryt 8WX-030 (40% solution) manufactured by Taisei Fine Chemical Co., Ltd.) (that is, 10% by mass of 8WX-030 based on the total solids of DPHA and 8WX-030), and 3 parts by weight of 1-hydroxycyclohexyl phenyl ketone (Irgacure 184 manufactured by IGM Resin B.V.) were blended, and diluted with propylene glycol monomethyl ether so that the non-volatile content was 30% to prepare a coating liquid (*8 WX was added at 10%). The resulting coating liquid was applied to an acrylic resin sheet (Acryplen HBS006, manufactured by Mitsubishi Chemical Corporation, thickness 150 μm) with a bar coater and pre-dried at 80° C. for 1 minute. Next, ultraviolet irradiation was performed using a high-pressure mercury lamp in air to form a coating film having a thickness of 5 μm on the acrylic resin sheet. The resulting acrylic resin sheet with a coating film was used as an endpoint detection window.

Comparative Example 2-1

A commercially available acrylic resin sheet (Acryplen HBS006, thickness 150 μm, manufactured by Mitsubishi Chemical Corporation) was used as an endpoint detection window.

Example 2-2

An acrylic resin sheet with a coating film was prepared in the same manner as in Example 2-1 and used as an endpoint detection window, except that it was changed to 50 parts by mass of DPHA and 125 parts by mass of 8WX-030 (that is, 50% by mass of 8WX-030 based on the total solids content of DPHA and 8WX-030).

Example 2-3

An acrylic resin sheet with a coating film was prepared in the same manner as in Example 2-1 and used as an endpoint detection window, except that it was changed to 30 parts by mass of DPHA and 175 parts by mass of 8WX-030 (that is, 70% by mass of 8WX-030 based on the total solids content of DPHA and 8WX-030).

Example 2-4

An acrylic resin sheet with a coating film was prepared in the same manner as in Example 2-1 and used as an endpoint detection window, except that it was changed to 100 parts by mass of DPHA and 0 parts by mass of 8WX-030 (that is, 0% by mass of 8WX-030 based on the total solids content of DPHA and 8WX-030).

<Water Contact Angle Measurement>

A contact angle meter (DropMaster 500, manufactured by Kyowa Interface Science Co., Ltd.) was used to drop one drop of water (2 pt) from the injection needle, and the contact angle was measured after 3 seconds.

The surface water contact angle was measured by the method described above, and a water contact angle of 20 degrees or less was evaluated as ⊚, a water contact angle of greater than 20 degrees and 50 degrees or less was evaluated as ○, a water contact angle of greater than 50 degrees and 80 degrees or less was evaluated as Δ, and a water contact angle of greater than 80 degrees was evaluated as ×. Table 2 shows the results.

<Light Transmittance Measurement>

The visible light transmittance of the light-transmitting members of Examples 2-1 to 2-4 and Comparative Example 2-1 was measured by the following method using an ultra-violet-visible-near infrared spectrophotometer V-770 (manufactured by JASCO Corporation).

1. Measurement in the case where water is adhered (1) Insert a quartz glass cell and measure a blank.

(2) Cut the light-transmitting members of Examples 2-1 to 2-4 and Comparative Example 2-1 into a size of 9 mm×50 mm.

(3) Place the light-transmitting member on a paper towel (Kimtowel, manufactured by Nippon Paper Crecia Co., Ltd.), and spray purified water three times on the surface of the light-transmitting member (only the coated surface for Examples 2-1 to 2-4, and only one surface for Comparative Example 2-1) from a position 20 cm away using a sprayer (capacity: 50 mL, PP bottle) (amount per spray: 0.160 to 0.165 mL, amount of water adhering to the surface of the light-transmitting member: 0.01 to 0.03 mL). After the spraying, the light-transmitting member was placed in a vertical position and allowed to stand still for 60 seconds. The light-transmitting member is placed in the quartz glass cell so that the surface no sprayed with water is in contact with the inner surface of the quartz glass cell.

(3) Arrange the light-transmitting member on the inner wall of the quartz glass cell so as to come into contact with the entire light source side of the quartz cell, with the coated surface of the light-transmitting member facing away from the light source.

(4) Use an ultraviolet-visible-near infrared spectrophotometer V-770 (manufactured by JASCO Corporation) to measure straight transmittance for light of 250 to 1000 nm.

(5) Calculate the visible light transmittance for wavelengths of 380 to 780 nm based on JIS A5759: 2008.

1. Measurement in the case where water is not adhered (1) Insert a quartz glass cell and measure a blank.

(2) Cut the light-transmitting members of Examples 2-1 to 2-4 and Comparative Example 1-1 into a size of 9 mm×50 mm.

(3) Arrange the light-transmitting member on the inner wall of the quartz glass cell so as to come into contact with the entire light source side of the quartz cell, with the coated surface of the light-transmitting member facing away from the light source.

(4) Use an ultraviolet-visible-near infrared spectrophotometer V-770 (manufactured by JASCO Corporation) to measure straight transmittance for light of 250 to 1000 nm.

(5) Calculate the visible light transmittance for wavelengths of 380 to 780 nm based on JIS A5759: 2008.

By the above method, for the light-transmitting members of Examples 2-1 to 2-4 and Comparative Example 2-1, the difference between the visible light transmittance with water adhering to the surface and the visible light transmittance without water was determined (visible light transmittance without water adhesion-Visible light transmittance with water adhesion), and when the difference in light transmittance was 5% or less, it was evaluated as ◎, when it was greater than 5% and 10% or less, it was evaluated as ○, when it was greater than 10% and 15% or less, it was evaluated as Δ, and when it was greater than 15%, it was evaluated as ×. Table 2 shows the results.

TABLE 2

| | Comparative Example 2-1 | Example 2-1 | Example 2-2 | Example 2-3 | Example 2-4 |
|---|---|---|---|---|---|
| Coating Treatment | None | Yes | Yes | Yes | Yes |
| Hydrophilic Resin | None | Yes | Yes | Yes | Yes |
| Ion-Bonding Hydrophilic Group | None | Yes | Yes | Yes | None |
| DPHA: 8WX | — | 90:10 | 50:50 | 30:70 | 100:0 |
| Evaluation of Water Contact Angle | X | ◎ | ○ | ○ | Δ |
| Evaluation of Change in Light Transmittance | X | ◎ | ○ | ○ | Δ |

As a result of the tests, in Comparative Example 2-1 in which the surface on the polishing surface side was not coated, there was a large difference in visible light transmittance between the case with water on the surface and the case without water. Meanwhile, in Examples 2-1 to 2-4 in which the surface on the polishing surface side was coated with a hydrophilic resin, the difference in light transmittance between the case with water on the surface and the case without water was reduced compared to Comparative Example 2-1. Furthermore, in the light-transmitting members of Examples 2-1 to 2-3, since the surface on the polishing surface side was coated with a resin having an ion-bonding hydrophilic group, there was almost no difference in visible light transmittance between the case with water on the surface and the case without water. Therefore, in the polishing pads containing the light-transmitting members of Examples 2-1 to 2-4, particularly Examples 2-1 to 2-3, visible light transmittance does not vary between the presence and absence of slurry on the surface, making it possible to determine the polishing endpoint with higher accuracy.

<Production Example 2-1>

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution.

The resulting resin-containing solution was filtered to remove insoluble components. The solution was cast on a polyester film using a knife coater so that the coating thickness was 0.8 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 μm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of mm. On a concentric circle at a position ½ the radius of the polishing pad from the center of the polishing pad on the grooved surface side, a circular cutting die with a diameter of 18 mm was used to punch three holes at regular intervals to form first through holes. A double-sided tape having a release paper on one side thereof was adhered to the side of the resin base material without polyurethane resin film attached, and a circular cutting die with a diameter of 9 mm was fitted into the first through hole with a diameter of 18 mm, and a second through hole was opened so that the double-sided tape and the release paper could pass through. At this time, the holes were drilled so that the center of the first through hole and the center of the second through hole were substantially the same. As a light-transmitting member, the acrylic resin sheet with a coating film of Example 2-1 was prepared and cut into 3 pieces with a diameter of 17 mm, and the ring-shaped double-sided tape exposed in the first through hole and the light-transmitting member were bonded together so that the surface of the light-transmitting member with a coating film faced the polishing surface, thereby manufacturing a polishing pad.

Production Example 2-2

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution.

The resulting resin-containing solution was filtered to remove insoluble components. The solution was cast on a polyester film using a knife coater so that the coating thickness was 0.8 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 μm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of mm. To the side where the polyurethane resin film of the resin base material was not attached, a double-sided tape having a thickness of about 0.1 mm and having a release paper on one side (the thickness of the PET base material was 0.023 mm and the thickness of the adhesive component on both the front and back surfaces of the PET base material was 0.04 mm) was adhered. On a concentric circle at a position ½ the radius of the polishing pad from the center of the polishing pad on the grooved surface side, a circular cutting die with a diameter of 20 mm was used to punch three holes at regular intervals to form first through holes so as to penetrate to the release paper of the double-sided tape. The release paper of the double-sided tape was removed, and as a light-transmitting member, the acrylic resin sheet with a coating film of Example 2-1 was prepared, and the adhesive portion of the double-sided tape and the surface of the light-transmitting member with a coating film were adhered together. As an additional layer, a double-sided tape having a thickness of about 0.1 mm and having a release paper on one side (the thickness of the PET base material was 0.023 mm and the thickness of the adhesive component on both the front and back surfaces of the PET base material was 0.04 mm) was prepared, and three holes were drilled at positions overlapping the first through holes when viewed in the thickness direction to provide second through holes, and a polishing pad was manufactured by adhering to the non-coating-film side of the acrylic resin film light-transmitting member.

Production Example 2-3

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution.

The resulting resin-containing solution was filtered to remove insoluble components. The solution was cast on a polyester film using a knife coater so that the coating thickness was 0.8 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 μm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of mm. To the side where the polyurethane resin film of the resin base material was not attached, an additional layer was bonded via a hot-melt adhesive. The additional layer used was a non-woven fabric manufactured by needle punching from polyester fibers having a fineness of 2 dtex and a fiber length of 51 mm, with a thickness of 0.50 mm and a density of 0.35 g/cm$^3$. A double-sided tape having a release paper on one side was adhered to the side of the non-woven fabric without polyurethane resin film attached. On a concentric circle at a position ½ the radius of the polishing pad from the center of the polishing pad on the grooved surface side, a circular cutting die with a diameter of 20 mm was used to punch three holes at regular intervals to form first through holes and second through holes so as to penetrate from the polishing surface to the double-sided tape. As a light-transmitting member, the acrylic resin sheet with a coating film of Example 2-1 was cut into 3 pieces with a diameter of 20 mm, and a hot-melt adhesive was applied to the side surface of each circular light-transmitting member, which was adhered to the side surface of the second through hole so that the surface of the light-transmitting member with a coating film faced the polishing surface, thereby manufacturing a polishing pad.

With the polishing pads of Production Examples 2-1 to 2-3, the light transmittance does not fluctuate greatly depending on the presence or absence of aqueous slurry, so that the polishing endpoint can be detected with high accuracy.

<<Polishing Pad of Third Aspect>>

Example 3-1

Plasma treatment was performed on an acrylic resin sheet (Acryplen HBS006, manufactured by Mitsubishi Chemical Corporation) having a length of 20 mm, a width of 20 mm, and a thickness of 0.15 mm, with an argon gas flow rate of 10 sccs, a reaction time of 2 minutes, and a pressure of 50 Pa. Then, it was immersed in an aqueous solution of 40 mol % acrylic acid, and subjected to a graft polymerization reaction at 80° C. for 1 hour while bubbling nitrogen gas, and thereafter subjected to ultrasonic cleaning in distilled water for 2 hours and vacuum drying at 80° C. for 6 hours. The resulting light-transmitting resin member was used as the light-transmitting resin member of Example 3-1.

Example 3-2

Plasma polymerization was performed on an acrylic resin sheet (Acryplen HBS006, manufactured by Mitsubishi Chemical Corporation) having a length of 20 mm, a width of 20 mm, and a thickness of 0.15 mm, with an argon gas flow rate of 10 sccs, a reaction time of 2 minutes, and a pressure of 50 Pa. Then, it was immersed in an aqueous solution of 40 mol % acrylic acid, and subjected to a graft polymerization reaction at 80° C. for 1 hour while bubbling nitrogen gas, and thereafter subjected to ultrasonic cleaning in distilled water for 2 hours and vacuum drying at 80° C. for 6 hours. The graft-polymerized acrylic resin sheet was placed in 25 ml of a 5% by weight aqueous solution of polyvinyl benzyltrimethylammonium chloride (molecular weight: 43000) with stirring for 30 minutes to perform an interpolymer complex formation reaction. This film was then washed with water and dried to form a polymer composite. The resulting light-transmitting resin member was used as the light-transmitting resin member of Example 3-2.

Comparative Example 3-1

Acrylic resin sheets (Acryplen HBA001P and Acryplen HBS006, manufactured by Mitsubishi Chemical Corporation) each having a length of 20 mm, a width of 20 mm, and a thickness of 0.15 mm were used as the light-transmitting resin members of Comparative Example 3-1.

Comparative Example 3-2

Acrylic resin sheets (manufactured by Mitsubishi Chemical Corporation, Acryplen HBA001P and Acryplen HBS007) each having a length of 20 mm, a width of 20 mm, and a thickness of 0.15 mm were subjected to plasma treatment with an argon gas flow rate of 10 sccs, a reaction time of 2 minutes, and a pressure of 50 Pa. The resulting light-transmitting resin member was used as the light-transmitting resin member of Comparative Example 3-2.

<Evaluation of Contact Angle Maintenance>

In order to evaluate the temporal alterations in hydrophilicity, two days and two weeks after the light-transmitting resin members of Examples 3-1 and 3-2 and Comparative Examples 3-1 and 3-2 were prepared, the contact angle of water was measured. The water contact angle was measured by the following method using an automatic contact angle meter DropMaster DM500 (manufactured by Kyowa Interface Science Co., Ltd.).

(1) Put distilled water in the syringe, attach the dispenser, and set it in DM500.

(2) Cut the measurement sample into a size of 5 mm×50 mm and attach it to the stage.

(3) Launch the analysis software, select contact angle measurement [droplet method], and set each parameter.

Waiting time until measurement: 1000 ms

Measurement time interval: 1000 ms

Number of continuous measurements: 180 times (4) Set the droplet volume to be measured and the injection needle position on the image monitor to optimize the focus value of the image monitor.

(5) Drop a droplet onto the sample to start measurement, and read the water contact angle seconds after the start of measurement.

Table 3 shows the results of the water contact angle measurement test.

As a result of the measurement, the case where the contact angles after 2 days and 2 weeks were both 80 degrees)(°) or less was evaluated as ○, and the case otherwise was evaluated as ×.

<Evaluation of Window Residue>

The light-transmitting resin members of Examples 3-1 and 3-2 and Comparative Examples 3-1 and 3-2 were used to manufacture polishing pads as follows.

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution. The resulting resin-containing solution was filtered to remove insoluble components. The solution was cast on a polyester sheet using a knife coater so that the coating thickness was 0.8 mm. Thereafter, the polyester sheet on which the resin-containing solution was cast was immersed in a coagulation bath (the coagulation liquid was water) to coagulate the resin-containing solution, and after that, the polyester sheet was peeled off, washed, and dried to obtain a polyurethane resin sheet. The surface of the resulting polyurethane resin sheet was buffed to a thickness of 0.73 mm, and then a PET resin base material having a thickness of 0.188 mm was attached to the surface opposite to the buffed surface with an adhesive, and the surface of the polyurethane resin sheet was embossed to form grooves with a rectangular cross section and a lattice pattern on the surface, with a groove width of 1 mm, a groove interval of 4 mm, and a groove depth of 0.45 mm. The grooved polyurethane resin sheet was punched out into a circle with a diameter of 740 mm using a cutting die, and on a concentric circle at a position ½ the radius from the center of the circular polyurethane resin sheet on the grooved surface side, a circular cutting die with a diameter of 18 mm was used to punch three holes at equal intervals and independently of each other to form first through holes. On the surface of the resin base material on which the polyurethane resin sheet was not attached, a circular double-sided tape having a thickness of about 0.1 mm and a diameter of 790 mm with a release paper on one side (the thickness of the PET base material was 0.023 mm and the thickness of the adhesive component on both the front and back surfaces of the PET base material was 004 mm) was adhered as a second layer, and the surplus double-sided tape was cut so as to have the same diameter as the polyurethane resin sheet. Next, a circular cutting die with a diameter of 9 mm was fitted into the first through hole with a diameter of 18 mm, and a second through hole was opened so that the double-sided tape and the release paper could pass through. At this time, the holes were drilled so that the center of the first through hole and the center of the second through hole were substantially the same. The transparent resin members prepared in Examples 3-1 and 3-2 and Comparative Examples 3-1 and 3-2 were cut into 3 pieces with a diameter of 17 mm, and the ring-shaped double-sided tape exposed in the first through hole and the transparent resin member were adhered to manufacture a polishing pad.

Next, patterned substrates having lines made of tungsten (W) and spaces made of TEOS (silicon oxide film) were prepared as polish-target objects. Each polishing pad was used to polish 500 substrates under the following conditions. After that, the cross section of the light-transmitting resin member was observed with an energy dispersive X-ray spectrometer (EDS) to evaluate whether or not any residue adhered to the surface on the polishing surface side of the light-transmitting resin member.

Polishing machine used: EBARA F-REX300

Polishing pressure: 2.5 psi

Polishing pad: H600 manufactured by Fujibo Holdings, Inc.

Abrasive: model number "BSL8176C" manufactured by Planar

Dresser: 3M Diamond Dresser, model number "A188"

Pad break 30 N×30 minutes, diamond dresser 54 rpm, surface plate rotation speed 80 rpm, ultrapure water 200 mL/min Conditioning: Ex-situ, 30 N, 4 scans, 16 seconds
Polishing: surface plate rotation speed 70 rpm, head rotation speed 71 rpm, slurry flow rate 200 mL/min
Polishing time: about 60 seconds
Table 3 shows the results.

TABLE 3

| | Water Contact Angle (°) | | | Window |
|---|---|---|---|---|
| | 2 Days Later | 2 Weeks Later | Hydrophilicity Evaluation | Portion Residue |
| Example 3-1 | 14.9 | 14.5 | ○ | None |
| Example 3-2 | 5.2 | 6.3 | ○ | None |
| Comparative Example 3-1 | 87.5 | 87.4 | X | Yes |
| Comparative Example 3-2 | 51.1 | 83.3 | X | Yes |

As a result of the above tests, Comparative Example 3-1, which was not surface-treated, had a high water contact angle of about 87 degrees after 2 days and 2 weeks, indicating poor wettability. As a result of the window residue evaluation using EDS, when polishing was performed using the polishing pad having the light-transmitting resin member of Comparative Example 3-1, many Si elements were found on the surface of the light-transmitting resin member. It is inferred that Si stayed on the highly hydrophobic window surface and stuck to it.

In Comparative Example 3-2 in which only plasma treatment was performed, although the contact angle after 2 days was smaller than that of the untreated product, the contact angle was equal to that of the untreated product after 2 weeks, indicating that the surface modification effect of plasma treatment was lost. Also, in the EDS measurement, Si element was confirmed on the surface of the light-transmitting resin member, and it is inferred that Si was deposited on the surface of the window portion, which is not sufficiently hydrophilic.

Meanwhile, Example 3-1, in which graft polymerization treatment was performed, maintained a low contact angle even after two weeks, and Example 3-2, in which the graft polymer was composited, had an even lower contact angle than Example 3-1, and maintained its contact angle even after two weeks. Also, Si element could not be confirmed by EDS measurement in either Example 3-1 or 3-2.

As a result, it has been found that the polishing pads containing the light-transmitting resin members of Examples 3-1 and 3-2 can reduce adhesion and sticking of polishing swarf to the surface on the polishing surface side of the light-transmitting resin member (window member), thereby enabling stable optical detection.

<<Polishing Pad of Fourth Aspect>>

Example 4-1

Aliphatic urethane acrylate ("EBECRYL 2000" manufactured by Daicel-Allnex Ltd.) in an amount of 50 parts by mass and 50 parts by mass of polyethylene glycol diacrylate ("EBECRYL 11" manufactured by Daicel-Allnex Ltd., the mass average molecular weight was 700, and number of ethylene oxide units per monomer: 13) were mixed, and 5 parts by mass of a photopolymerization initiator ("IRGACURE 184" manufactured by BASF) was further added thereto, and a mixing stirrer was used to uniformly mix them and obtain a resin composition. The resulting resin composition was uniformly applied to one side of an acrylic resin sheet (Clarex S, manufactured by Nitto Jushi Kogyo Co., Ltd., thickness 400 μm) using a bar coater. After that, it was left to dry for 10 minutes in an oven kept at 50° C. After the drying, an 80 W/cm metal halide lamp was used to irradiate the resin composition with ultraviolet rays at an accumulated ultraviolet irradiation dose of 900 mJ/cm$^2$ to cure the resin composition and form a surface layer having a thickness of 3.5 μm. The resulting acrylic resin sheet with a surface layer was used as an endpoint detection window.

Example 4-2

Polyethylene glycol diacrylate ("A-1000" manufactured by Shin-Nakamura Chemical Co., Ltd., the mass average molecular weight was 1140, and the number of ethylene oxide units per monomer: 23) in an amount of 58 parts by mass, 39 parts by mass of $C_{2-3}$ alkoxylated pentaerythritol tetraacrylate ("EBECRYL 40" manufactured by Daicel-Allnex Ltd., the mass average molecular weight was 571, and the number of ethylene/propylene oxide units per monomer: 4), 3 parts by mass of a photopolymerization initiator ("IRGACURE 184" manufactured by BASF), and 100 parts by mass of propylene glycol monomethyl ether as a solvent were uniformly mixed using a mixing stirrer to obtain a resin composition. The resulting resin composition was applied to an acrylic resin sheet in the same manner as in Example 4-1 to form a surface layer, which was used as an endpoint detection window.

Example 4-3

Ethoxylated glycerin triacrylate ("A-GLY-20E" manufactured by Shin-Nakamura Chemical Co., Ltd., the mass average molecular weight was 1134, and the number of ethylene oxide units per monomer: 20) in an amount of 67 parts by mass, 28 parts by mass of $C_{2-3}$ alkoxylated pentaerythritol tetraacrylate ("EBECRYL 40" manufactured by Daicel-Allnex Ltd., the mass average molecular weight was 571, and the number of ethylene/propylene oxide units per monomer: 4), 5 parts by mass of a photopolymerization initiator ("IRGACURE 184" manufactured by BASF), and 100 parts by mass of propylene glycol monomethyl ether as a solvent were uniformly mixed using a mixing stirrer to obtain a resin composition. The resulting resin composition was applied to an acrylic resin sheet in the same manner as in Example 4-1 to form a surface layer, which was used as an endpoint detection window.

Comparative Example 4-1

A commercially available acrylic resin sheet (Clarex S, manufactured by Nitto Jushi Kogyo Co., Ltd., thickness 400 μm) was used as an endpoint detection window.

<Water Contact Angle Measurement>

A contact angle meter (DropMaster 500, manufactured by Kyowa Interface Science Co., Ltd.) was used to drop one drop of water (2 μL) from the injection needle, and the contact angle was measured after 3 seconds.

The water contact angle on the surface was measured by the above method, and the water contact angle decreased by 40 degrees or more from that before the formation of the surface layer was evaluated as ○ or ×. Table 4 shows the results.

<Light Transmittance Measurement>

The visible light transmittance of the light-transmitting resin members of Examples 4-1 to 4-3 and Comparative Example 4-1 was measured by the following method using an ultraviolet-visible-near infrared spectrophotometer V-770 (manufactured by JASCO Corporation).

1. Measurement in the case where water is adhered (1) Insert a quartz glass cell and measure a blank.

(2) Cut the light-transmitting resin members of Examples 4-1 to 4-3 and Comparative Example 4-1 into a size of 9 mm×50 mm.

(3) Place the light-transmitting resin member on a paper towel (Kimtowel, manufactured by Nippon Paper Crecia Co., Ltd.), and spray purified water three times on the surface of the light-transmitting resin member (only the coated surface for Examples 4-1 to 4-3, and only one surface for Comparative Example 4-1) from a position 20 cm away using a sprayer (capacity: 50 mL, PP bottle) (amount per spray: 0.160 to 0.165 mL, amount of water adhering to the surface of the light-transmitting resin member: 0.01 to 0.03 mL). After the spraying, the light-transmitting resin member was placed in a vertical position and allowed to stand still for 60 seconds. The light-transmitting resin member is placed in the quartz glass cell so that the surface no sprayed with water is in contact with the inner surface of the quartz glass cell.

(3) Arrange the light-transmitting resin member on the inner wall of the quartz glass cell so as to come into contact with the entire light source side of the quartz cell, with the coated surface of the light-transmitting resin member facing away from the light source.

(4) Use an ultraviolet-visible-near infrared spectrophotometer V-770 (manufactured by JASCO Corporation) to measure straight transmittance for light of 250 to 1000 nnl.

(5) Calculate the visible light transmittance for wavelengths of 380 to 780 nm based on JIS A5759: 2008.

1. Measurement in the case where water is not adhered (1) Insert a quartz glass cell and measure a blank.

(2) Cut the light-transmitting resin members of Examples 4-1 to 4-3 and Comparative Example 4-1 into a size of 9 mm×50 mm.

(3) Arrange the light-transmitting resin member on the inner wall of the quartz glass cell so as to come into contact with the entire light source side of the quartz cell, with the coated surface of the light-transmitting resin member facing away from the light source.

(4) Use an ultraviolet-visible-near infrared spectrophotometer V-770 (manufactured by JASCO Corporation) to measure straight transmittance for light of 250 to 1000 nm.

(5) Calculate the visible light transmittance for wavelengths of 380 to 780 nm based on JIS A5759: 2008.

By the above method, for the light-transmitting resin members of Examples 4-1 to 4-3 and Comparative Example 4-1, the difference between the visible light transmittance with water adhering to the surface and the visible light transmittance without water was determined (visible light transmittance without water adhesion-Visible light transmittance with water adhesion), and when the difference in light transmittance was 10% or less, it was evaluated as ○, and when it was greater than 10%, it was evaluated as ×. Table 4 shows the results.

<Chemical Resistance Evaluation>

Samples of Examples 4-1 to 4-3 each with a size of 15 mm×15 mm were immersed in an acidic slurry/alkaline slurry at 40° C. for 24 hours, and the moisture on the taken-out surface was wiped off with a paper towel (Kimtowel, manufactured by Nippon Paper Crecia Co., Ltd.) and the state of the surface layer was observed. The case where peeling or distortion could not be visually confirmed was evaluated as ○. The followings were used as the acidic slurry and the alkaline slurry, respectively. Table 4 shows the results.

Acidic slurry: Potassium permanganate-based slurry (FUJIMI INCORPORATED: DSC-201), pH 2

Alkaline slurry: Colloidal silica slurry (slurry manufactured by Cabot Corporation: SS25, containing KOH), pH 11

TABLE 4

| | | Comparative Example 4-1 | Example 4-1 | Example 4-2 | Example 4-3 |
|---|---|---|---|---|---|
| Surface Layer | | None | Yes | Yes | Yes |
| Evaluation of Water Contact Angle | | | ○ | ○ | ○ |
| Evaluation of Change in Light Transmittance | | X | ○ | ○ | ○ |
| Chemical Resistance Evaluation | Acidic | | ○ | ○ | ○ |
| | Alkaline | | ○ | ○ | ○ |

As a result of the tests, in Comparative Example 4-1, which did not have the surface layer of the resin containing a structural unit derived from a polyfunctional (meth)acrylate monomer on the polishing surface side, there was a large difference in visible light transmittance between the case with water on the surface and the case without water. Meanwhile, in Examples 4-1 to 4-3 having the surface layer of the resin on the polishing surface side, the difference in visible light transmittance between the case with water on the surface and the case without water was reduced compared to Comparative Example 4-1, and there was almost no difference in visible light transmittance between the case with water on the surface and the case without water. Therefore, in the polishing pads containing the light-transmitting resin members of Examples 4-1 to 4-3, visible light transmittance does not vary between the presence and absence of slurry on the surface, making it possible to determine the polishing endpoint with higher accuracy.

<Production Example 4-1>

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution. The resulting resin-containing solution was filtered to remove insoluble components. The solution was cast on a polyester film using a knife coater so that the coating thickness was 0.81 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 mm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of 0.45 mm. On a concentric circle at a position ½ the radius of the polishing pad from the center of the polishing pad on the grooved surface side, a circular cutting die with a diameter of 18 mm was used to punch three holes at regular intervals to form first through holes. A double-sided tape having a release paper on one side thereof was adhered to the side of the resin base material without polyurethane resin film attached, and a circular cutting die with a diameter of 9 mm was fitted into the first through hole with a diameter of 18 mm, and a second through hole was opened so that the double-sided tape and the release paper could pass through. At this time, the holes were drilled so that the center of the first through hole and the center of the second through hole were substantially the same. As a light-transmitting member, the acrylic resin sheet with a surface layer of Example 4-1 was prepared and cut into 3 pieces with a diameter of 17 mm, and the ring-shaped double-sided tape exposed in the first through hole and the light-transmitting member were bonded together so that the surface-treated surface of the light-transmitting member faced the polishing surface, thereby manufacturing a polishing pad.

Production Example 4-2

To 100 parts by mass of a solution containing 100% modulus 7.8 MPa polyester-based polyurethane resin (30 parts by mass) and DMF (70 parts by mass), 60 parts by mass of further DMF and 5 parts by mass of water were added and mixed to obtain a resin-containing solution. The resulting resin-containing solution was filtered to remove insoluble components. The solution was cast on a polyester film using a knife coater so that the coating thickness was 0.81 mm. Thereafter, the polyester film on which the resin-containing solution was cast was immersed in a coagulation bath (the coagulation liquid was water) to coagulate the resin-containing solution, and after that, the polyester film was peeled off, washed, and dried to obtain a polyurethane resin film having multiple interconnected and communicated, teardrop-shaped cells therein. The surface of the resulting polyurethane resin film was buffed to a thickness of 0.73 mm, and then a PET resin base material having a thickness of 0.188 mm was attached to the surface opposite to the buffed surface with an adhesive, and the surface of the polyurethane resin film was embossed to form grooves with a rectangular cross section and a lattice pattern on the surface, with a groove width of 1 mm, a groove interval of 4 mm, and a groove depth of 0.45 mm. To the side where the polyurethane resin film of the resin base material was not attached, a double-sided tape having a thickness of about 0.1 mm and having a release paper on one side (the thickness of the PET base material was 0.023 mm and the thickness of the adhesive component on both the front and back surfaces of the PET base material was 0.04 mm) was adhered. On a concentric circle at a position ½ the radius of the polishing pad from the center of the polishing pad on the grooved surface side, a circular cutting die with a diameter of 9 mm was used to punch three holes at regular intervals to form first through holes so as to penetrate to the release paper of the double-sided tape. The release paper of the double-sided tape was removed, and as a light-transmitting member, the acrylic resin sheet with a surface layer of Example 4-1 cut into the same size as the polishing layer was prepared, and the adhesive portion of the double-sided tape and the surface layer side of the acrylic resin sheet were adhered together. As an additional layer, a double-sided tape having a thickness of about 0.11 mm and having a release paper on one side (the thickness of the PET base material was 0.023 mm and the thickness of the adhesive component on both the front and back surfaces of the PET base material was 0.04 mm) was prepared, and three holes each with a diameter of 9 mm were drilled at positions overlapping the first through holes when viewed in the thickness direction to provide second through holes, and a polishing pad was manufactured by adhering to the non-coating-film side of the acrylic resin film light-transmitting member.

With the polishing pads of Production Examples 4-1 and 4-2, the light transmittance does not fluctuate greatly depending on the presence or absence of aqueous slurry, so that the polishing endpoint can be detected with high accuracy.

INDUSTRIAL APPLICABILITY

According to the first aspect of the present invention, it is possible to provide a polishing pad that can suppress variations in light transmittance.

According to the second aspect of the present invention, it is possible to provide a polishing pad that can suppress variations in light transmittance.

According to the third aspect of the present invention, it is possible to provide a polishing pad that can reduce adhesion and sticking of polishing swarf to the surface on the polishing surface side of the light-transmitting resin member (window member).

According to the fourth aspect of the present invention, it is possible to provide a polishing pad that can suppress variations in light transmittance. Therefore, the polishing pad of the present invention is industrially extremely useful.

REFERENCE SIGNS LIST

1 polishing pad
2 polishing layer
3 additional layer
4 light-transmitting member or light-transmitting resin member
4' top portion of light-transmitting member or light-transmitting resin member
5 through hole (first through hole)
6 second through hole
7 exposed portion
8 groove
8' bottom portion of groove
9 coating portion (second aspect), grafted surface portion (third aspect), or surface portion on polishing surface side of light-transmitting resin member (fourth aspect)

What is claimed is:

1. A polishing pad comprising:
a light-transmitting member; and
a polishing layer, wherein
the polishing layer includes a polishing surface for polishing an object to be polished, and the polishing pad includes a through hole penetrating from the polishing surface to an opposite surface thereof,
the light-transmitting member is arranged so that the light-transmitting member is in the through hole when viewed from the polishing surface side of the polishing pad in a thickness direction of the polishing pad,
a water contact angle of a surface on the polishing surface side of the light-transmitting member is 80 degrees or less, and
a surface of the light-transmitting member opposite to the polishing surface has a water contact angle greater than 80 degrees.

2. The polishing pad according to claim 1, wherein when the polishing surface is an upper surface and the opposite surface thereof is a lower surface, the surface on the polishing surface side of the light-transmitting resin member is lower than the polishing surface.

3. The polishing pad according to claim 1, wherein the polishing surface includes a groove, and when the polishing surface is an upper surface and the opposite surface thereof is a lower surface, a top portion of the light-transmitting member is at the same level as or lower than a bottom portion of the groove.

4. The polishing pad according to claim 1, wherein when the through hole of the polishing layer is a first through hole, the polishing pad further includes an additional layer having a second through hole having a smaller equivalent circle diameter than the first through hole, the additional layer is located opposite the polishing surface of the polishing layer, when the polishing pad is viewed in the thickness direction from the polishing surface side, the first through hole and the second through hole at least partially overlap each other, and the light-transmitting member is arranged so that the light-transmitting member is in the first through hole, when viewed from the polishing surface side of the polishing pad in the thickness direction of the polishing pad.

5. A polishing pad comprising:

a light-transmitting member; and a polishing layer, wherein the polishing layer includes a polishing surface for polishing an object to be polished, and the polishing pad includes a through hole penetrating from the polishing surface to an opposite surface thereof, the light-transmitting member is arranged so that the light-transmitting member is in the through hole when viewed from the polishing surface side of the polishing pad in a thickness direction of the polishing pad, a surface on the polishing surface side of the light-transmitting member is coated with a hydrophilic resin, and the hydrophilic resin is a resin having an ion-bonding hydrophilic group, and in the resin having an ion-bonding hydrophilic group, a cationic moiety of the ion-bonding hydrophilic group is covalently bonded to a monomer constituting the resin and is ion-bonded to an anionic moiety of the ion-bonding hydrophilic group.

6. The polishing pad according to claim 5, wherein the ion-bonding hydrophilic group contains an ammonium cation.

7. The polishing pad according to claim 5, wherein resin-coated surface on the polishing surface side of the light-transmitting member has a water contact angle of 50 degrees or less.

8. The polishing pad according to claim 5, wherein when the polishing surface is an upper surface and the opposite surface thereof is a lower surface, the surface on the polishing surface side of the light-transmitting resin member is lower than the polishing surface.

9. The polishing pad according to claim 5, wherein when the through hole of the polishing layer is a first through hole, the polishing pad further includes an additional layer having a second through hole having a smaller equivalent circle diameter than the first through hole, the additional layer is located opposite the polishing surface of the polishing layer, when the polishing pad is viewed in the thickness direction from the polishing surface side, the first through hole and the second through hole at least partially overlap each other, and the light-transmitting member is arranged so that the light-transmitting member is in the first through hole, when viewed from the polishing surface side of the polishing pad in the thickness direction of the polishing pad.

10. A polishing pad comprising:

a light-transmitting resin member; and a polishing layer, wherein the polishing layer includes a polishing surface for polishing an object to be polished, and the polishing pad includes a through hole penetrating from the polishing surface to an opposite surface thereof, the light-transmitting resin member is arranged so that the light-transmitting resin member is in the through hole when viewed from the polishing surface side of the polishing pad in a thickness direction of the polishing pad, and (iii) the light-transmitting resin member includes a hydrophilic monomer graft-polymerized on a surface on the polishing surface side thereof, or (iv) the light-transmitting resin member includes, at least on a surface on the polishing surface side thereof, a resin containing a structural unit derived from a polyfunctional (meth) acrylate monomer having two or more polymerizable functional groups and having a —$C_{2-4}$ alkylene-O-unit.

11. The polishing pad according to claim 10, wherein (iii) the light-transmitting resin member includes a hydrophilic monomer graft-polymerized on a surface on the polishing surface side thereof, and the surface on the polishing surface side of the light-transmitting resin member has a water contact angle of 80 degrees or less.

12. The polishing pad according to claim 10, wherein the hydrophilic monomer is an acrylic monomer.

13. The polishing pad according to claim 12, wherein the resin with a grafted surface includes an ion complex formed using a complex-forming polymer selected from polyethylene glycol, polyvinylpyrrolidone, polyxylylviologen, polyethyleneimine, polyvinyl pyridinium chloride, and polyvinyl benzyltrimethylammonium chloride.

14. The polishing pad according to claim 10, wherein (iv) the light-transmitting resin member includes, at least on a surface on the polishing surface side thereof, a resin containing a structural unit derived from a polyfunctional (meth) acrylate monomer having two or more polymerizable functional groups and having a —$C_{2-4}$ alkylene-O-unit, and the polyfunctional (meth) acrylate monomer is at least one selected from the group consisting of the following:

a monomer in which a compound having a —$C_{2-4}$ alkylene-O-unit and (meth) acrylic acid are ester-bonded; and a monomer in which a trihydric or higher alcohol having a $C_{2-4}$ alkylene oxide added thereto and (meth) acrylic acid are ester-bonded.

15. The polishing pad according to claim 14, wherein the trihydric or higher alcohol is selected from the group consisting of glycerin, diglycerin, triglycerin, trimethylolpropane, ditrimethylolpropane, erythritol, pentaerythritol, and dipentaerythritol.

16. The polishing pad according to claim 10, wherein (iv) the light-transmitting resin member includes, at least on a surface on the polishing surface side thereof, a resin containing a structural unit derived from a polyfunctional (meth) acrylate monomer having two or more polymerizable functional groups and having a —$C_{2-4}$ alkylene-O-unit, and the —$C_{2-4}$ alkylene-O-unit is derived from ethylene oxide and/or propylene oxide.

17. The polishing pad according to claim 10, wherein (iv) the light-transmitting resin member includes, at least on a surface on the polishing surface side thereof, a resin containing a structural unit derived from a polyfunctional (meth) acrylate monomer having two or more polymerizable functional groups and having a —$C_{2-4}$ alkylene-O-unit, and the polyfunctional (meth) acrylate monomer is at least one selected from the group consisting of polyethylene glycol diacrylate, polypropylene glycol diacrylate, ethoxylated pentaerythritol tetraacrylate, propoxylated pentaerythritol tetraacrylate, ethoxylated glycerin triacrylate, propoxylated glycerin triacrylate, ethoxylated trimethylolpropane triacrylate, and propoxylated trimethylolpropane triacrylate.

18. The polishing pad according to claim 10, wherein when the polishing surface is an upper surface and the opposite surface thereof is a lower surface, the surface on the polishing surface side of the light-transmitting resin member is lower than the polishing surface.

19. The polishing pad according to claim 10, wherein the polishing surface includes a groove, and when the polishing surface is an upper surface and the opposite surface thereof is a lower surface, a top portion of the light-transmitting member is at the same level as or lower than a bottom portion of the groove.

20. The polishing pad according to claim 10, wherein when the through hole of the polishing layer is a first through hole, the polishing pad further includes an additional layer having a second through hole having a smaller equivalent circle diameter than the first through hole, the additional layer is located opposite the polishing surface of the polishing layer, when the polishing pad is viewed in the thickness direction from the polishing surface side, the first through hole and the second through hole at least partially overlap each other, and the light-transmitting member is arranged so that the light-transmitting member is in the first through hole, when viewed from the polishing surface side of the polishing pad in the thickness direction of the polishing pad.

* * * * *